US008494897B1

(12) United States Patent
Dawson

(10) Patent No.: US 8,494,897 B1
(45) Date of Patent: Jul. 23, 2013

(54) INFERRING PROFILES OF NETWORK USERS AND THE RESOURCES THEY ACCESS

(75) Inventor: Steven Dawson, Oakland, CA (US)

(73) Assignee: Alexa Internet, San Francisco, CA (US)

( * ) Notice: Subject to any disclaimer, the term of this patent is extended or adjusted under 35 U.S.C. 154(b) by 855 days.

(21) Appl. No.: 12/494,151

(22) Filed: Jun. 29, 2009

Related U.S. Application Data

(60) Provisional application No. 61/133,499, filed on Jun. 30, 2008.

(51) Int. Cl.
*G06Q 30/00* (2012.01)
(52) U.S. Cl.
USPC ..... 705/7.33; 705/7.29; 705/7.37; 705/14.53; 705/14.52; 705/14.42
(58) Field of Classification Search
USPC ..... 705/7.11–7.42, 14.7–14.73; 709/201–253
See application file for complete search history.

(56) References Cited

U.S. PATENT DOCUMENTS

| 6,144,962 | A | 11/2000 | Weinberg et al. |
|---|---|---|---|
| 6,421,675 | B1 | 7/2002 | Ryan et al. |
| 6,691,163 | B1 | 2/2004 | Tufts |
| 7,072,888 | B1 | 7/2006 | Perkins |
| 7,206,780 | B2 | 4/2007 | Slackman |
| 7,424,439 | B1 * | 9/2008 | Fayyad et al. ................. 705/7.33 |
| 7,647,283 | B2 * | 1/2010 | Singh et al. ..................... 706/12 |
| 7,801,896 | B2 * | 9/2010 | Szabo ............................ 707/739 |
| 8,010,527 | B2 * | 8/2011 | Denoue et al. ................. 707/726 |
| 8,131,271 | B2 * | 3/2012 | Ramer et al. ................. 455/414.1 |
| 2002/0019763 | A1 | 2/2002 | Linden et al. |
| 2002/0169760 | A1 | 11/2002 | Cheung et al. |
| 2002/0198882 | A1 | 12/2002 | Linden et al. |
| 2003/0208578 | A1 | 11/2003 | Taraborelli et al. |
| 2005/0137939 | A1 | 6/2005 | Calabria et al. |
| 2009/0070443 | A1 | 3/2009 | Vanderhook et al. |

FOREIGN PATENT DOCUMENTS

WO 2005065401 A2 7/2005

OTHER PUBLICATIONS

Joachims, Thorsten, "Optimizing Search Engines using Clickthrough Data," Cornell University, Department of Computer Science, Ithaca, NY, SIGKDD 02, ACM-1-58113-567-X/02/0007 (2002).

Marketwire News Release titled "Quantcast Launches Media Planner Tool," dated Jun. 11, 2008.

* cited by examiner

*Primary Examiner* — David Rines
(74) *Attorney, Agent, or Firm* — Knobbe, Martens, Olson & Bear, LLP

(57) ABSTRACT

An analytics system and associated methods are disclosed. The analytics system may be used by site owners and others for various purposes, such as to identify and compare network sites that satisfy particular criteria, to identify and compare keywords associated with these sites, and to assess characteristics of typical users of these sites. One feature of the system includes computer processes for inferring characteristics of users for whom user profile data is unknown or incomplete, and for using these inferred characteristics to more accurately assess the characteristics of typical users of particular sites.

27 Claims, 64 Drawing Sheets

Results
1. enterprise.com
2. edmunds.com
3. gamesfreak.net
4. whatcar.co.uk
5. car.gr
6. webmycar.com
7. whatcar.com
8. automotive.com
9. car.com
10. carrentals.com
11. carsurvey.org
12. caranddriver.com
13. avis.com
14. topspeed.com
15. alliance-leicester.co.uk
16. autoscout24.de
17. parkers.co.uk
18. 2carpros.com
19. confused.com
20. contracthireandleasing.com
21. carsales.com.au
22. netcarshow.com
23. foroz.org
24. buyyourcar.co.uk
25. onlinecarstereo.com
26. rsportscars.com
27. car-part.com
28. u-car.com.tw
29. yahoo.com
30. nadaguides.com

Traffic Filter ▼

*What kind of traffic should the sites in your results be getting?*

*184*  *186*

*182* — Unique Monthly Pageviews
Greater than 1
and less than 23,000,000,000+

1    23,000,000,000+

Unique Monthly Visitors
Greater than 1
and less than 230,000,000+

1    230,000,000+

Average Time on Site
Greater than 0.1 min
and less than 100,000 min+

0.1 min    100,000 min+

*188* — % Growth Monthly Pageviews
Greater than -100%
and less than 1,000%+

-100%    1,000%+
Over: ○ 3 Months  ○ 6 Months

% Growth Monthly Visitors
Greater than -100%
and less than 1,000%+    — *190*

-100%    1,000%+
Over: ○ 3 Months  ○ 6 Months

Analyze
& Compare Sites

Overview
Traffic Sources
Country
City
Search Engines
Search Terms
Sites Linking In

Visitors
Overview
Demographics
Engagement

Related Sites
Upstream Sites
Downstream Sites
Shared Audience
Traffic Overlap

Content
Top URLs
Popular Subdomains
Advertising

Give us Feedback!

Content: Top URLs    New | Save
For: enterprise.com ☒ dollar.com ☒ and [Separate sites with space]

Which pages on the sites in your report are the most popular?    810
○ enterprise.com
            Date Range: 1W Path ⓘ
1. ○ /car_rental/home.do
2. ○ /car_rental/location.do?
3. ○ /car_rental/home.do
4. ○ /car_rental/deeplinkmap.do?
5. ○ /car_rental/carDetails.do?
6. ○ /car_rental/branchDetails.do
7. ○ /car_rental/noMatches.do
8. ○ /car_rental/location.do?startAt=5
9. ○ /car_rental/worldLocationSearch.do
10. ○ /car_rental/branchDetails.do?
11. ○ /car_rental/home.do?
12. ○ /car_rental/afterHours.do
13. ○ /car_rental/resSummary.do?
14. ○ /car_rental/pickAirport.do?
15. ○ /car_rental/contactUs.do
16. ○ /car_rental/location.do?startAt=10
17. ○ /car_rental/termsAndConditions.do
18. ○ /car_rental/chooseCar.do?
19. ○ /car_rental/showVehicles.do
20. ○ /car_rental/intresImage.do?imageId=21754.2&key=005.en.US&page=home
21. ○ /car_rental/termsAndConditions.do
22. ○ /car_rental/decisions.do
23. ○ /car_rental/worldLocationCreateRes.do
24. ○ /car_rental/corporateSignIn.do
25. ○ /car_rental/resSummary.do?selectLink=changeLocation&transactionId=WebTransaction2
26. ○ /car_rental/resSummary.do?selectLink=changeLocation&transactionId=WebTransaction1
27. ○ /car_rental/reservationSearch.do
28. ○ enterpriserentacar.ca/car_rental/home.do
29. ○ /car_rental/location.do?startAt=0
30. ○ /car_rental/carDetails.do?transactionId=WebTransaction2&selectedCar=SCAR
31. ○ enterpriserentacar.ca/car_rental/deeplinkmap.do?
32. ○ /car_rental/location.do?startAt=15
33. ○ /car_rental/carDetails.do?transactionId=WebTransaction2&viewCar=all
34. ○ enterpriserentacar.ca/car_rental/location.do?
35. ○ /car_rental/carDetails.do?transactionId=WebTransaction1&selectedCar=ECAR
36. ○ /car_rental/carDetails.do?transactionId=WebTransaction1&selectedCar=ICAR
37. ○ /car_rental/worldLocationSearch.do
38. ○ /car_rental/resSummary.do?selectLink=changeDateTime&transactionId=WebTransaction1
39. ○ /

Overview
For: alexa.com, Jun 11, 2008 @ 06:32pm

The following report card is based on our analysis of 100,020 pages.

OVERALL GRADE: B (89/100)

Report Card

| Subject | Description | Grade |
|---|---|---|
| Crawl Coverage | Can search engines easily reach all the pages on your site? | A |
| Reputation | Does your site have enough links from outside sources? | A |
| Page Optimization | Does each page on your site deliver value to search engines? | C |
| | Overall Grade | B |

Top Recommendations

1. Duplicate Title Tags
   Give each page of your website a title that reflects the content of that page. We found 33,049 pages that share titles with other pages that have different content.

2. Broken Links
   Fix the broken links on your site. We found 14,880 pages with broken links.

3. Duplicate Meta Descriptions
   Give each page of your website a meta description reflecting the content of that page. We found 59,178 pages that share meta descriptions with other pages that have different content.

4. Low Word Count
   Add more relevant text content to the pages on your site. We found 25,186 pages that have little or no text content.

5. Shortest Path
   1,714 pages are hard to find because your only links to them are buried deep within your site. Add links to these pages from prominent pages on your site so that search engine crawlers can find them.

Implementing the above recommendations can boost your search engine placement and may improve your site's usability. Click on the recommendations above to get details on each recommendation, or use the navigation to the left to browse through the entire report.

Navigation (left panel):
- Optimize Your Site
- Overview
- Crawl Coverage
  - Shortest Path
  - Link Structure
- Reputation
  - Links In
- Page Optimization
  - Anchor Text
  - Broken Links
  - Duplicate Content
  - Duplicate Meta Descriptions
  - Duplicate Title Tags
  - Low Word Count
  - Missing Alt Attributes
  - Session ID Parameters
  - URL Parameters
  - Link Spam
- Keywords
  - Competitor Keyword Analysis
  - Keyword Analysis
  - Keywords to Buy
  - Meta Keyword Analysis
  - Top Search Terms
- Stats
  - Crawl Errors
  - Mime Types Retrieved
  - Return Codes Retrieved
  - Unique Hosts Crawled

Figure 12a

Page Optimization
For: alexa.com, Jun 11, 2008 @ 06:32pm  1202

GRADE C
71/100

Summary
Based on our analysis of the pages on your site, alexa.com is not well-optimized for search engines.

*Does each page on your site deliver value to search engines?*

Recommendations —1204

1. Duplicate Title Tags
   Give each page of your website a title that reflects the content of that page. We found 33,049 pages that share titles with other pages that have different content.

2. Broken Links
   Fix the broken links on your site. We found 14,880 pages with broken links.

3. Duplicate Meta Descriptions
   Give each page of your website a meta description reflecting the content of that page. We found 59,178 pages that share meta descriptions with other pages that have different content.

4. Low Word Count
   Add more relevant text content to the pages on your site. We found 25,186 pages that have little or no text content.

5. Duplicate Content
   Clean up the duplicate content on your site. We found 4,550 pages with duplicate content.

Duplicate Meta Descriptions
For: alexa.com; Jun 11, 2008 @ 06:32pm

Duplicate meta descriptions for multiple URLs on your website can reduce traffic from search engines. More > Because meta descriptions are often used in the context snippets that appear in search results, duplicate or vague descriptions in your HTML headers may lead to low click-throughs to your site. This may, in turn, diminish your ranking in search results.
>
> Search engines may use the meta descriptions in the HTML headers of your pages to better index search results. Because duplicate meta descriptions can lead to improper indexing of your site's pages, it is important to differentiate between the content of each unique URL by accurately describing the page content in the meta description.

Of the 03,655 unique HTML pages we examined on your site, 59,170 pages share meta descriptions with other pages that have different content.

Recommendation — 1242

1. Give each page of your website a meta description reflects the content of that page. More > Users are more likely to click through to your pages when the context snippet in search results is relevant to their search query. If there is no context snippet, or if it is vague, the resulting lower click-through rate may lead to diminished ranking of your site's pages.
   >
   > When creating unique and accurate meta descriptions, take care not to replicate too closely any of the page title. Because the title of the page is likely to be the title of the search result, you should take advantage of the description to further describe the content of your page to searchers.

| Meta Description Duplicated Across Multiple Unique Pages | Copies |
|---|---|
| Alexa - The Web Information Company. Services: Alexa Web Information Service - information about the Web available via amazon.com Web Services, Als... | 19,130 |

10 example pages (out of 19,130):
- /
- /browse
- /browse?&CategoryID=1
- /browse?&CategoryID=10
- /browse?&CategoryID=1000101
- /browse?&CategoryID=1000161
- /browse?&CategoryID=1000202
- /browse?&CategoryID=1000204
- /browse?&CategoryID=1000208
- /browse?&CategoryID=1000288

| | |
|---|---|
| Alexa Browse Sites - Browse and search through sites by category or by most popular in category based on Alexa traffic rank. | 12,227 |

10 example pages (out of 12,227):
- /browse/general/?&CategoryID=&mode=general&SortBy=Popularity&mode=g...
- /browse/general/?&CategoryID=&mode=general&SortBy=Popularity&mode=g...
- /browse/general/?&CategoryID=&mode=general&SortBy=Popularity&mode=g...
- /browse/general/?&CategoryID=&mode=general&SortBy=Popularity&mode=g...
- /browse/general/?&CategoryID=&mode=general&SortBy=Popularity&mode=g...
- /browse/general/?&CategoryID=&mode=general&SortBy=Popularity&mode=g...
- /browse/general/?&CategoryID=&mode=general&SortBy=Popularity&mode=g..
- /browse/general/?&CategoryID=&mode=general&SortBy=Title&mode=genera...
- /browse/general/?&CategoryID=&mode=general&SortBy=Title&mode=genera..
- /browse/general/?&CategoryID=&mode=general&SortBy=Title&mode=genera.

| | |
|---|---|
| Missing meta description | 6,096 |

10 example pages (out of 6,896):
- awsp.alexa.com/
- awsp.alexa.com/docs/faqs.html

Low Word Count
For: alexa.com, Jun 21, 2008 @ 06:32pm

Pages with little or no text content often receive poor placement in search results. More ?

Of the 97,978 HTML pages we examined, 25,186 pages have little or no text content.

Recommendation — 1272

1. Include additional relevant text content on those pages below for which you would like better placement in search results. More ?

1274

| Pages with little or no text content | Word count |
|---|---|
| pages.alexa.com/awsp/docs/WebHelp/whgdhtml.htm | 1 |
| pages.alexa.com/awsp/docs/WebHelp/whidhtml.htm | 1 |
| cgi.alexa.com/www/cgi-bin/send_sales_mail.cgi | 2 |
| pages.alexa.com/awsp/docs/WebHelp/whfbody.htm | 2 |
| pages.alexa.com/awsp/docs/WebHelp/whfdhtml.htm | 2 |
| pages.alexa.com/awsp/docs/WebHelp/whfform.htm | 2 |
| pages.alexa.com/awsp/docs/WebHelp/whgbody.htm | 2 |
| pages.alexa.com/awsp/docs/WebHelp/whgdata/whnvf30.htm | 2 |
| pages.alexa.com/awsp/docs/WebHelp/whgdata/whnvf31.htm | 2 |
| pages.alexa.com/awsp/docs/WebHelp/whgdata/whnvf32.htm | 2 |
| pages.alexa.com/awsp/docs/WebHelp/whgdata/whnvf33.htm | 2 |
| pages.alexa.com/awsp/docs/WebHelp/whgdef.htm | 2 |
| pages.alexa.com/awsp/docs/WebHelp/whibody.htm | 2 |
| pages.alexa.com/awsp/docs/WebHelp/whiform.htm | 2 |
| pages.alexa.com/awsp/docs/WebHelp/whpro.htm | 2 |
| pages.alexa.com/awsp/docs/WebHelp/whskin_blank.htm | 2 |
| pages.alexa.com/awsp/docs/WebHelp/whskin_papplet.htm | 2 |
| pages.alexa.com/awsp/docs/WebHelp/whskin_pdhtml.htm | 2 |
| pages.alexa.com/awsp/docs/WebHelp/whskin_plist.htm | 2 |
| pages.alexa.com/awsp/docs/WebHelp/AWSP_User_Guide.htm | 3 |
| pages.alexa.com/awsp/docs/WebHelp/whgdata/whnvp30.htm | 3 |
| pages.alexa.com/awsp/docs/WebHelp/whgdata/whnvp31.htm | 3 |
| pages.alexa.com/awsp/docs/WebHelp/whgdata/whnvp32.htm | 3 |
| pages.alexa.com/awsp/docs/WebHelp/whgdata/whnvp33.htm | 3 |
| pages.alexa.com/awsp/docs/WebHelp/whgdata/whnvt30.htm | 3 |
| pages.alexa.com/awsp/docs/WebHelp/whgdata/whnvt31.htm | 3 |
| pages.alexa.com/awsp/docs/WebHelp/whgdata/whnvt32.htm | 3 |
| pages.alexa.com/awsp/docs/WebHelp/whgdata/whnvt33.htm | 3 |
| pages.alexa.com/awsp/docs/WebHelp/whskin_tbars.htm | 3 |
| pages.alexa.com/awsp/docs/WebHelp/whtdhtml.htm | 3 |
| pages.alexa.com/awsp/docs/WebHelp/whskin_mbars.htm | 4 |
| pages.alexa.com/awsp/docs/WebHelp/whgdata/whlstfl17.htm | 6 |
| pages.alexa.com/awsp/docs/WebHelp/whgdata/whlstfl24.htm | 6 |
| pages.alexa.com/awsp/docs/WebHelp/whgdata/whlstt0.htm | 7 |

Competitor Keyword Analysis
For: alexa.com, Jun 11, 2008 @ 06:32pm

The keywords below drive traffic to sites that share your audience. Optimizing for the following keywords is likely to drive more traffic to your site from search engines. More ?

This list should help answer the question "What terms are driving traffic to my competitors?". The sites in the list were visited either just before or just after your site. For each of the sites, the top search terms that drive traffic to that site are listed.

Recommendations: — 1312
1. Examine the list below for an overview of what keywords are driving traffic to your competitors. You may want to modify your site content to target these keywords or purchase these keywords if you rank poorly.

| Competitor | Keyword | Their Rank | Your Rank | Search Volume |
|---|---|---|---|---|
| archive.org | 1. wayback machine | 1 | | >100 |
| | 2. waybackmachine | 1 | | >100 |
| | 3. wayback | 1 | | >100 |
| | 4. way back machine | 1 | | >100 |
| | 5. archive | 1 | | >100 |
| | 6. internet archive | 1 | | >100 |
| | 7. web archive | 1 | | >100 |
| | 8. webarchive | 1 | | >100 |
| | 9. archives | 1 | | 34 |
| | 10. archive.org | 1 | | 9 |
| compete.com | 1. kral oyun | 8 | | 53 |
| | 2. fotospor | 2 | | 10 |
| | 3. compete | 1 | | >100 |
| | 4. sahibinden.com | 1 | | 5 |
| | 5. arabam.com | 6 | | 9 |
| | 6. pcrichards.com | 1 | | >100 |
| | 7. yenibiri? | 3 | | 3 |
| | 8. sahlinden | 9 | | 3 |
| | 9. atrapalo | 4 | | 3 |
| | 10. irindir.com | 3 | | 28 |

Sidebar menu:
- Optimize Your Site
- Overview
- Crawl Coverage
  - Shortest Path
  - Link Structure
- Reputation
  - Links In
- Page Optimization
  - Anchor Text
  - Broken Links
  - Duplicate Content
  - Duplicate Meta Descriptions
  - Duplicate Title Tags
  - Low Word Count
  - Missing Alt Attributes
  - Session ID Parameters
  - URL Parameters
  - Link Spam
- Keywords
  - Competitor Keyword Analysis
  - Keyword Analysis
  - Keywords to Buy
  - Meta Keyword Analysis
  - Site Search Terms
- Stats
  - Crawl Errors
  - Mime Types Not Crawled
  - Return Codes Retrieved
  - Unique Hosts Crawled
- Give us Feedback!

Return Codes Retrieved
For: alexa.com, Jun 11, 2008 @ 06:32pm   1432

| Site | Return Code | Count |
|---|---|---|
| www.alexa.com | 200 OK — The request has succeeded. | 97,694 |
| | 301 Moved Permanently — The requested resource has been assigned a new permanent URI and any future references to this resource SHOULD use one of the returned URIs. | 648 |
| | 302 Found — The requested resource resides temporarily under a different URI. | 177 |
| | 400 Bad Request — The request could not be understood by the server due to malformed syntax. | 3 |
| cgi.alexa.com | 200 OK — The request has succeeded. | 354 |
| | 302 Found — The requested resource resides temporarily under a different URI. | 328 |
| | 403 Forbidden — The server understood the request, but is refusing to fulfill it. | 1 |
| | 404 Not Found — The server has not found anything matching the Request-URI. | 1 |
| | 500 Internal Server Error — The server encountered an unexpected condition which prevented it from fulfilling the request. | 1 |
| pages.alexa.com | 200 OK — The request has succeeded. | 390 |
| | 404 Not Found — The server has not found anything matching the Request-URI. | 196 |
| | 301 Moved Permanently — The requested resource has been assigned a new permanent URI and any future references to this resource SHOULD use one of the returned URIs. | 6 |
| client.alexa.com | 200 OK — The request has succeeded. | 141 |
| | 404 Not Found — The server has not found anything matching the Request-URI. | 6 |
| rss.alexa.com | 200 OK — The request has succeeded. | 27 |
| | 404 Not Found — The server has not found anything matching the Request-URI. | 1 |
| awsp.alexa.com | 200 OK — The request has succeeded. | 12 |
| | 404 Not Found — The server has not found anything matching the Request-URI. | 6 |
| | 302 Found — The requested resource resides temporarily under a different URI. | 1 |
| websearch.alexa.com | 200 OK — The request has succeeded. | 12 |
| | 404 Not Found — The server has not found anything matching the Request-URI. | 4 |
| | 302 Found — The requested resource resides temporarily under a different URI. | 1 |
| report.alexa.com | 200 OK — The request has succeeded. | 1 |
| | 404 Not Found — The server has not found anything matching the Request-URI. | 1 |

Sidebar: Optimize Your Site — Overview; Crawl Coverage (Success Path, Link Structure); Reputation (Links In); Page Optimization (Anchor Text, Broken Links, Duplicate Content, Duplicate Meta Descriptions, Duplicate Title Tags, Low Word Count, Missing Alt Attributes, Session ID Parameters, URL Parameters, Link Spam); Keywords (Competitor Keyword Analysis, Keyword Analysis, Keywords to Buy, Meta Keyword Analysis, Site Search Terms); Stats (Crawl Errors, Mime Types Retrieved, Return Codes Retrieved, Unique Hosts Crawled); Give us Feedback!

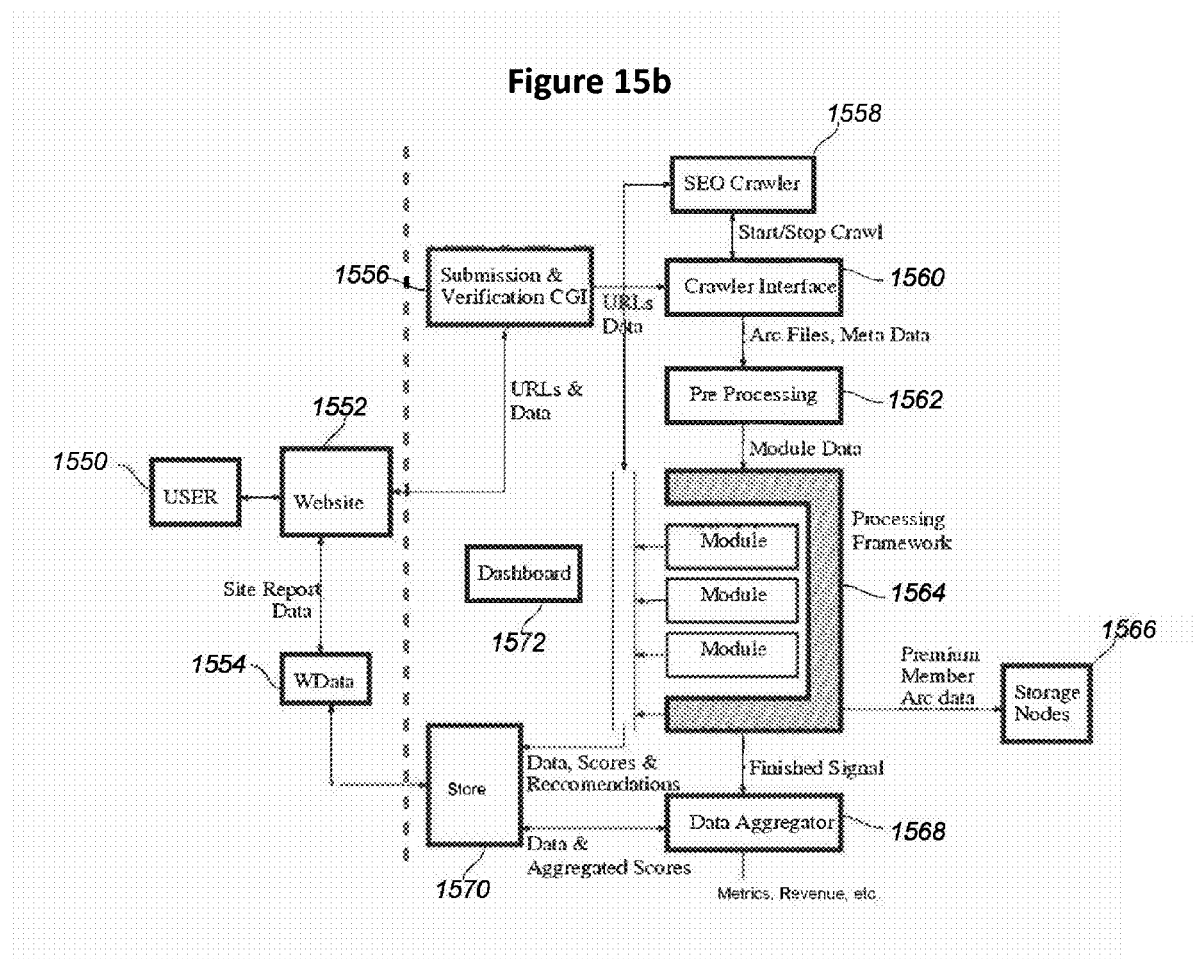

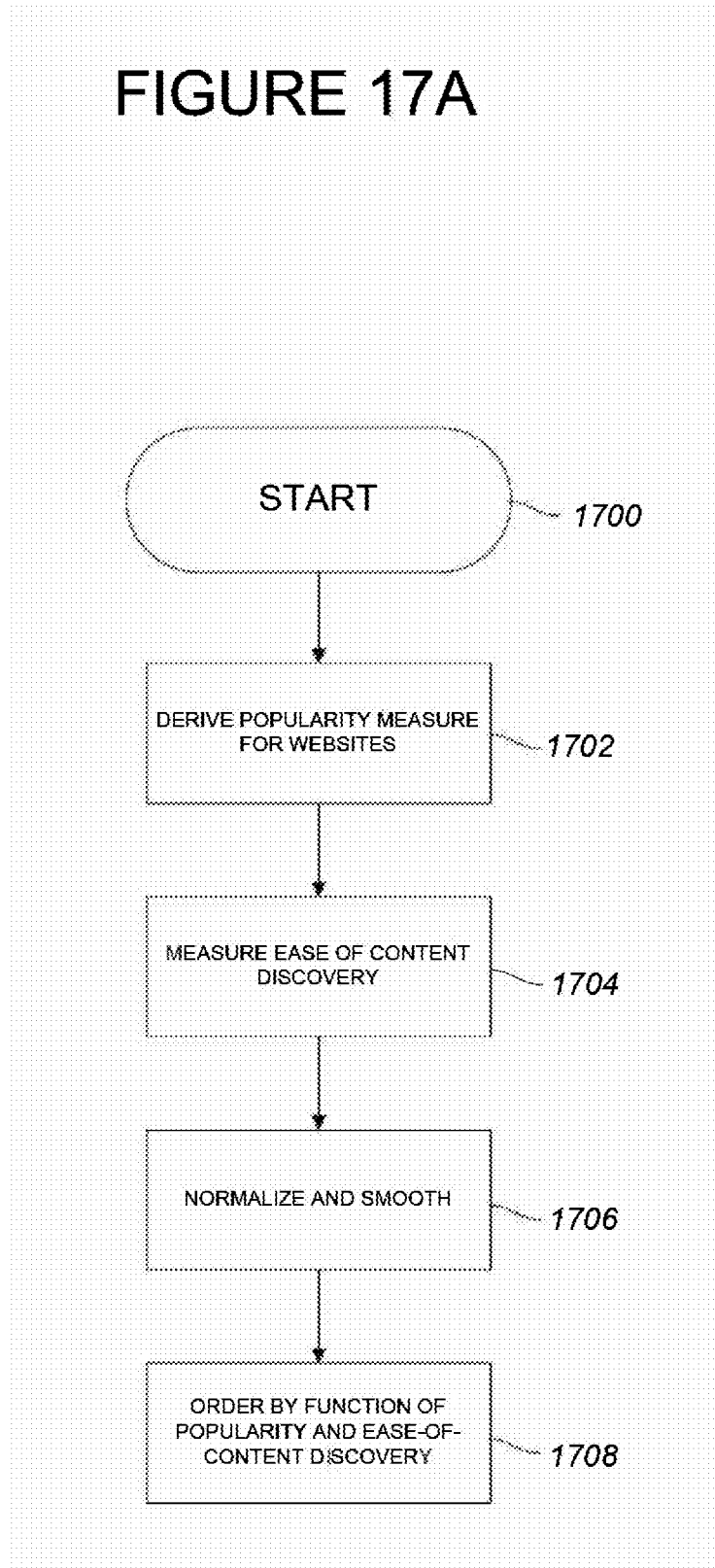

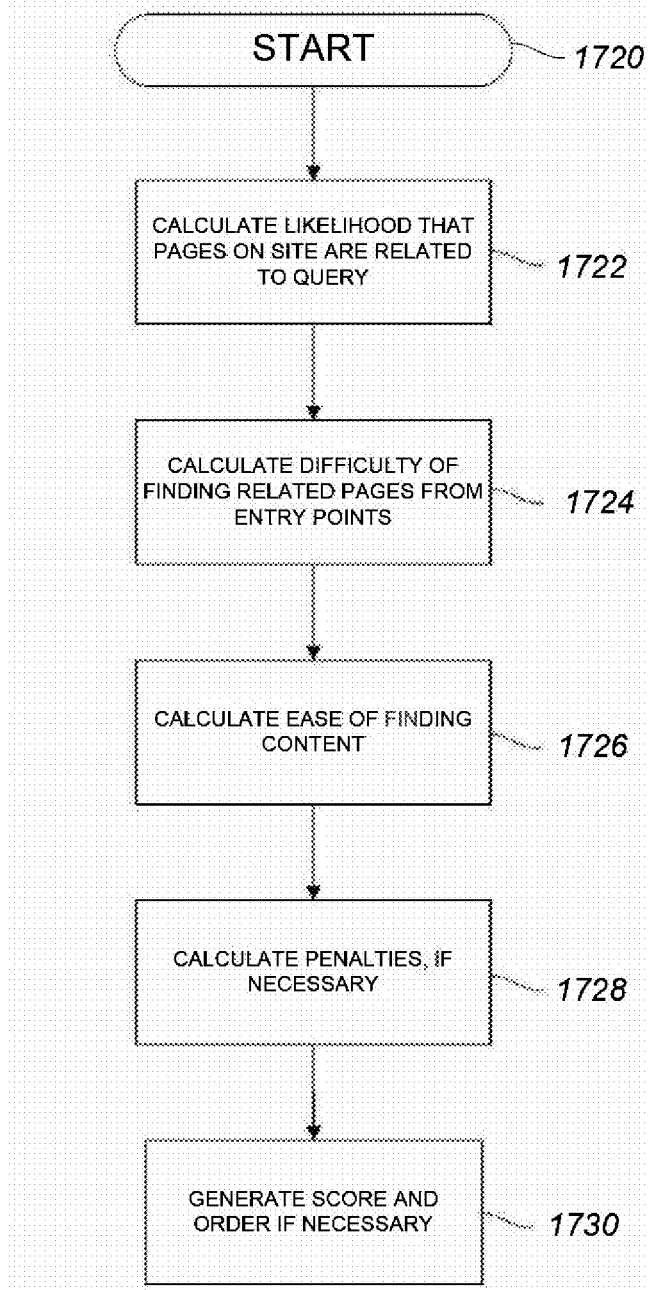

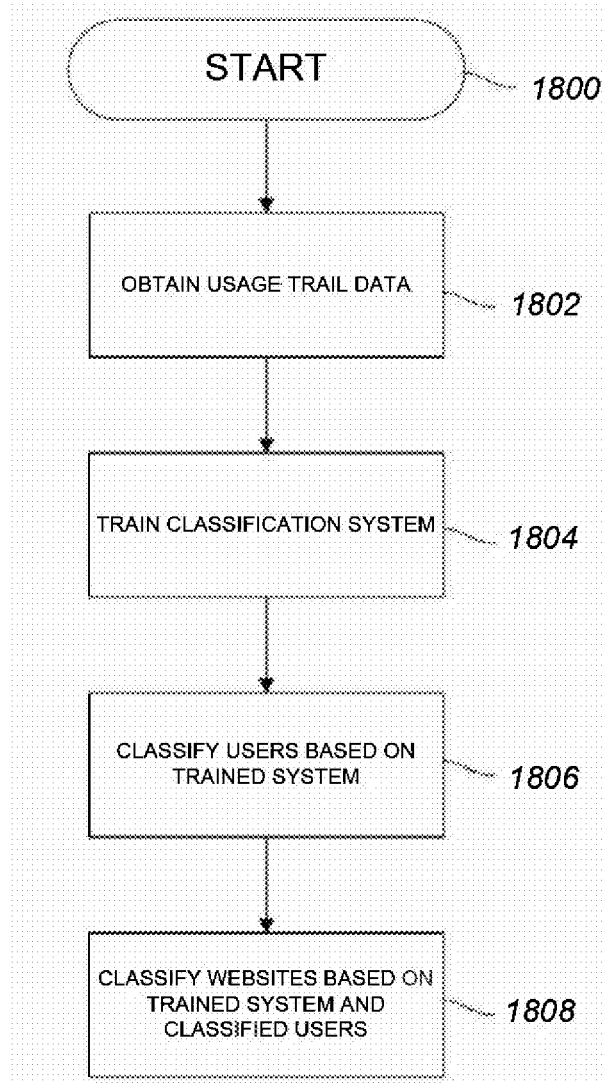

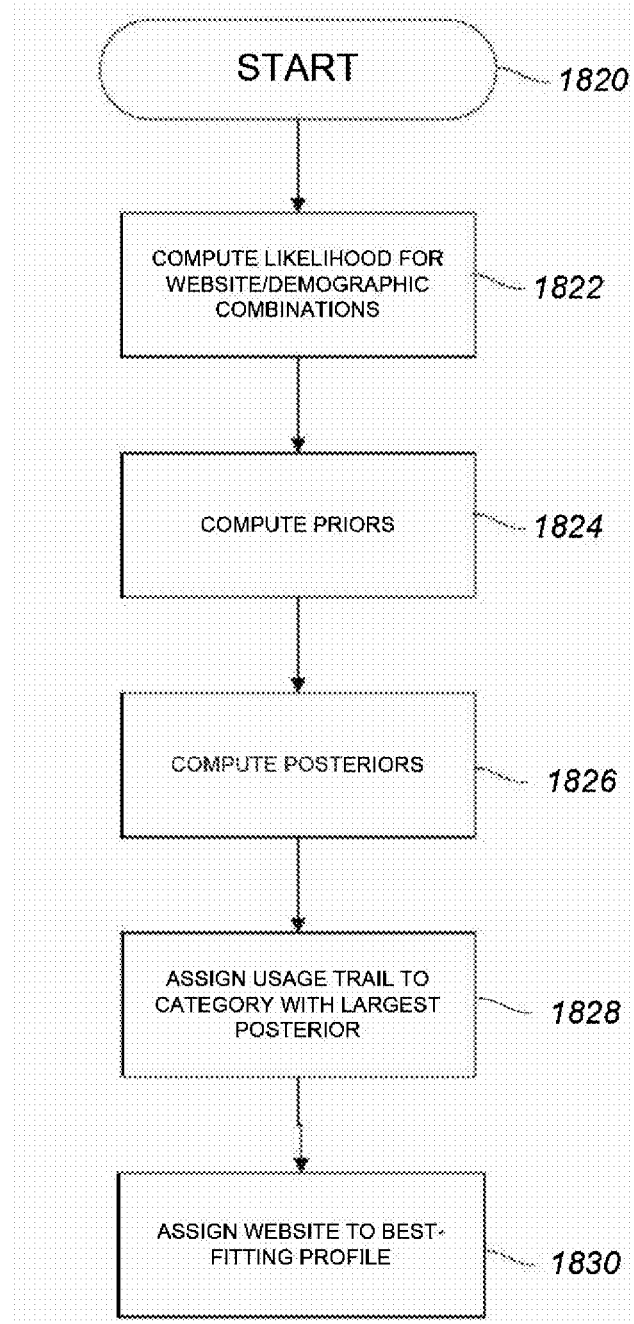

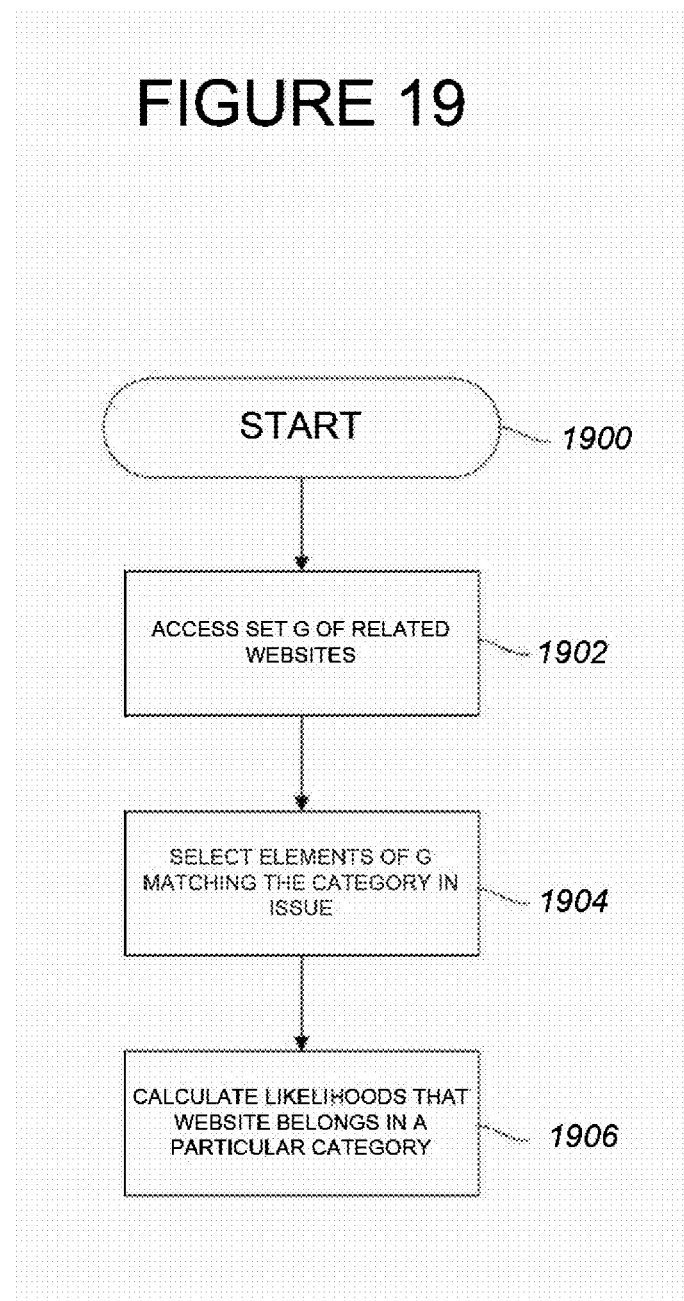

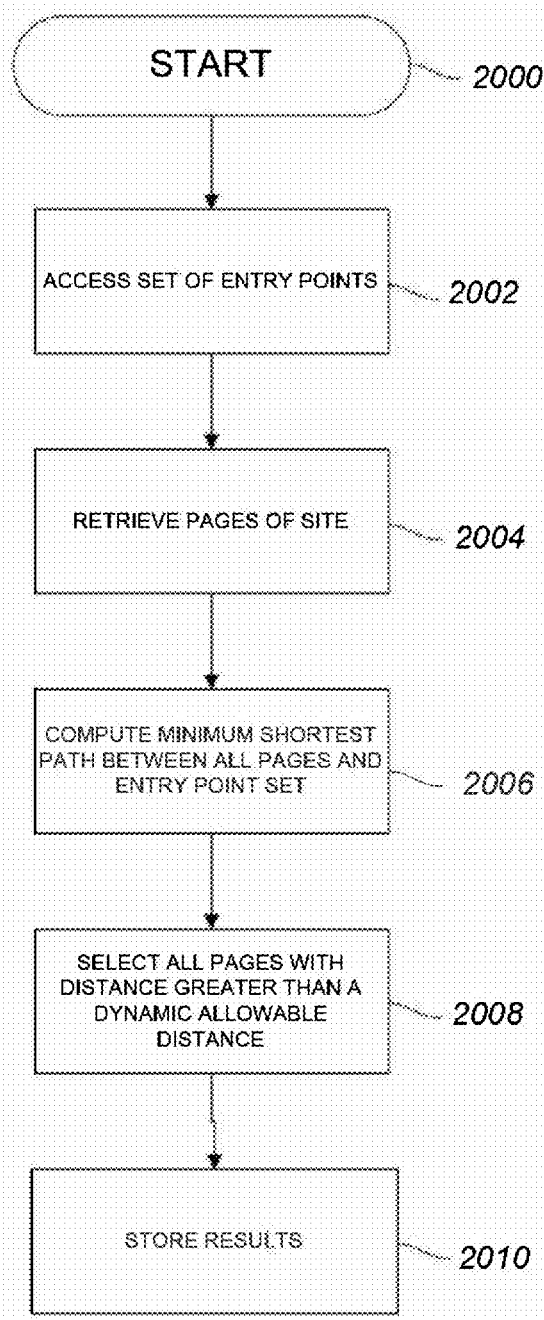

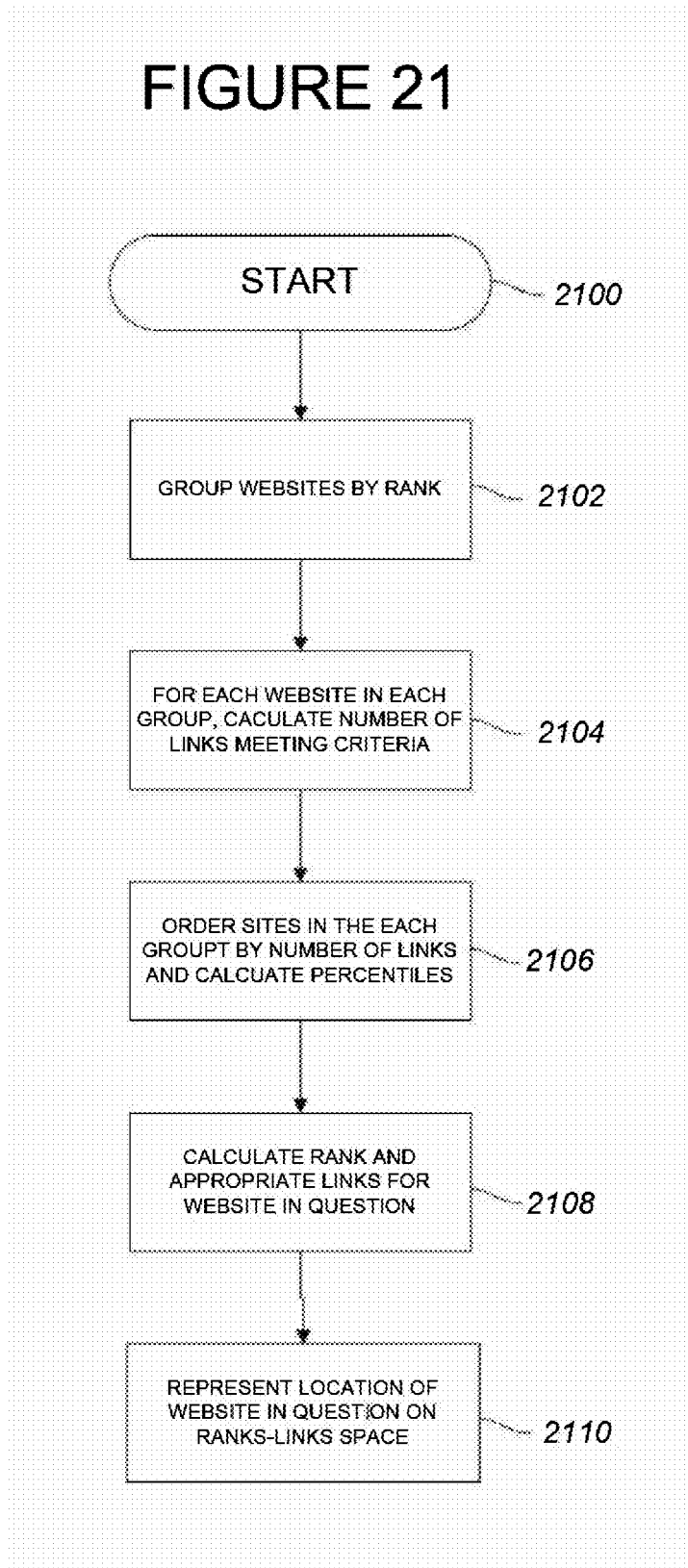

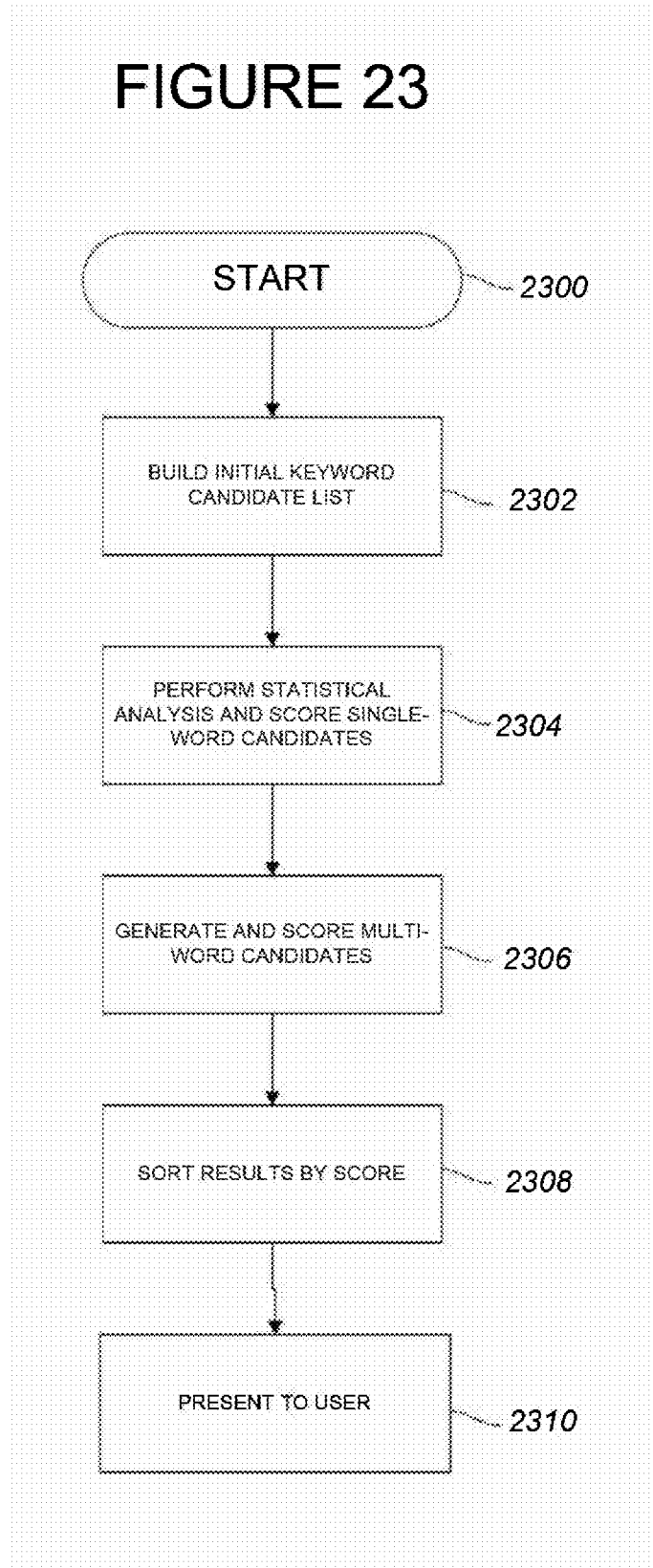

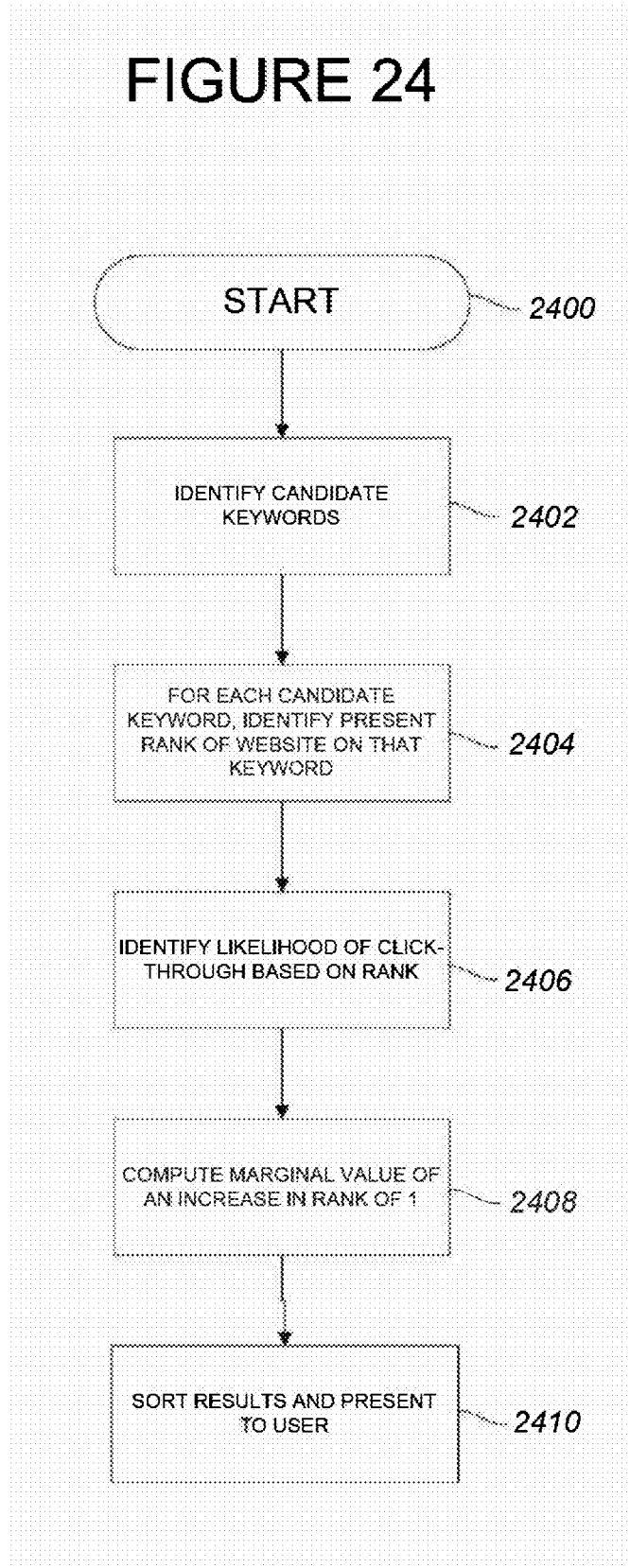

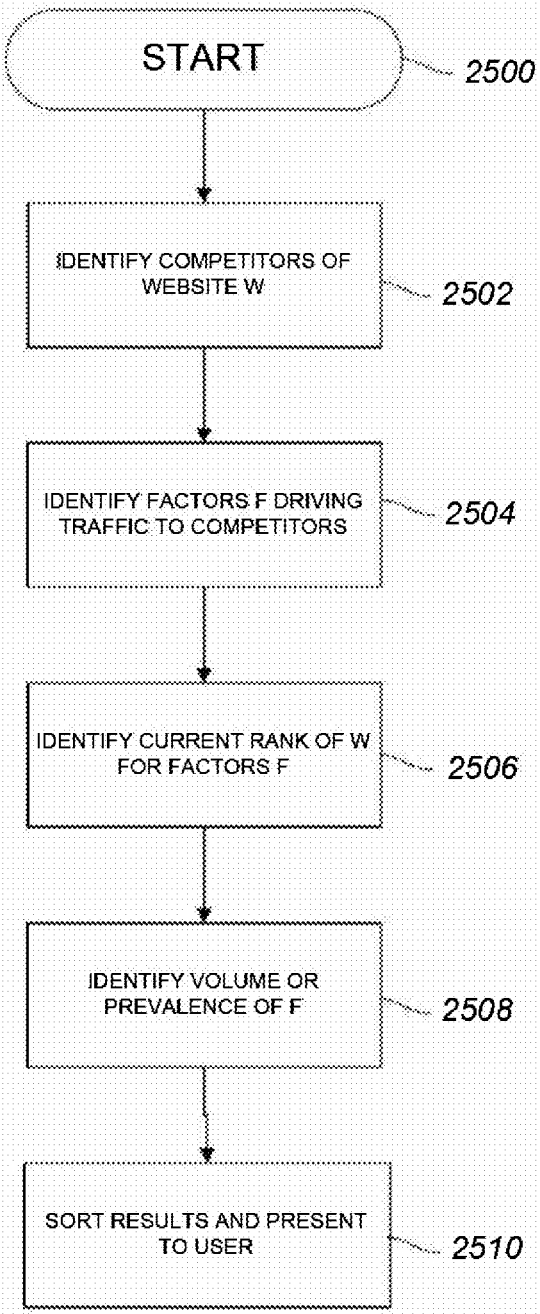

Figure 26

| Competitor | Keyword | Their Rank | Your Rank | Search Volume |
|---|---|---|---|---|
| cyclenews.com | 1. cycle news | 2 | >100 | |
| | 2. cyclenews | 1 | >100 | |
| | 3. dunlop | 29 | >100 | |
| | 4. isidre esteve | 21 | 2 | |
| | 5. glidden paint | 62 | >100 | |
| | 6. motor cycle news | 17 | >100 | |
| | 7. bruised kidney | 24 | >100 | |
| | 8. kenan sofuo?lu | 35 | >100 | |
| | 9. bettencourt honda | 19 | >100 | |
| | 10. www.denniskirk.com | 17 | >100 | |
| roadracingworld.com | 1. heartland park topeka | 6 | >100 | |
| | 2. daytona news | 7 | 3 | |
| | 3. pepephone | 5 | 6 | |
| | 4. miller motorsports park | 21 | 90 | |
| | 5. sliderphoto | 8 | >100 | |
| | 6. ama superbike | 20 | 26 | |
| | 7. iowa speedway | 15 | >100 | |
| | 8. ama pro racing | 15 | >100 | |
| | 9. dunlop tire | 17 | >100 | |
| | 10. leo vince | 16 | >100 | |

1304

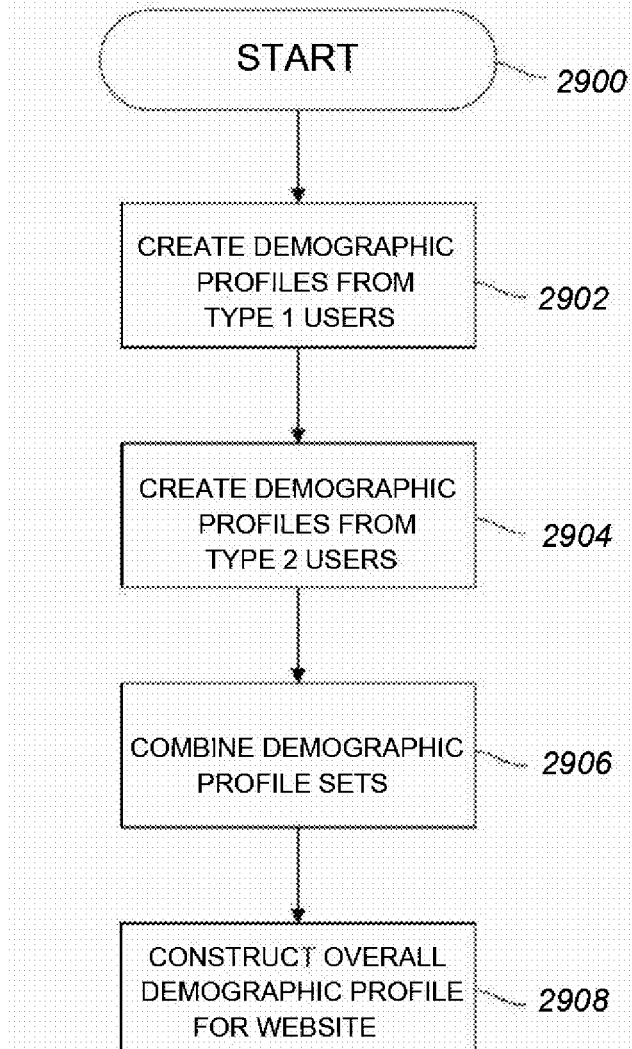

INFERRING PROFILES OF NETWORK USERS AND THE RESOURCES THEY ACCESS

PRIORITY CLAIM

This application claims the benefit of U.S. Provisional Appl. No. 61/133,499, filed Jun. 30, 2008, the disclosure of which is hereby incorporated by reference in its entirety.

BACKGROUND

1. Technical Field

The present disclosure relates generally to network analytics. More specifically, the disclosure relates to computer-implemented processes for the collection, analysis, and presentation of network data.

2. Description of the Related Art

Many methods of collecting and analyzing network data are known in the art. For large networks with significant traffic between many nodes spread over many connections, such as the internet, it is difficult or impossible to obtain complete information about the traffic exchanged on the network. As such, some web analytics systems attempt to obtain or compute representative network data and to analyze network data to draw conclusions about network characteristics, such as traffic patterns. Further improvement in the art of collecting and analyzing network data is desirable. For example, improved methods are desirable for analyzing network content, and for analyzing data reflective of the behaviors and attributes of users who access such content, to identify characteristics of particular network resources or sites, such as websites.

BRIEF DESCRIPTION OF THE DRAWINGS

An analytics system that embodies various inventions is illustrated in the accompanying drawings summarized below:

Figure 1A:
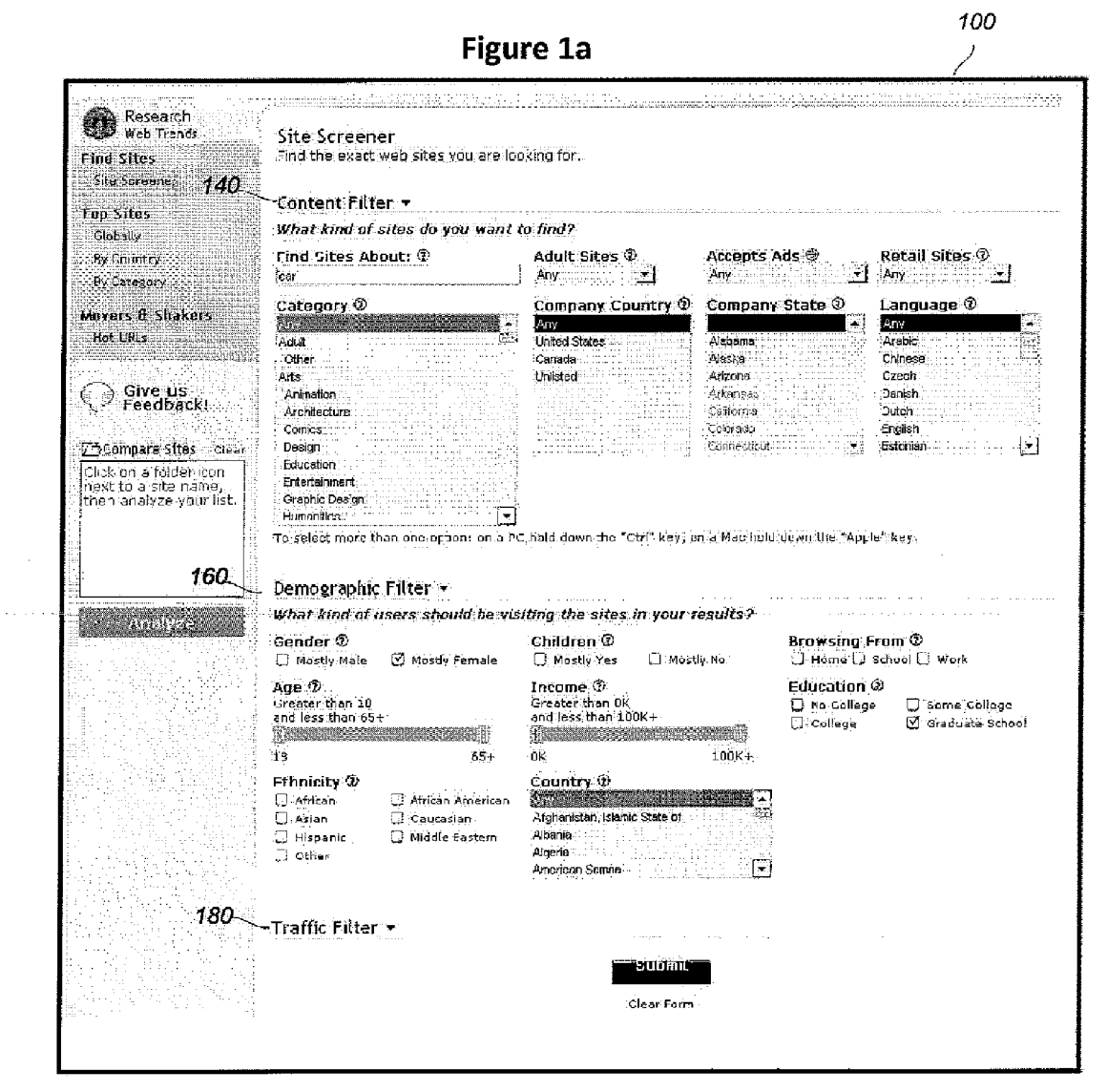

FIG. 1a is a screenshot illustrating a user interface of a site screener service that enables users to interactively search for sites based on various criteria;

FIG. 1b is a screenshot illustrating displayed results from the site screener filter for FIG. 1;

FIG. 1c is a screenshot further illustrating the "content filter" portion of the site screener interface of FIG. 1a;

FIG. 1d is a screenshot further illustrating the "demographic filter" portion of the a site screener interface of FIG. 1a;

FIG. 1e is a screenshot illustrating a site screener interface that enables users to interactively search for sites based on various traffic metrics;

FIGS. 8a-b are screenshots illustrating displays of information about the popularity levels of particular content items and areas of particular sites;

FIG. 9 is a screenshot illustrating results of an automated content-based analysis of a particular site, and illustrating associated recommendations;

FIGS. 12a-k are screenshots illustrating displays of information about optimizing a website, especially for optimizing the website for search engines;

FIGS. 13a-e are screenshots illustrating displays of information about keywords with respect to search engine optimization;

FIGS. 14a-d are screenshots illustrating displays of statistics of a website based on website content and visitor data;

FIG. 15b is a schematic block diagram of the system processing framework of the web analytics system of FIG. 15a;

FIG. 17a is a flowchart illustrating a method for associating and ordering websites based on relatedness to a given keyword;

FIG. 17b is a flowchart illustrating a method for determining the relatedness of a given website to a given keyword;

FIG. 18a is a flowchart illustrating a method for using a classifier to infer demographic characteristics of users and websites;

FIG. 18b is a flowchart illustrating an alternative method for using a classifier to infer demographic characteristics of users and websites;

FIG. 19 is a flowchart illustrating a method for categorizing websites based on click-stream data;

FIG. 20 is a flowchart illustrating a method for computing a page path lengths and for determining a set of pages with a path length exceeding a particular threshold;

FIG. 21 is a flowchart illustrating a method for representing relationships between website citations and traffic ranks;

FIG. 23 is a flowchart illustrating a method for generating keyword recommendations based on noun phrase parsing;

FIG. 24 is a flowchart illustrating a method for generating keyword recommendations based on search frequency and rank;

FIG. 25 is a flowchart illustrating a method for generating keyword recommendations based on based on analysis of competitors;

FIG. 26 is a screenshot illustrating a table that provides keyword recommendations based on an analysis of competitors according to the method of FIG. 25;

FIG. 29 is a flowchart illustrating a method for inferring demographic profiles of users and sites.

DETAILED DESCRIPTION OF SPECIFIC EMBODIMENTS

Figure 1C:
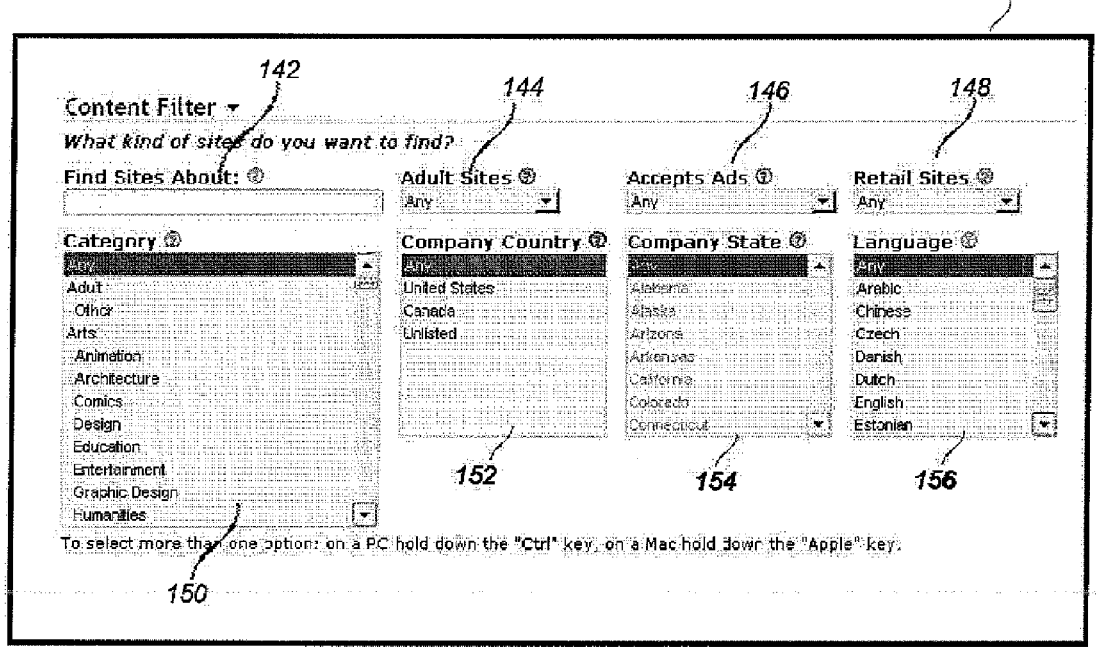

Disclosed herein are novel systems and methods for, e.g., collecting data, classifying network resources, comparing network resources, analyzing network traffic and statistics, and presenting data to users. While the novel features of this disclosure may be freestanding and implemented independently from each other, they are presented in the context of a particular analytics system and site. The disclosed analytics system provides various interactive services that may be used by site owners and others for various purposes, such as to identify and compare websites that satisfy particular criteria, and to identify and compare keywords associated with these sites.

This disclosure proceeds in several parts: The first part provides an introduction to the techniques of search engine optimization; part two describes features of an analytics system employing some of the novel features disclosed herein with reference to screenshots of the system's user interface; part three describes some embodiments of novel data collection and analysis methods; and the remaining parts provide detailed descriptions of other particular features, functions, and algorithms related to analytics.

Search Engine Optimization

To increase the number of visitors to a website, webmasters and marketers use techniques such as Search Engine Optimization (SEO). SEO is the practice whereby webmasters structure the topology and content of their website in order to perform well in search engines. Optimizing a website for strong performance in search engines can generate significant increases in the number of visitors to the website.

By designing a website in an optimal fashion, a webmaster may increase the website's rank in the search results displayed in search engines. This practice typically requires webmasters to structure their websites in certain ways, and typically requires that the websites contain statistically significant amounts of content for which users conduct searches. Many webmasters do not know which search keywords they should optimize for because this may require knowledge of Internet user behavioral trends as related to interactions with search engines.

In addition to website design, search result rank may also depend on the number and quality of external links-in to the website. Generally speaking, a website with many high-quality links in will tend to perform better (rank higher) in search results than a website with few links in or with links-in of low quality.

Search Engine Marketing (SEM) is a popular method for marketing websites. In general, webmasters or marketers of websites may create ads for their websites and bid to have these advertisements (often including links to their webpages) displayed on search result pages on sites like google.com and yahoo.com. When a user performs a search, the search engine may identify ads associated with the search keyword(s) and display the matching ads (possibly in order of bid price). Under certain circumstances, websites can attract significantly more user traffic by participating in these SEM campaigns. In order to spend SEO and SEM dollars efficiently, the webmaster may need to know how much traffic those keywords would drive to the site if the webmaster were to purchase the keywords or optimize the website for the keywords.

Overview of Exemplary Features of Web Analytics System

A web analytics system that embodies various inventive features will now be described with reference to the drawings. Nothing in this description, including the associated drawings, is intended to imply that any particular feature, characteristic, step or component is essential to any of the disclosed inventions. For example, although the system is described primarily in the context of analytics associated with webpages and websites, the disclosed methods may also be used to provide analytics data for other types of content items (e.g., RSS feeds, podcasts, streamed multimedia content, etc.), and for other types of interactive network-based sites and systems.

The web analytics system may be used to, for example, allow a user, such as a site owner, to perform research on existing websites, find industry leaders, discover emerging sites, and identify competitors by category or keyword. As shown in FIG. 1a, the system may allow a user to find websites of interest by entering search criteria into, for example, a site screener interface 100 including various site screening filters 140, 160, 180.

The web analytics system may also collect and analyze data about a particular site or group of sites. The system may provide information generated from analysis of a specified site, or provide comparative information generated from the analysis of multiple specified sites. Information provided by the system may include, but is not limited to, analysis results pertaining to: traffic sources, visitors, related sites, and content. The system may allow additional sites to be dynamically added to a comparative report.

The web analytics system may also provide search engine optimization or marketing information for a site. Such information may enable an in-depth view of a site's visibility to search engines and insights into the optimization, monetization, and overall health of a site.

Site Screener/Filter

As shown in FIG. 1a, the web analytics system ("system") may provide a site screener interface 100 and service to allow a user to interactively search a network for sites that match certain criteria. (The user interface depicted in FIG. 1a and the other screen shots may be implemented as web pages served by a web server of the analytics system.) The site screener 100 may allow a user to simultaneously exclude from search results websites with certain attributes and limit results to only those websites with certain other attributes. The site screener 100 may allow a user to filter results based on attributes such as site content 140, visitor demographics 160, or traffic volume 180. Result filters based on these attributes may be simultaneously combined, resulting in a compound filter. Filter criteria values may be averaged over an arbitrary length of time, where appropriate. In one embodiment, appropriate filter criteria values may be averaged over a period of time, such as one month or one day. Multiple filter criteria may be specified, as illustrated in FIG. 1a; results may be displayed, as in FIG. 1b. Criteria may be provided to the site screener user interface by a user, such as when a user submits a web form containing a keyword or content field.

Content Filtering

As shown in FIG. 1c, the system may include a site screener content filter 140 capable of locating sites that match user-selected criteria based on the content of those sites. Such criteria may include, but are not limited to: keyword (or topic) matching 142, advertising content 146, retail content 148, membership in a content category 150, company country 152, company state 156, or content language 158. FIG. 1c illustrates one example of a web form that may be provided by the system to enable users to interactively search for sites that meet particular criteria. For example, the site screener content filter 140 may allow a user to use keyword matching as a result filter. In a keyword search 142, the system may exclude sites that do not contain content pertaining to one or more keywords (words or phrases) entered by a user. The user-supplied keyword may represent a particular topic of interest; for example, a user may use the content filter 140 to identify the most highly ranked sites pertaining to the keyword/topic "iPhone." Examples of particular methods that may be used to identify and rank sites that are related to particular keywords are depicted in FIGS. 17A and 17B, and are described below.

As another example, the site screener filter may allow a user to use content categories, such as adult content 144, advertising content 146, or retail content 148, as a result filter. For example, the system may allow the user to optionally exclude sites with adult content. Additional content categories and subcategories may be made available to a user.

Demographic Filtering

Figure 1D:
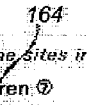

As shown in FIG. 1d, the system may also include a site screener demographic filter 160 capable of locating sites that match user-selected criteria based on the demographics of those visiting the sites. Such criteria may include, but are not limited to: gender 162, children 164, the location from which a visitor is browsing 166, age 168, income 170, education 172, ethnicity 174, or country 176. For example, the system may allow the user to optionally include only those sites whose visitors skew towards or against one gender or the other. As another example, the system may allow the user to optionally include only those sites whose visitors skew towards or against one or more of the selected age groups. Age groups may include, but are not limited to: 18-24, 25-34, 35-44, 45-54, 55-64, or over 65. The system may allow the user to optionally include only those sites for which more than an arbitrary percentage of visitors come from one or more of the selected countries. In one embodiment, the visitor percentage threshold may be 1%, 5%, 50%, or 90%, or may be configurable by the user. As depicted in FIG. 18A and described below, the demographic filter may be implemented in part by inferring demographic characteristics of users for which actual demographic information is unavailable or incomplete.

Traffic

As shown in FIG. 1e, the system may also include a site screener traffic filter 180 capable of locating sites that match user-selected traffic criteria. Such criteria may include, but is not limited to: unique page views 182, unique visitors 184, average time spent on the site 186, growth in page views 188, and/or growth in visitors 190. A user may select filter value ranges by any available selection mechanism. In one embodiment, a user may select filter value ranges by adjusting a slider control (as shown in FIG. 1e) to designate the low end of the range and by adjusting another slider control to designate the high end of the range.

For example, the site screener traffic filter 180 may allow a user to use unique page views as a result filter. The system may allow the user to optionally include only those sites receiving a number of unique page views falling within a selected range and within a given time range. In one embodiment, uniqueness may be determined by the rule that if a visitor visits the same site more than once in a day, the visit will only be counted once per day. The time range may be user selected or pre-defined. In one embodiment, the system may use a monthly range. In one embodiment, "average time spent" may mean the average number of minutes per day a user spends on the site. In other embodiments, a different timeframe may be used. The system may allow the user to optionally include only those sites whose page views have increased or decreased by an amount that falls within a selected range and for a given time period. In one embodiment, the increase may be represented as a percentage. In other embodiments, the increase may be represented as an absolute value. In one embodiment, only unique page views may be taken into account. In one embodiment, a month-over-month time period may be used to calculate growth.

The system may allow the user to optionally include only those sites whose visitors have increased or decreased by an amount that falls within a selected range and for a given time period. In one embodiment, the increase may be represented as a percentage. In other embodiments, the increase may be represented as an absolute value. In one embodiment, only unique page views may be taken into account. In one embodiment, a month-over-month time period may be used to calculate growth.

Lists of Top Sites

Figure 2:
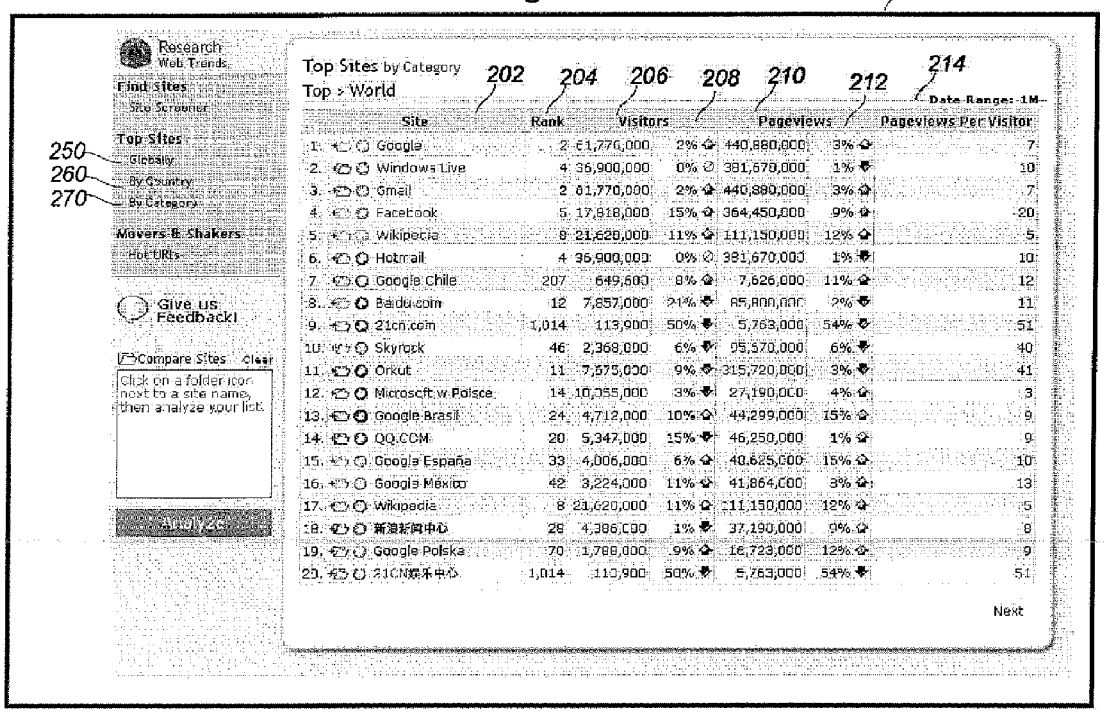
FIG. 2 is a screenshot of a search results interface listing top sites identified by the site screener service, and listing various traffic metrics associated with these sites.

As shown in FIG. 2, the web analytics system may collect, analyze, generate, and provide information pertaining to "top" sites 200, where "top" is measured according to some criterion or criteria such as traffic, page views, users, and so forth. The system may provide information about top sites globally 250, filtered by country 260, filtered by category 260, or filtered by other criteria. For each site, the system may provide the name of the site 202, the number of visitors to the site 206, the number of page views 210, the number of page views per visitor 214, a site rank 204, the percentage change in visitors 206, and the percentage change in page views 212. In one embodiment, the system may provide the average number of daily visitors over the last month. In other embodiments, the system may use different time periods. The system may additionally or alternative generate and display one or more of the following: the average number of unique (or non-unique) page views over the last month or other time period; the number of unique (or non-unique) pages viewed per visitor per day, averaged over the last month or other time period; In one embodiment, the rank may be calculated by ranking sites using a combination of visitors and page views over the past month; the site with the highest combination of visitors and page views may be ranked #1. In other embodiments, other criteria or timeframes may be used. In some embodiments, the system may provide the percentage change in visitors or page views over a given time period, such as one month.

Movers and Shakers

Figure 3:
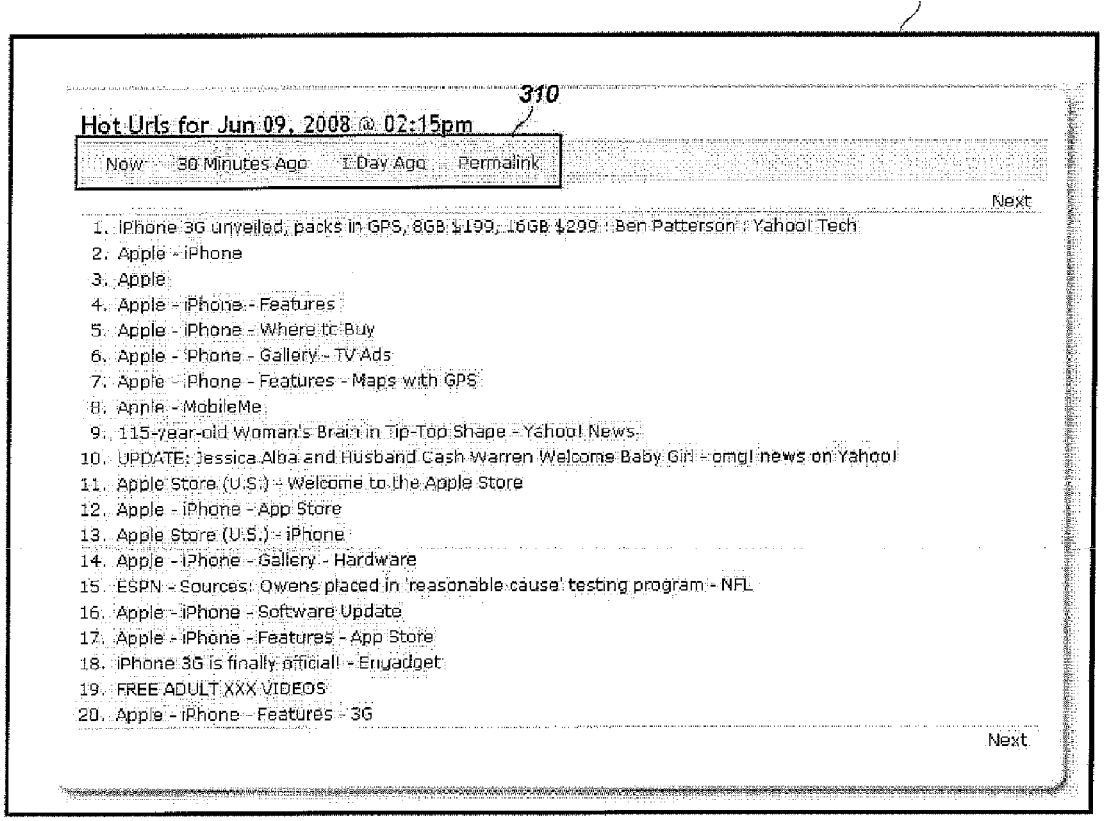
FIG. 3 a screenshot illustrating a listing of "hot" URLs based on analyzed traffic data.

As shown in FIG. 3, the web analytics system may also generate and provide information pertaining to URLs or network resources that are "hot" (potentially as opposed to "top") 300. Hot URLs may, for example, be URLs that have been accessed the most (or have seen the most growth in accesses) within a given time frame. The system may provide a list of hot URLs with respect to a selected moment in time. Available moments in time 310 may include, but are not limited to: now, 30 minutes ago, and 1 day ago. The system may also provide a "permalink" that allows a user to access, at any time in the future, the list of hot URLs provided at that moment.

Site Comparison

In any of the lists of sites or URLs, including "top" or "hot," the system may provide a link that allows a user to access a detailed report on that site or URL via an analysis tool (described below). The system may allow a user to add a listed site or URL to a list of sites or URLs to be compared by the analysis tool by clicking on a folder icon. The system may allow a user to commence comparative analysis by clicking on an "analyze" control or link after populating the list. The system may allow a user to clear the list by clicking on a "clear" control or link.

Site Analysis

Figure 4:
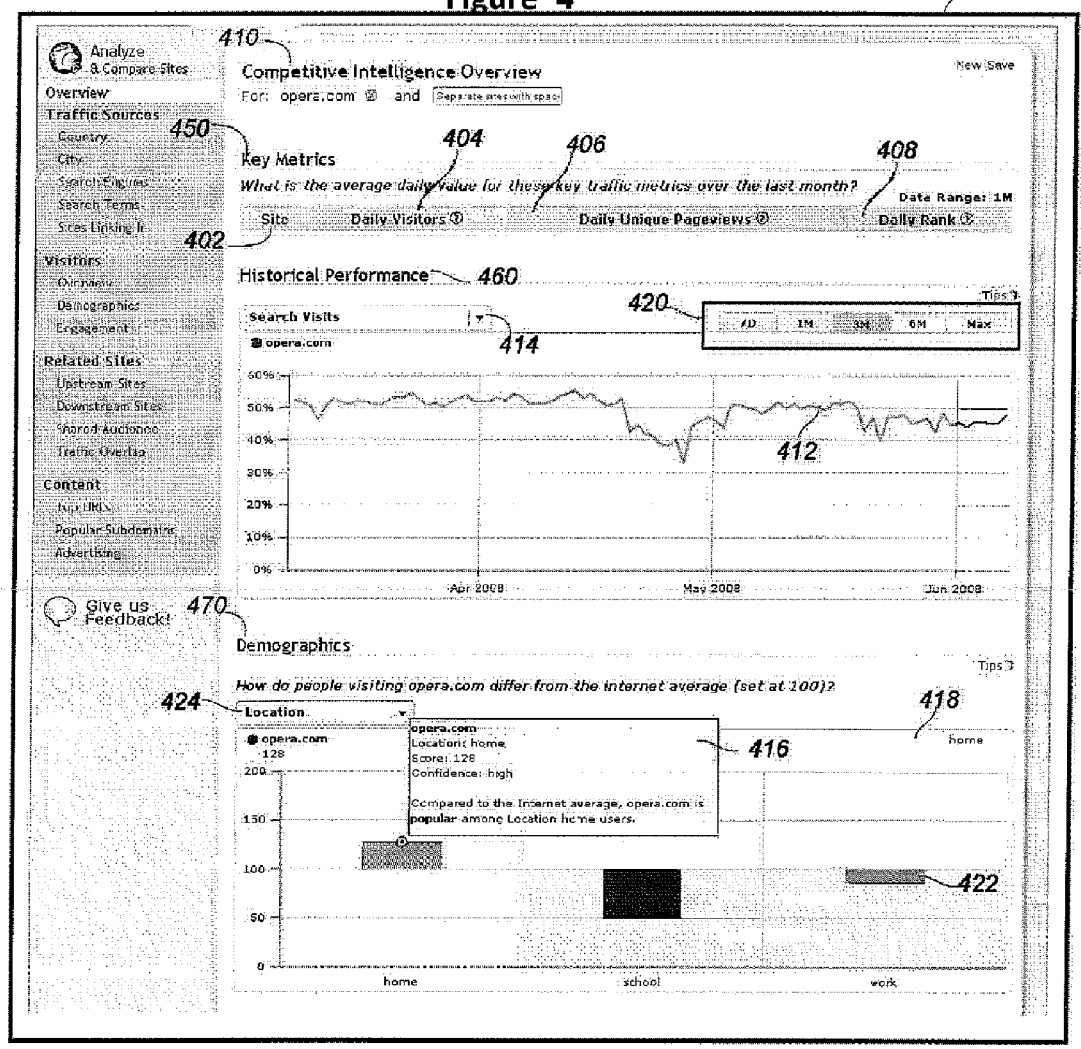
FIG. 4 is a screenshot illustrating an overview of key metrics of specified sites.

As shown in FIG. 4, the system may generate and provide information about key metrics of specified site(s). Key metrics may include, but are not limited to: number of daily visitors 404, percentage change in number of daily visitors, daily unique page views 406, percentage change in daily unique page views, daily rank 408, or absolute change in daily rank. The system may generate these values using a date range of one month or any other appropriate date/time range The system may generate and provide information about the historical performance of the specified site(s) with respect to historical metrics over a given timeframe. Historical metrics may include, but are not limited to: visitors, rank, visits, unique page views, the number of unique page views per visitor, time on site, time per page, bounce rate, or search visits. These metrics are described elsewhere in this document. Timeframes 420 may include, but are not limited to: 7 days, 1 month, 3 months, 6 months, or maximum (all data).

In the particular embodiment shown in FIG. 4, the system provides metrics 450 for the specified site or sites over time on a chart with selectable elements. In this embodiment, a user may click on tabs 420 above the chart to change the timeframe. Mousing over the site names in a legend 410 at the top of the chart highlights those sites' corresponding trend lines 412. Clicking on one site's name temporarily removes that site's data from the chart. A drop-down menu 414 on the left allows a user to select different metrics for comparison. Mousing over the chart allows a user to pinpoint data for a specific date. Data displayed next to site names in the legend reflects positions on the date corresponding to a user's mouse position; this date may appear in the upper right corner of the chart.

The system may generate and provide information 470 about the demographics of the visitors to the specified site(s). Demographic metrics may include, but are not limited to: age, children, education, ethnicity, location from which the user is browsing, income, and/or gender. In one embodiment, the system provides demographic information 470 for one or more specified sites on a graph 418 with selectable elements 422. In this embodiment, the graph may show how visitors to each site differ from the patterns observed for all sites on the Internet, which may be normalized to 100. In other words, sites that trend below 100 are under-represented and higher numbers indicate greater than average representation. Mousing over site names in a legend at the top of the chart may highlight corresponding bars. Clicking on one site's name may temporarily remove that site's data from the graph. A drop-down menu 424 to the left may allow a user to select different metrics for comparison. Mousing over the edge of a bar farthest from a baseline may produce a summary 416 of data represented by that bar. The summary data may include, but is not limited to: site name, metric, score, and confidence level.

The system may also generate and provide an overview of one or more specified websites that may or may not have previously been analyzed. The overview 400 may include, but is not limited to: key metrics 450, historical performance 460, and demographics 470.

Traffic Sources

Figure 5A:
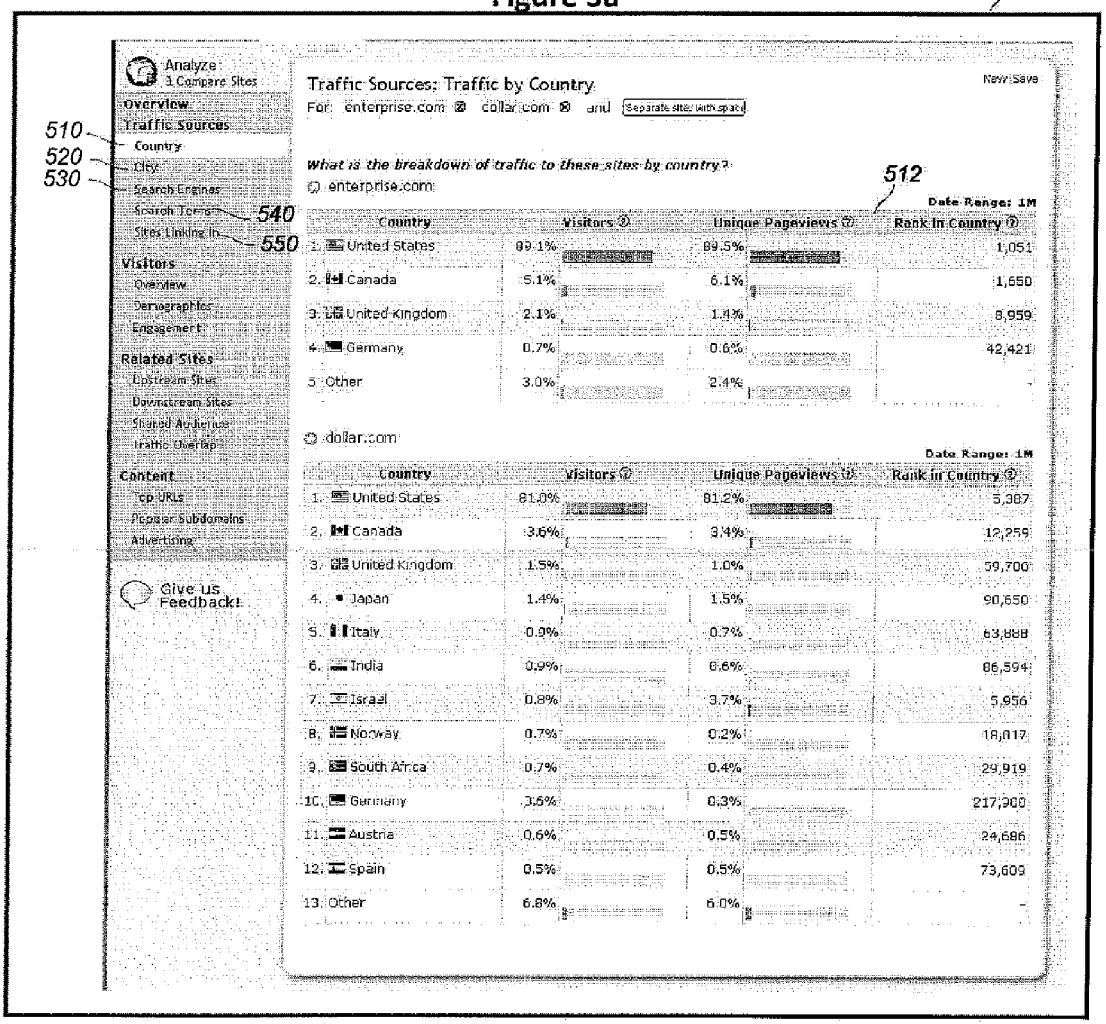
FIGS. 5a-b are screenshots illustrating displays of information about traffic sources for various sites.

For a specified site, the system may generate and provide information about the sources of traffic to the site(s). As shown in FIG. 5a, traffic source information 500 may include, but is not limited to: country of origin 510, city or metropolitan area of origin 520, search engine sources 530, search terms 540, or referring sites 550.

For example, for each specified site, the system may generate and provide information about the breakdown of traffic to the site(s) by country of origin 510. In one embodiment, the system may generate and provide a table 512 for each site listing each country, the number of visitors from that country as a percentage of the total over the past month, the number of unique page views from that country as a percentage of the total over the past month, and the rank of the site among the Internet audience of that country. In other embodiments, the system may include non-unique page views, use different timeframes, or include other information. In one embodiment, the system may generate and provide a map depicting some or all of the countries listed. The map may display relevant information when a user mouses over the depiction of a country. The map may allow navigational functions such as, but not limited to, zoom, drag, up, down, left, right, or home.

The system may also generate and provide information about the percentage of visitors who came from a search engine 530 during a given timeframe. Timeframes may include, but are not limited to: 7 days, 1 month, 3 months, 6 months, or maximum (all data). In one embodiment (not shown), the system may provide search engine referral information for all specified sites over time on a chart with selectable elements. In this embodiment (not shown), a user may use tabs above the chart to change the timeframe. Mousing over site names in a legend at the top of the chart may highlight their corresponding trend-lines. Clicking on one site's name may temporarily remove that site's data from the chart. Mousing over the chart may allow a user to pinpoint search traffic data for a specific date. The data displayed by site names in the legend may reflect the percentage of search traffic on the date corresponding to a user's mouse position. This date may appear in a corner of the chart. In another embodiment, the system may generate and provide a table for each site listing the percent of visits that were preceded by a search engine query over each timeframe, and the percentage change from the last time period. In other embodiments, other timeframes may be used, or search engine referred visits may be provided as an absolute number instead of a percentage.

The system may also generate and provide information about which search terms drive traffic to the site(s) 540. In one embodiment (not shown), the system generates and provides a table for each site listing the search terms that sent traffic to the site and the percentage of all the search term visits sent by that one search term. In other embodiments, the system may provide absolute numbers instead of percentages, or may calculate percentages based on all visits instead of only search term visits.

Figure 5B:
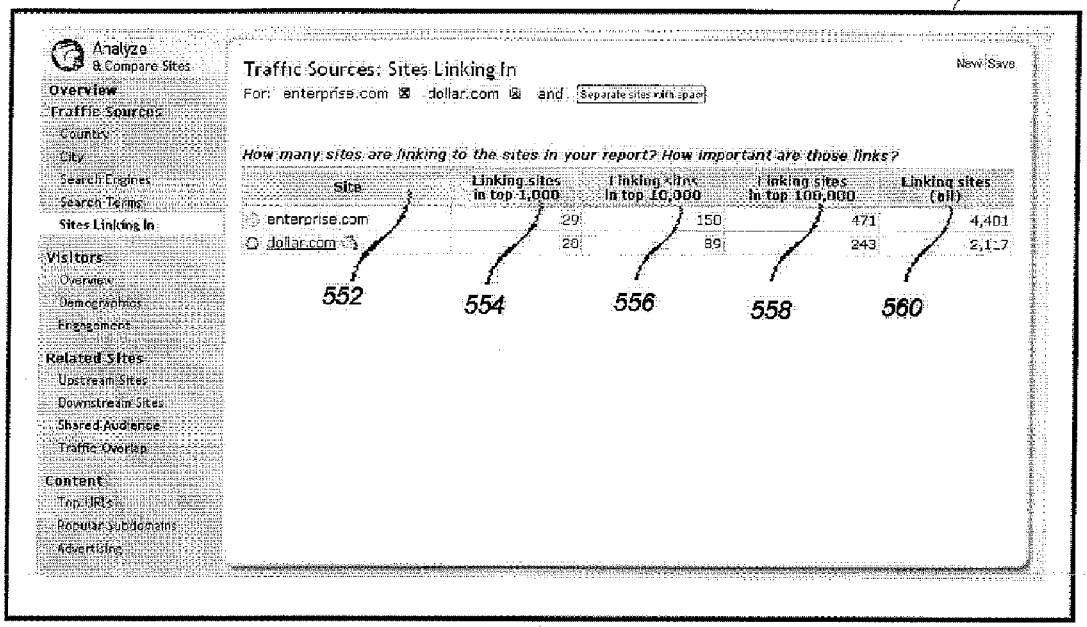

As shown in FIG. 5b, the system may also generate and provide information about how many sites are linking to the site(s) 550. In one embodiment, the system may generate and provide a table for each site 552 listing the number of linking sites by ranking group. In this embodiment, the system may use the following ranking groups: top 1 k 554, top 10 k 556, top 100 k 558, or all sites 560. In other embodiments, other ranking groups may be used, or the table may be organized by another metric.

Visitors

Figure 6A:
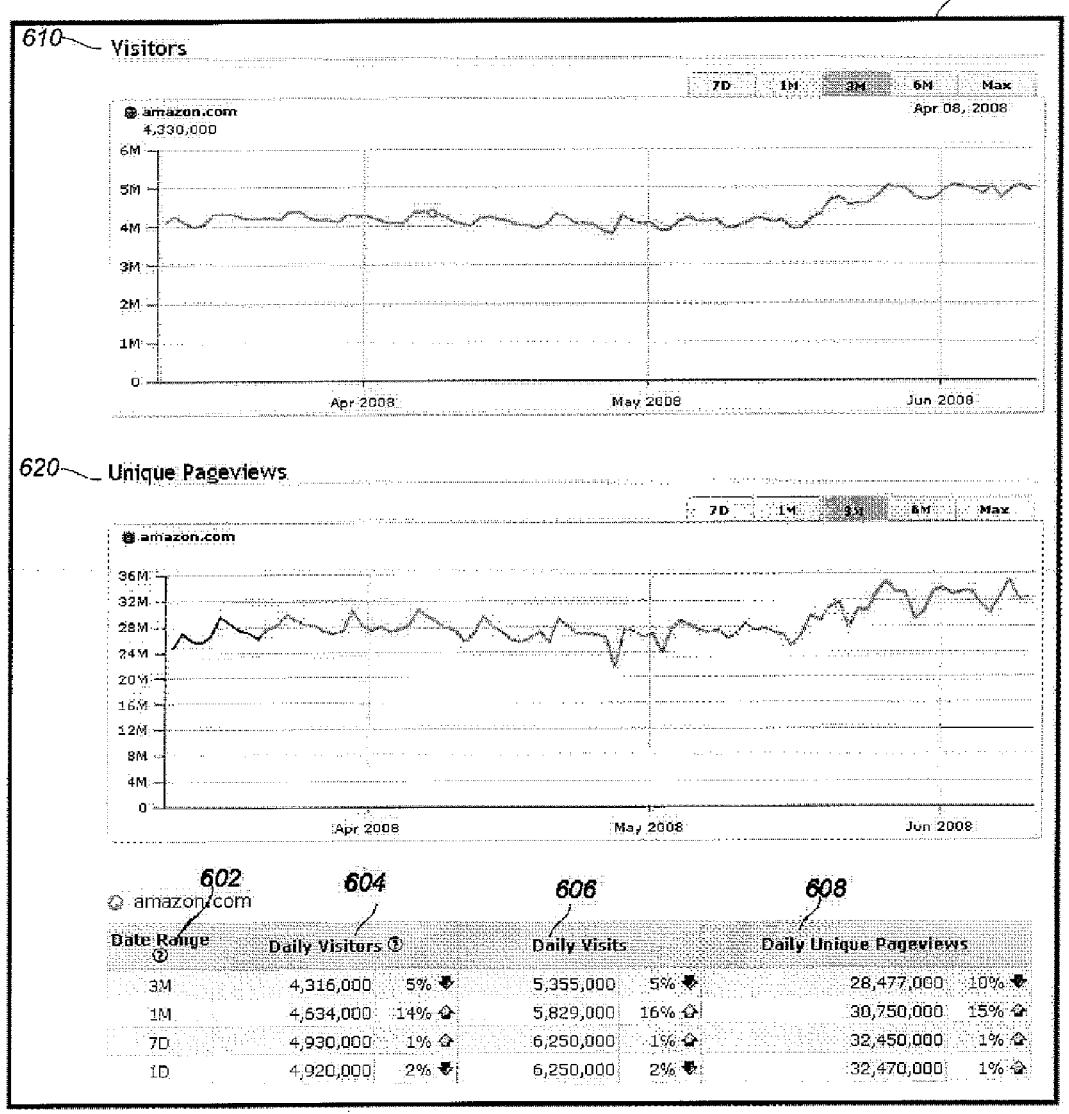
FIG. 6a is a screenshot illustrating a display of information about visitors and pageviews for various sites

As shown in FIG. 6a, for one or more specified sites, the system may generate and provide information about the visitors to the site(s). Visitor information may include, but is not limited to: number of visitors, demographics, and engagement.

The system may generate and provide a general overview about the visitors to the site(s). This overview may include information about how much traffic each site is receiving over a given timeframe. Timeframes may include, but are not limited to: 7 days, 1 month, 3 months, 6 months, and maximum (all data).

The system may also generate and provide information about the number of visitors to the specified site(s) with respect to visitor metrics over a given timeframe 600. Visitor metrics may include, but are not limited to: the number of visits 606, the number of visitors 604, the number of page views, or the number of unique page views 608. Timeframes 602 may include, but are not limited to: 7 days, 1 month, 3 months, 6 months, or maximum (all data).

In the particular embodiment depicted in FIG. 6a, the system provides metrics for the specified sites over time on charts 610 and 620 with selectable elements. In this embodiment, a user may click on tabs above the chart to change the timeframe. Mousing over the site names in a legend at the top of the chart highlights those sites' corresponding trend-lines. Clicking on one site's name temporarily remove that site's data from the chart. A drop-down menu on the left allows a user to select different metrics for comparison. Mousing over the chart allows a user to pinpoint data for a specific date. Data displayed next to site names in the legend reflects positions on the date corresponding to a user's mouse position; this date may appear in the upper right corner of the chart. In another embodiment, the system may generate and provide a table for each site listing the value of each metric over each timeframe, and the percentage change from the last time period. In other embodiments, other timeframes may be used, or changes over time may be provided as absolute numbers instead of percentages.

Figure 6B:
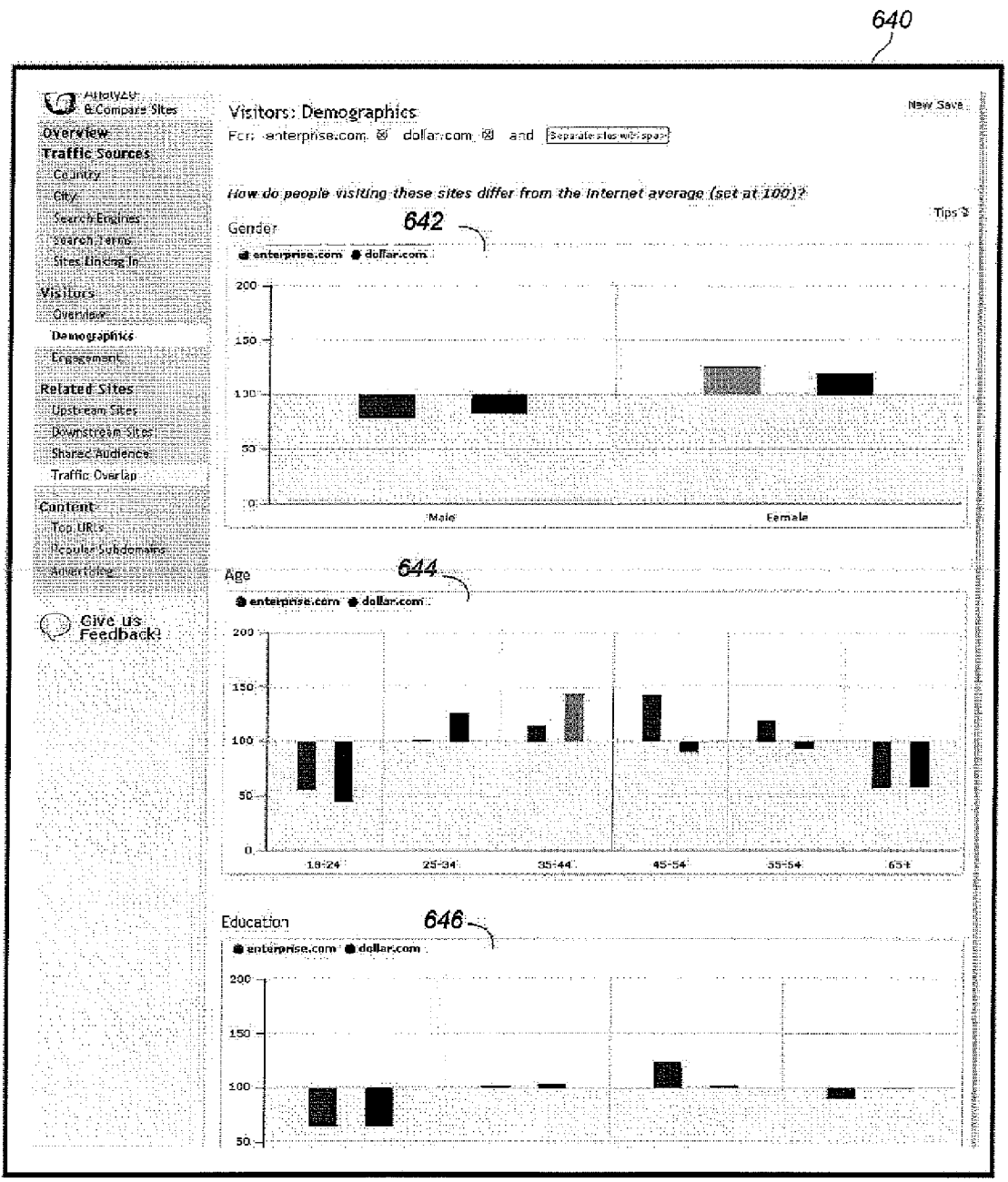
FIG. 6b is a screenshot illustrating a display of information about the demographics of the visitors to particular sites.

As shown in FIG. 6b, the system may also generate and provide information 640 about the demographics of the visitors to the specified site(s). Demographic metrics may include, but are not limited to: age 644, children, education 646, ethnicity, location from which the user is browsing, income, and/or gender 642. In the particular embodiment depicted in FIG. 6b, the system provides demographic information for all specified sites on multiple graphs with selectable elements. In this embodiment, each metric is represented by a respective graph showing the value of that metric for each specified site side-by-side. Each chart may show how visitors to the site(s) differ from the patterns observed for all sites on the Internet, which may be normalized to 100. Mousing over site names in a legend at the top of the chart highlights corresponding bars. Clicking on one site's name temporarily removes that site's data from the chart. Mousing over the edge of a bar farthest from a baseline produces a summary of the data represented by that bar. Such data may include, but is not limited to: site name, metric, score, or confidence level.

Figure 6C:
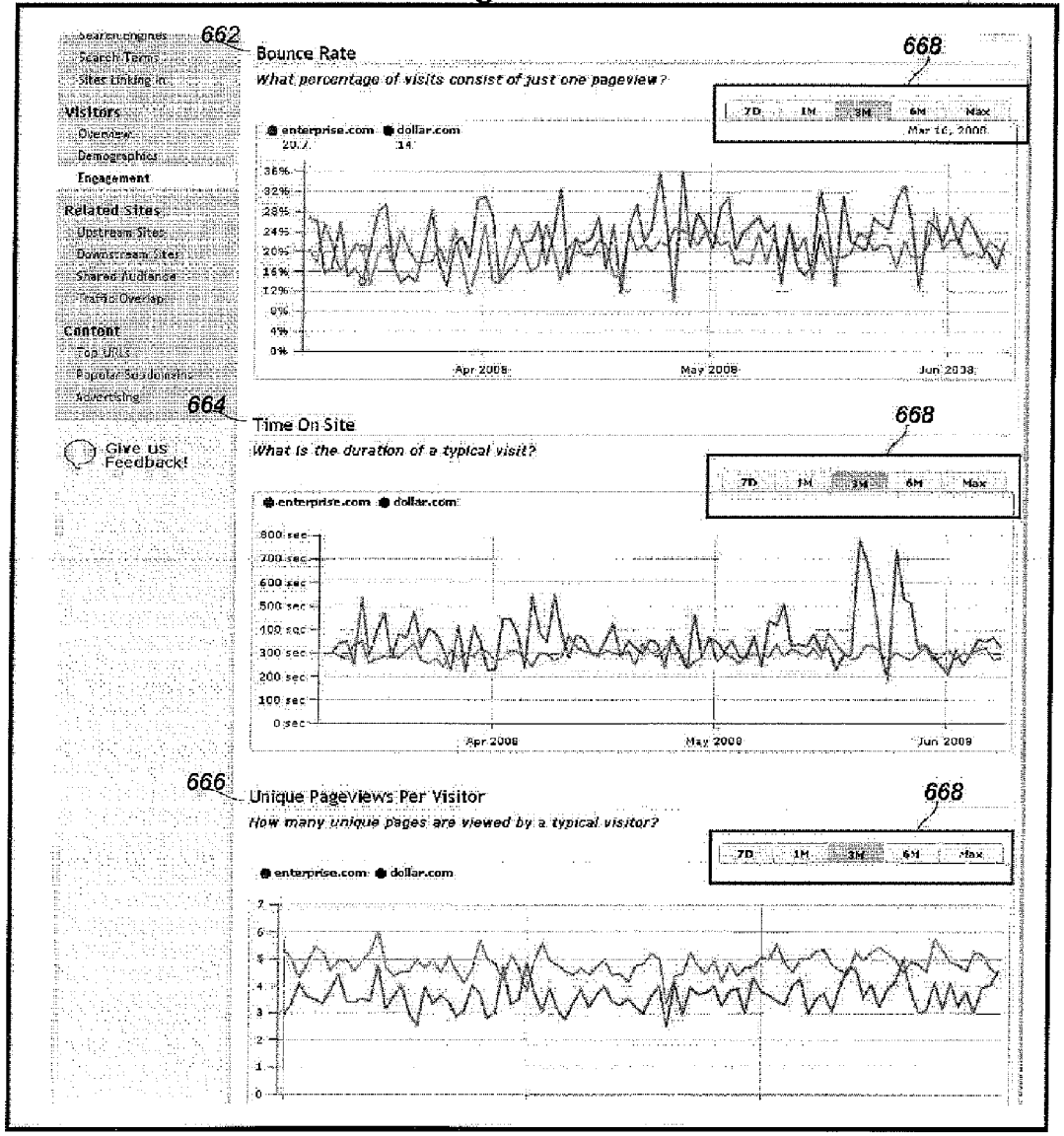
FIG. 6c is a screenshot illustrating a display of information about visitor engagement with various sites.

As shown in FIG. 6c, the system may also generate and provide information 660 about the "engagement" of the visitors to specified site(s) over a given timeframe. Engagement metrics may include, but are not limited to: bounce-rate 662, time-on-site 664, or unique page views per visit 666. The bounce-rate metric may represent the percentage of visits that consist of just one page view. The time-on-site metric may represent the average time spent by a visitor per day. The unique page views per visit metric may represent the number of unique pages that are viewed by a typical visitor. Timeframes 668 may include, but are not limited to: 7 days, 1 month, 3 months, 6 months, or maximum (all data).

In the particular embodiment depicted in FIG. 6c, the system provides engagement information for all specified sites on multiple graphs with selectable elements. In this embodiment, each metric is represented by a respective graph showing the value of that metric for each specified site side-by-side. A user may use tabs above the chart to change the timeframe. Mousing over site names in a legend at the top of the chart highlights corresponding trend lines. Clicking on one site's name temporarily removes that site's data from the chart. Mousing over the chart may allow a user to pinpoint engagement data for a specific date. Data displayed by site names in the legend reflects the data on the date corresponding to a user's mouse position. This date may appear in the upper right corner of the chart. In another embodiment, the system may generate and provide a table for each site listing the value of each metric over each timeframe, and the percentage change from the last time period. In other embodiments, other timeframes may be used, or changes over time may be provided as absolute numbers instead of percentages.

Related Sites

For a specified site, the system may generate and provide information about related sites. As shown in FIGS. 7a-d, related site information may include, but is not limited to: upstream sites 710, downstream sites 700, shared audiences 720, and traffic overlap 730.

Figure 7A:
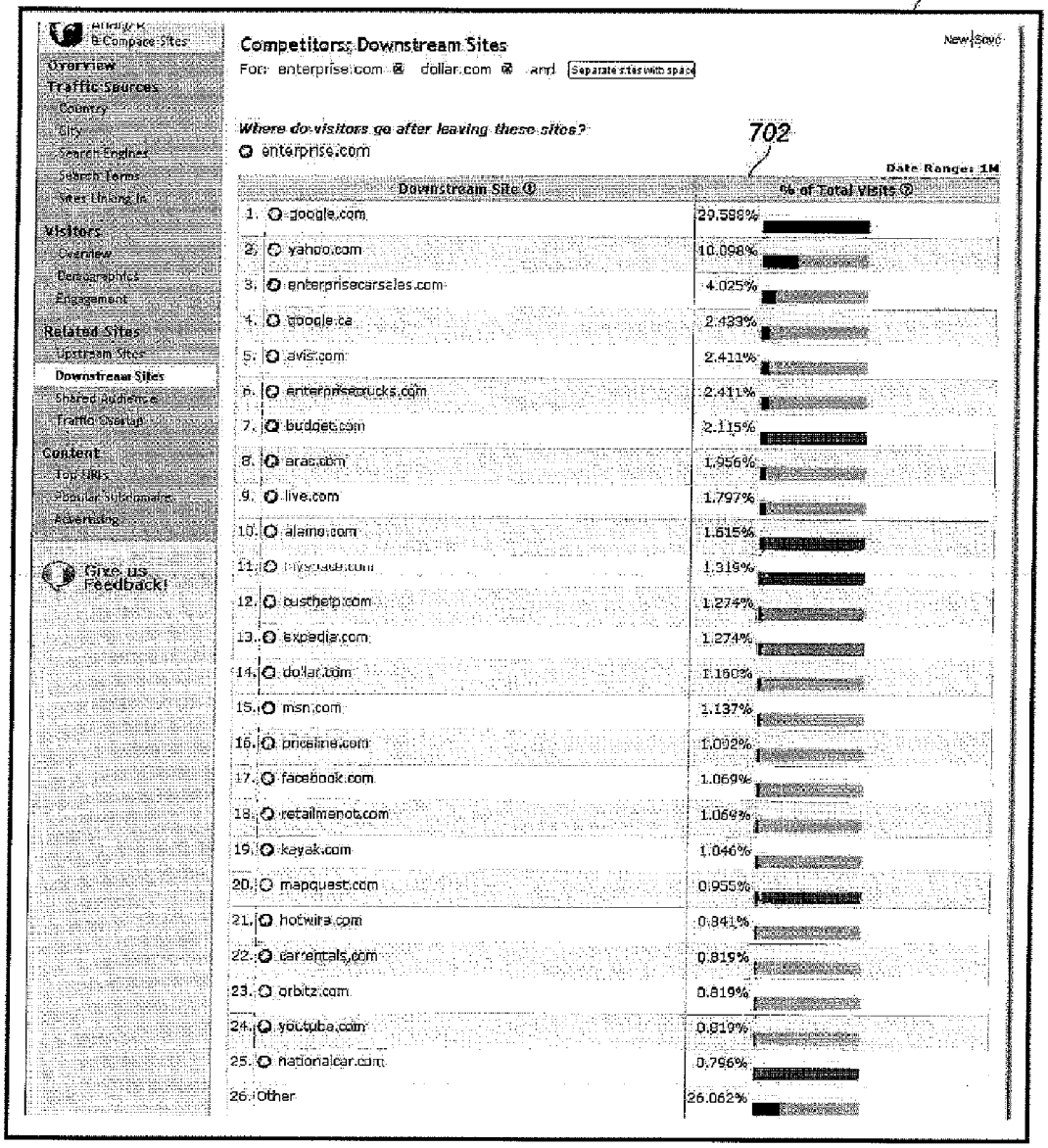
FIGS. 7a-d are screenshots illustrating displays of information about behavioral relationships between particular sites.

With reference to FIG. 7a, the system may also generate and provide information 700 about downstream sites. In one embodiment, downstream sites are sites that were visited by a user immediately after the specified site(s). While downstream sites may be those immediately following visits to the specified site(s) during a browsing session, they may not necessarily be referring sites to the downstream site. A visitor may have typed an address into a web browser address bar to move from one site to the next instead of following a link. In some embodiments, the system may generate and provide graphs and tables 702 pertaining to downstream sites visited by a user in a manner similar to that described above, such as the names of particular downstream sites, the percentage of total visits to the specified site(s) for which the particular downstream site was subsequently visited. The graphs and tables 702 may be ordered by the percentage or other factor.

Figure 7B:
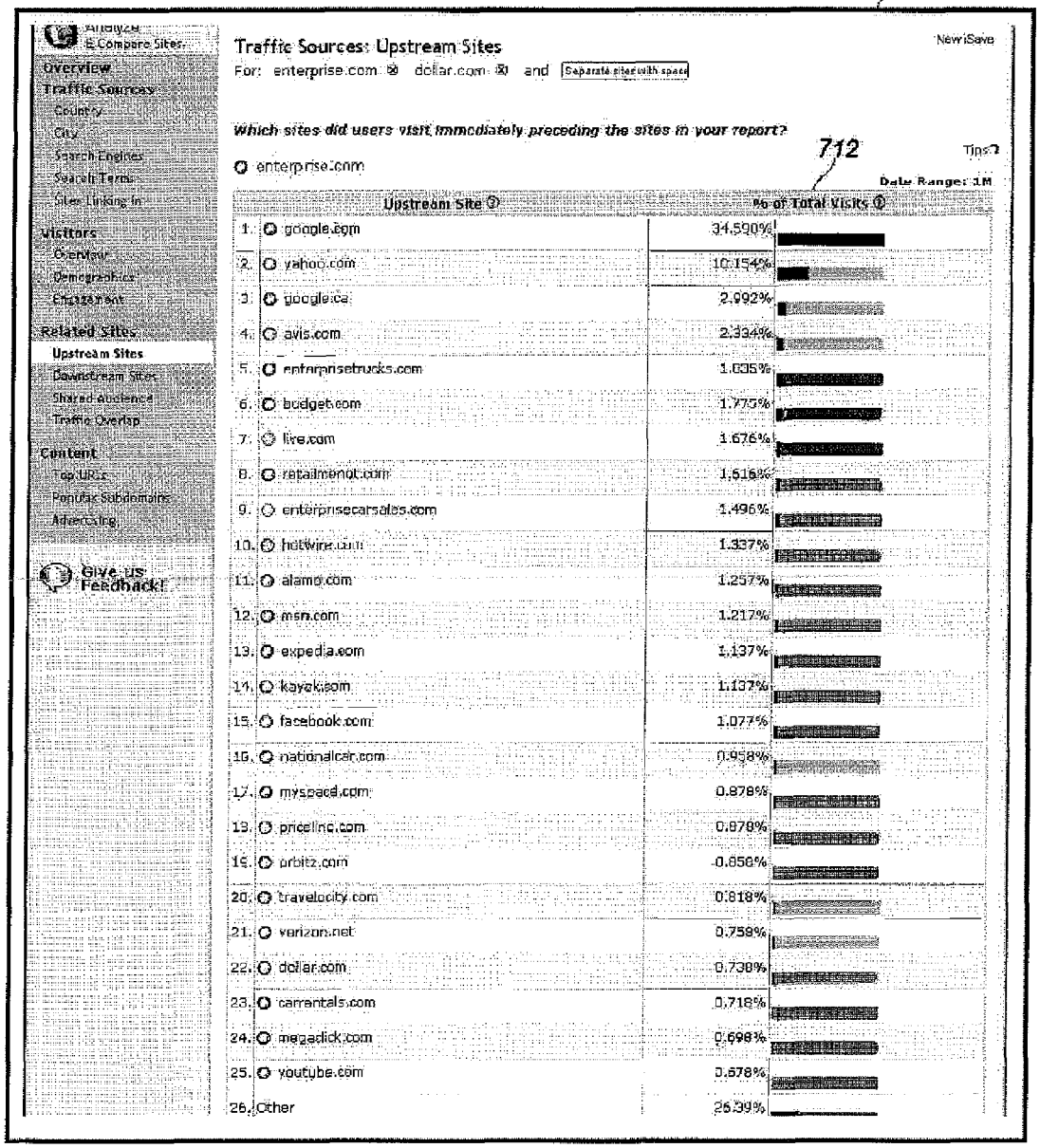

With reference to FIG. 7b, for each specified site, the system may generate and provide information 710 about upstream sites. In one embodiment, upstream sites are sites visited immediately before the specified site(s). While upstream sites may be those immediately preceding visits to the specified site(s) during a browsing session, they may not necessarily be referring sites. A visitor may have typed an address into a web browser address bar to move from one site to the next instead of following a link. In some embodiments, the system may generate and provide graphs and tables 712 pertaining to upstream sites 700 visited by in a manner similar to that described above, such as the names of particular upstream sites, the percentage of total visits to the specified site(s) for which the particular upstream site was subsequently visited. The graphs and tables 712 may be ordered by the percentage or other factor.

Figure 7C:
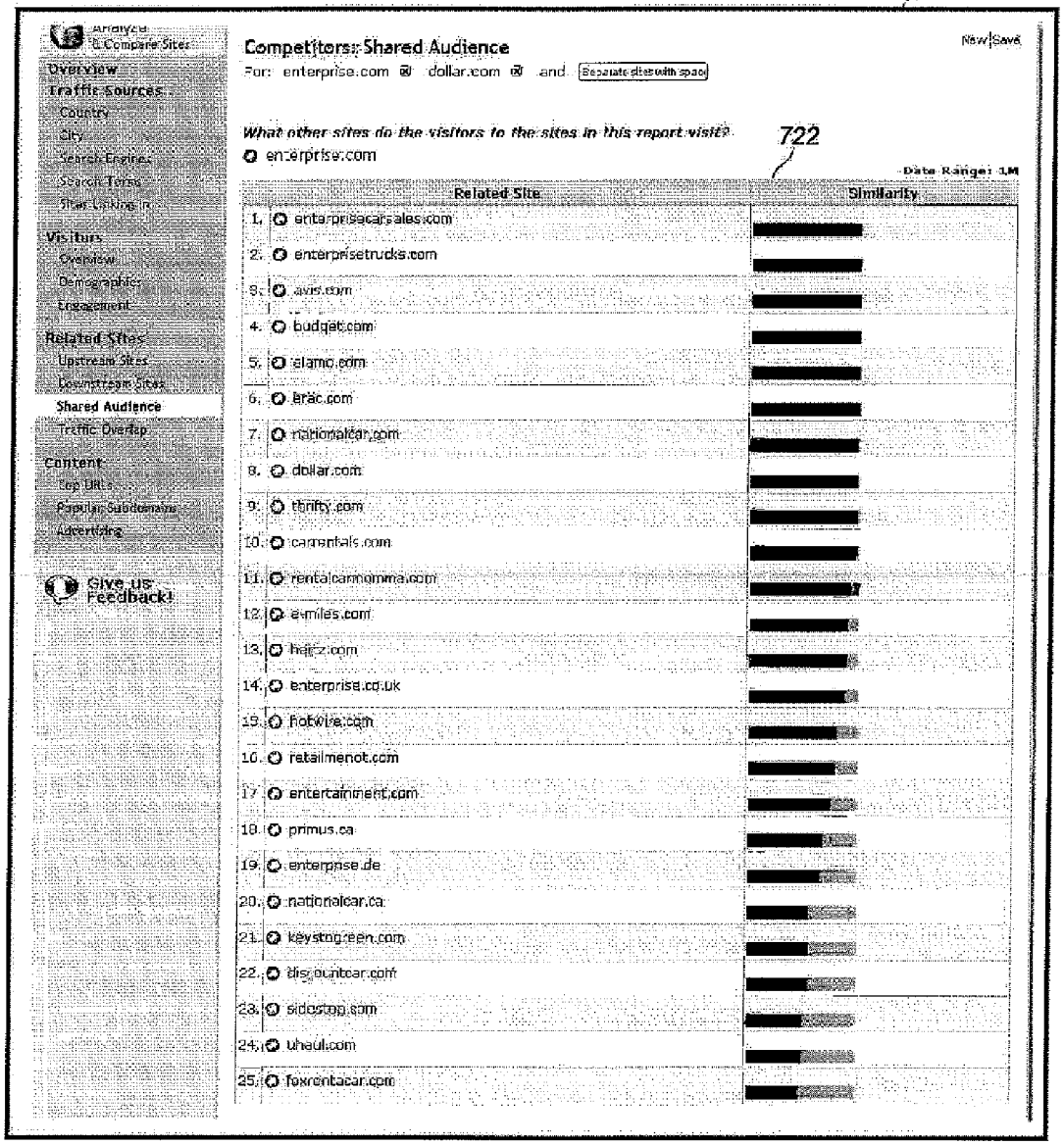

With reference to FIG. 7c, the system may also generate and provide information 720 about shared audiences. In one embodiment, the system may generate and provide a table 722 listing each specified site twice: once in the top row and once in the leftmost column. Remaining table cells may therefore have a specified site name in its column heading (Site 1) and another specified site name in its row heading (Site 2). Remaining table cells may display the percentage of visitors to Site 1 who also visited Site 2. A user may be able to roll over each cell for more information. In one embodiment, rolling over a cell causes the system to display a Venn diagram depicting the traffic overlap represented by that cell or a text description of the data. An example of such a Venn diagram is shown in FIG. 7d.

Figure 7D:
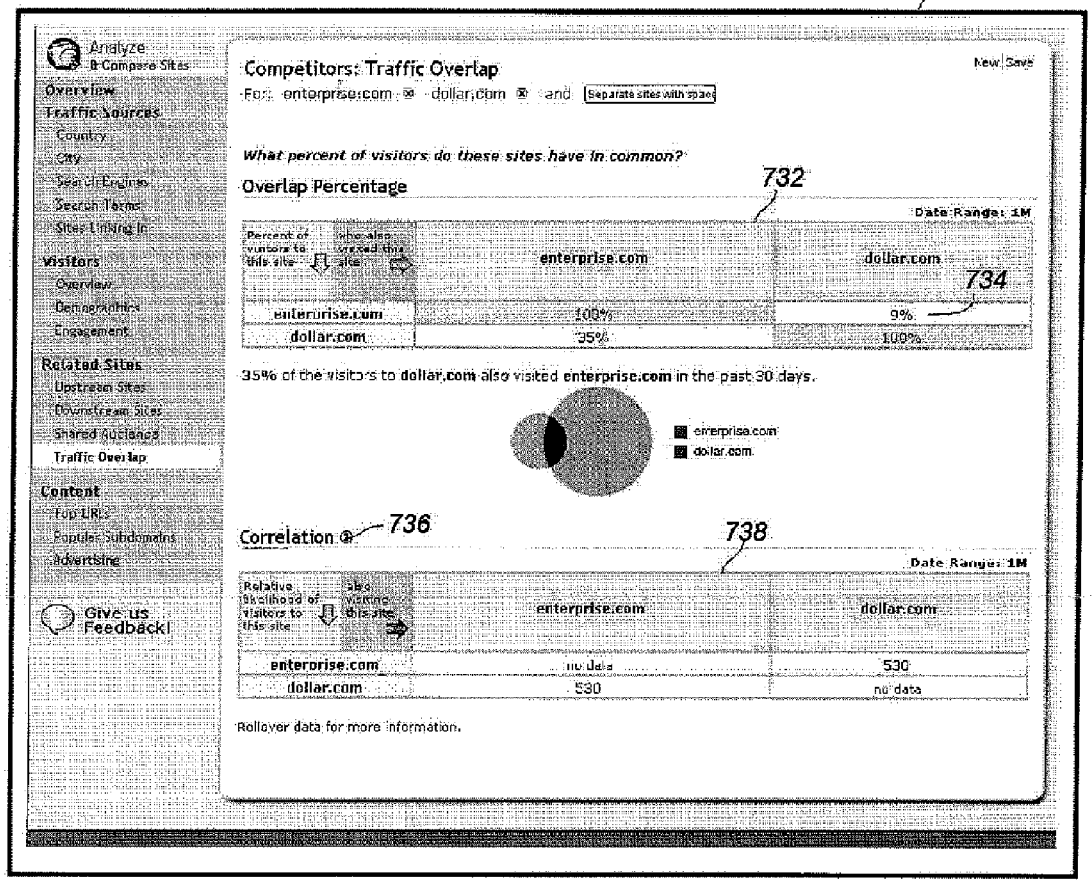

With reference to FIG. 7d, the system may also generate and provide information 730 about traffic overlap or correlation. In the particular embodiment shown in FIG. 7d, the system generates and provide a table 732 listing each specified site twice: once in the top row and once in the leftmost column. Each data cell of the table therefore may have a specified site name in its column heading (Site 1) and another specified site name in its row heading (Site 2). Each data cell displays a value 734 representing the likelihood of visitors to Site 1 also visiting Site 2. A user may roll over each cell for more information. In one embodiment, rolling over a cell creates a text description of the data and includes an indication of statistical confidence. Correlation information 736 may also be generated and presented in the form of a table 738, and may represent the relative likelihood that a visitor who visits a first site (as may be represented on the y-axis) may also visit various other sites (represented on the x-axis).

Examples of methods that may be used to identify related sites and links are described in U.S. Pat. No. 6,691,163, issued Feb. 10, 2004, entitled "Use of web usage trail data to identify related links," the disclosure of which is hereby incorporated by reference.

Content

For each specified site, the system may generate and provide information about the content of the site(s). Content information may include, but is not limited to: top URLs, popular subdomains, and advertising.

For example, as shown in FIG. 8a, the system may generate and provide information 800 about the most popular pages on that site. In some embodiments, the system may generate and provide graphs and tables 810 pertaining to popular pages in a manner similar to that described above.

Figure 8B:
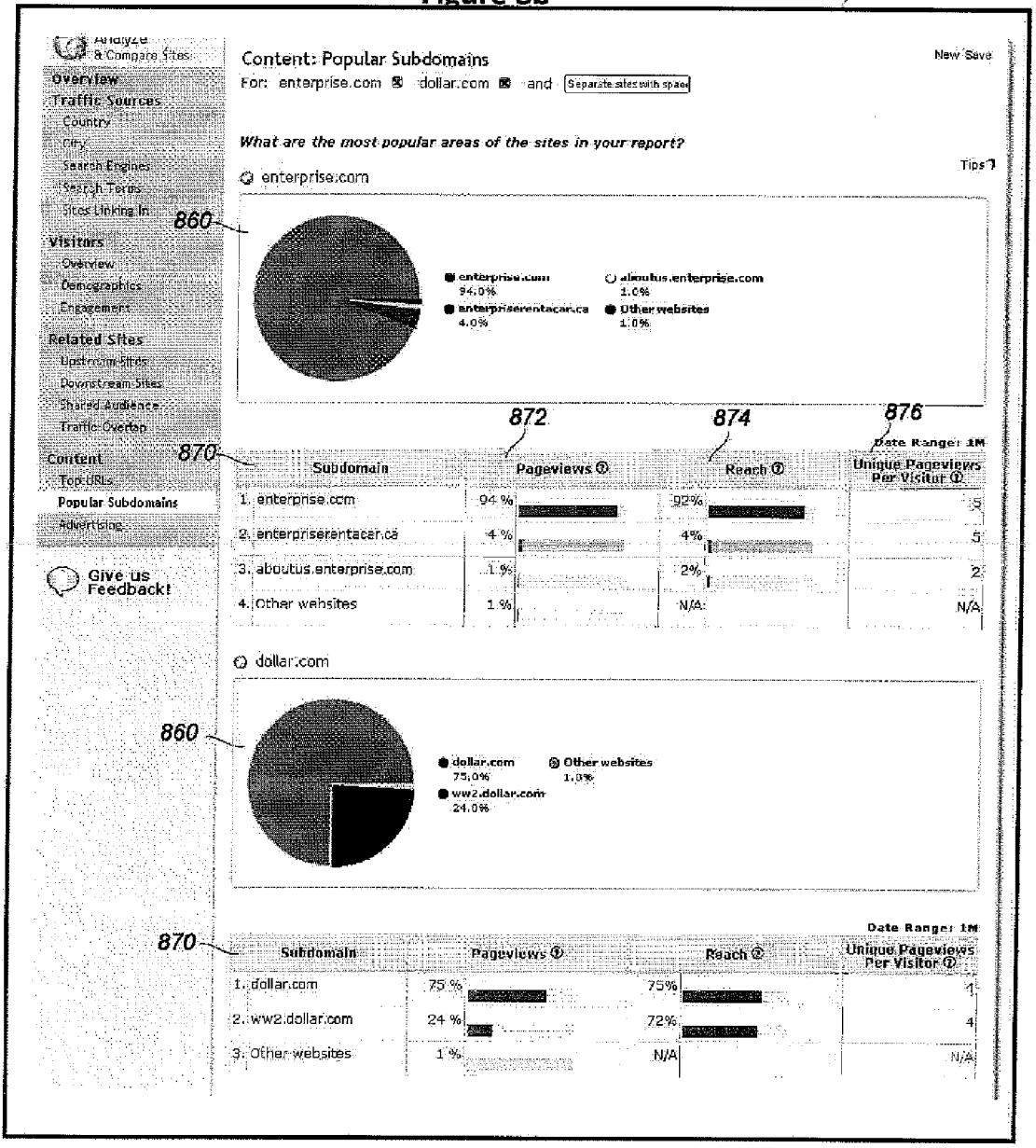

As shown in FIG. 8b, the system may also generate and provide information 850 about the most popular subdomains on that site. In some embodiments, the system may generate and provide graphs 860 and tables 870 pertaining to popular subdomains and metrics in a manner similar to that described above. Popular subdomain metrics may include, but are not limited to: the percentage 872 of overall page views attributed to each subdomain over the past month, the percentage 874 of overall visitors attributed to each subdomain over the past month, and/or the number 876 of unique pages 876 viewed on each subdomain per visitor per day, averaged over the past month. In other embodiments, absolute values may be used instead of percentages or values may be averaged over different timeframes.

The system may also generate and provide information about the advertising networks the site belongs to. In some embodiments, the system may generate and provide graphs and tables pertaining to advertising networks.

Optimization of Websites

As referenced in FIG. 9, the system may provide an overview 900 of a site's performance across a set of search engine optimization metrics. Search engine optimization metrics may include, but are not limited to: crawl coverage, reputation, page optimization, keywords, and/or statistics. The system may provide an overall letter grade (e.g. A, B, C, D, or F) or a numerical score (e.g. 90 out of 100) 910. The system may provide a report card that breaks down the overall grade or score into individual grades or scores for each metric. The system may provide an overview of the top recommendations made across all metrics. The top recommendations may be those that, if followed, will have the greatest impact on the grade or score, those that are easiest to fix, or may be based on some other criteria. Implementing the recommendations may boost a site's search engine placement and may improve a site's usability.

Crawl Coverage

Figure 10A:
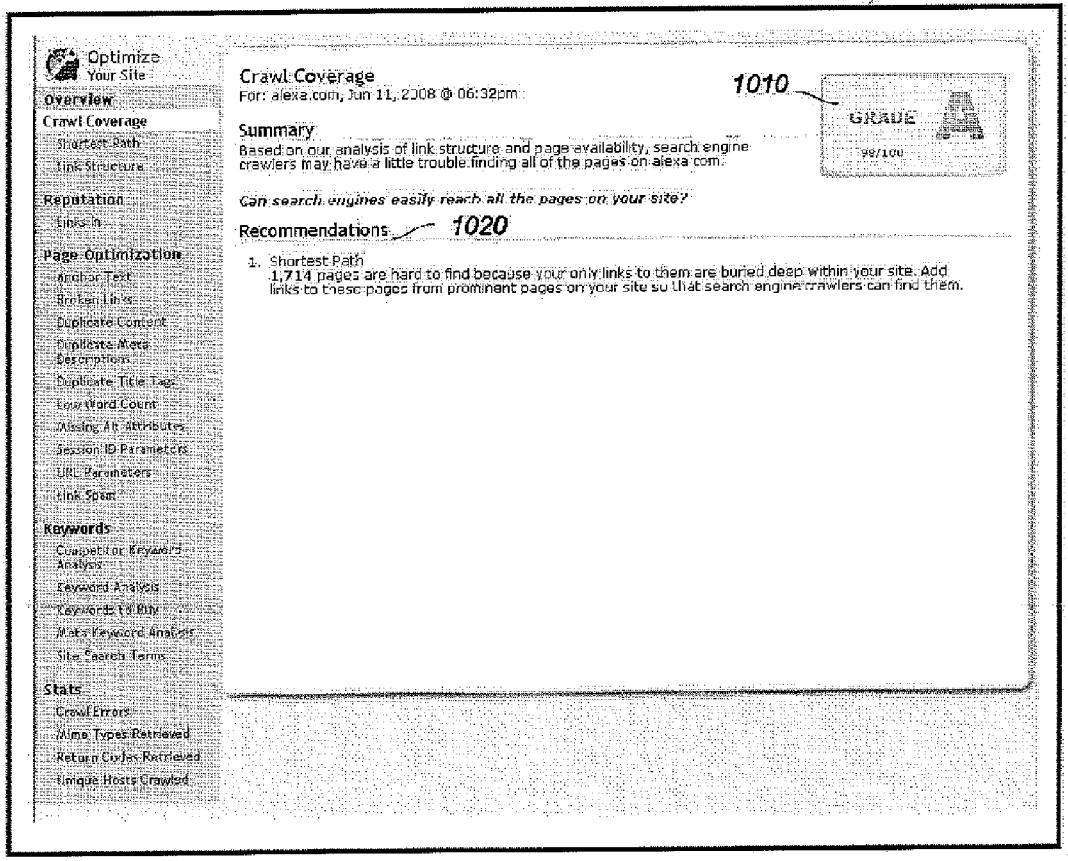
FIGS. 10a-c are screenshots illustrating, in further detail, the results and recommendations associated with the analysis depicted in FIG. 9.

As referenced in FIG. 10a, the system may generate and provide information about how easily search engines can reach all the pages on a site. The system may provide an overview of the crawl coverage 1000 metric 1000 along with a letter grade or numerical score 1010 for the metric. The system may also provide one or more recommendations 1020 for improving the grade or score provided. The crawl coverage grade or score may be influenced by the following sub-metrics: shortest path or link structure. This list is not exhaustive, however, and other sub-metrics may be used.

Figure 10B:
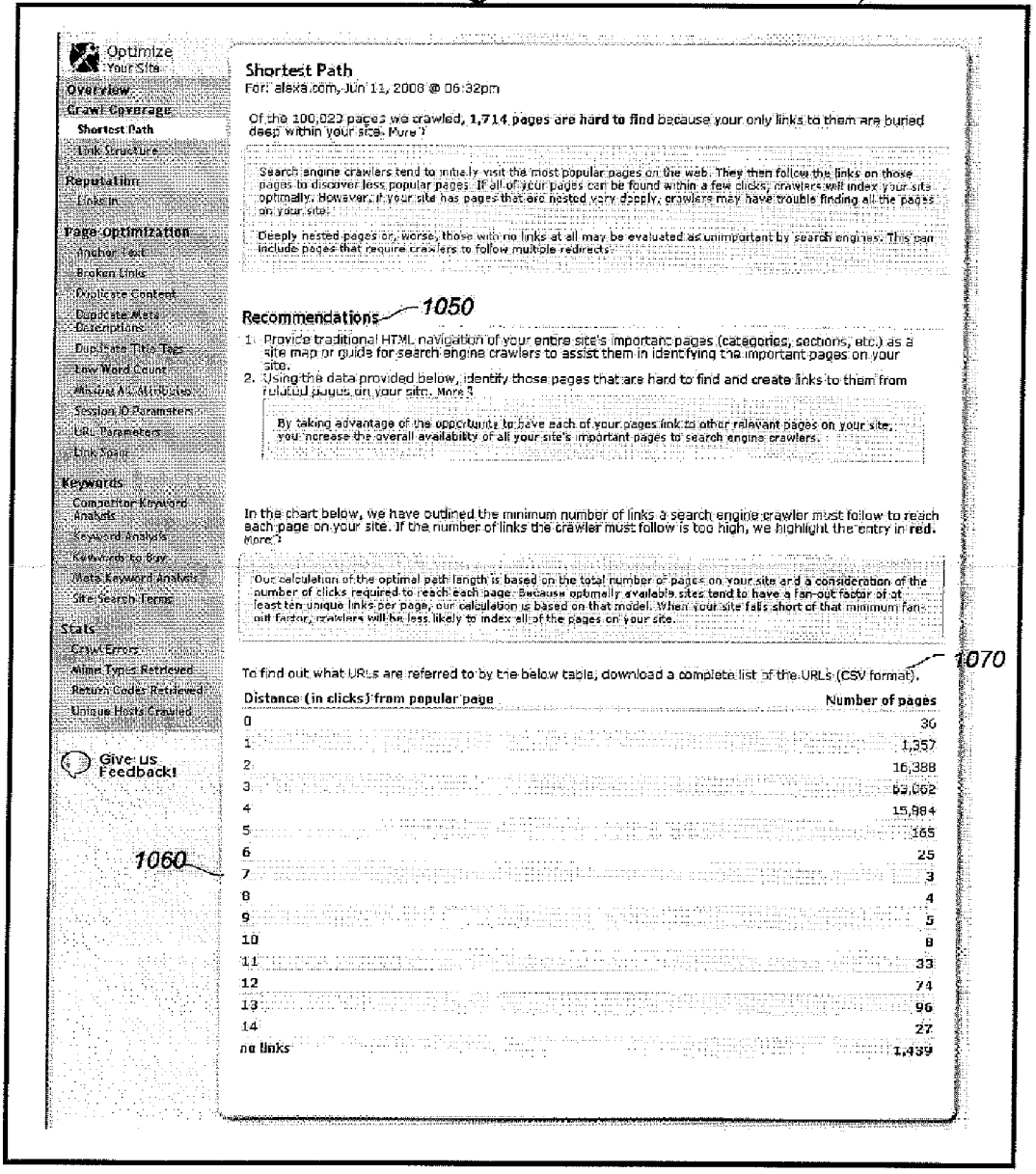

As shown in FIG. 10b, the system may also generate and provide information 1040 about pages that are hard to find because the only links to them are deep within the website hierarchy. The system may provide an assessment of how difficult a site (or a page on a site) is to navigate to (or from) in view of the site's organizational structure. The system may provide recommendations 1050 to reduce the number of hard-to-find pages.

In the embodiment depicted in FIG. 10b, the system provides data 1070 showing the minimum number of links a search engine crawler must follow to reach each page on the site. If the number of links the crawler must follow is too high, the number is highlighted in red. (Those with a distance of six or higher are shown in red in the screenshot depicted in FIG. 10b.) In one embodiment, a calculation of the optimal path length is based on the total number of pages on a site and a consideration of the number of clicks required to reach each page. Because optimally available sites may tend to have a fan-out factor of at least ten unique links per page, the calculation may be based on that model. When a site falls short of that minimum fan-out factor, crawlers may be less likely to index all of the pages on a site. In the embodiment of FIG. 10b, the table 1060 also shows the number of pages that share the same distance (in clicks) from a popular page. The system may include a link 1070 to a complete list of analyzed URLs along with metrics associated with those URLs.

Figure 10C:
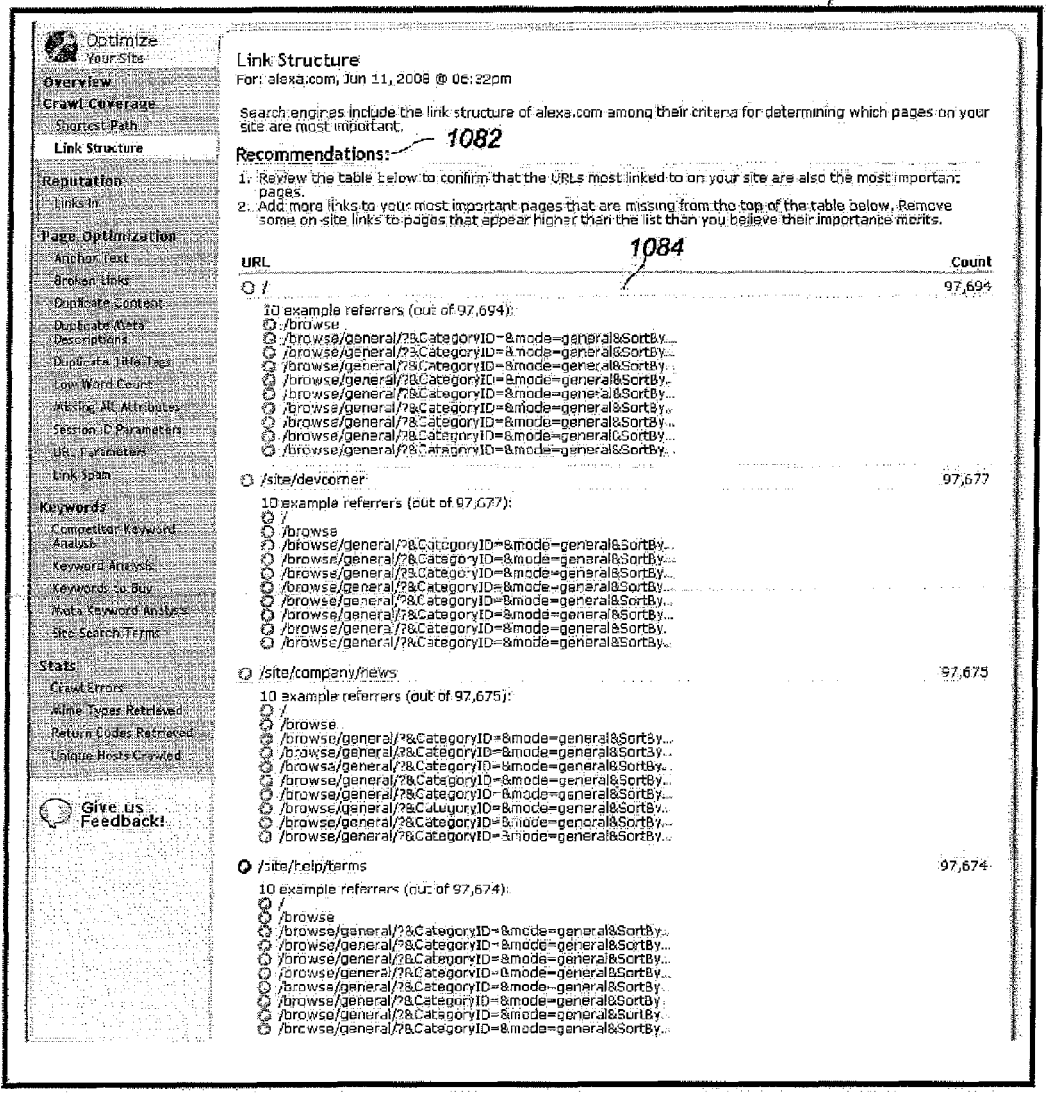

As depicted in FIG. 10c, the system may also generate and provide information 1080 about the link structure of a website. As illustrated, this information may include one or more of the following: recommendations 1082 for improving the site's link structure in order to optimize search engine scores; a table 1084 showing the number or referring URLs for each URL analyzed; links to examples of such referring URLs.

Reputation

Figure 11A:
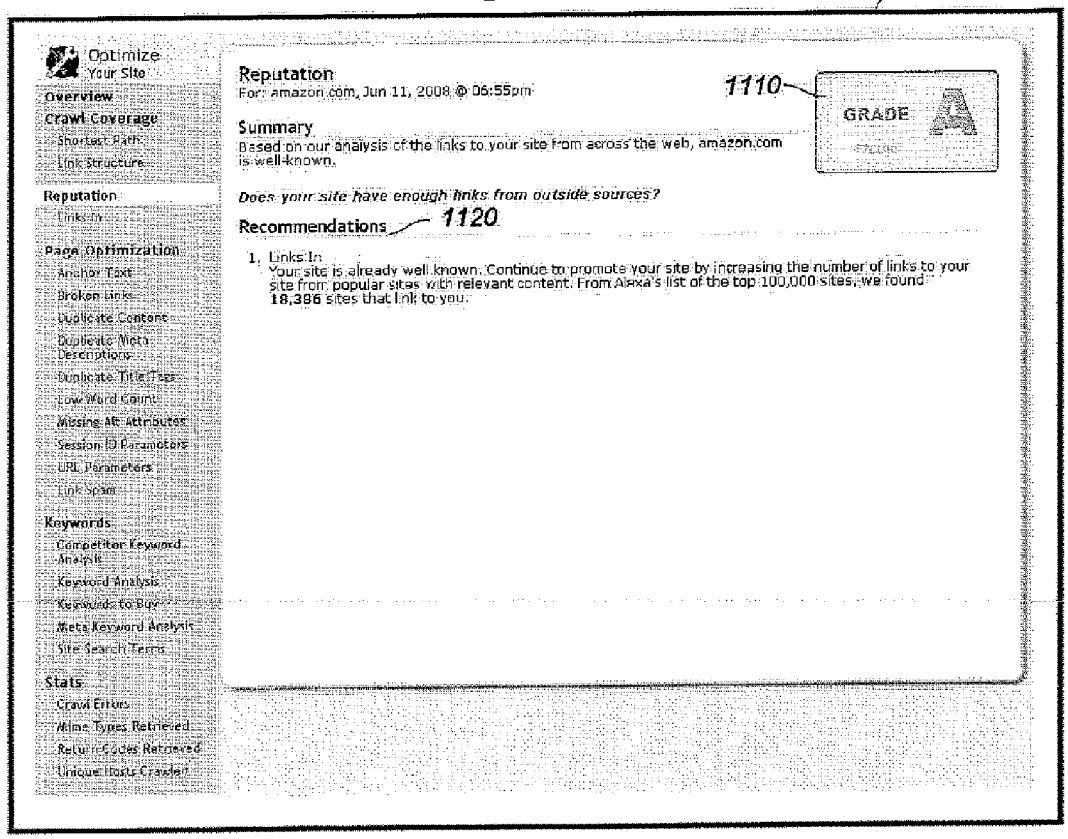
FIGS. 11a-b are screenshots illustrating displays of information about the "reputation" of a site in terms of the quality and number of inbound links.

As shown in FIG. 11a, the system may generate and provide information 1100 about how "well-known" or "regarded" a website is. The system may provide an overview of the reputation metric along with a letter grade or numerical score 1110 for the metric. The system may also provide one or more recommendations 1120 for improving the grade or score provided. The reputation grade or score may be influenced by the number of links-in, the quality of the referring sites or pages associated with these links in, and/or other criteria.

Figure 11B:
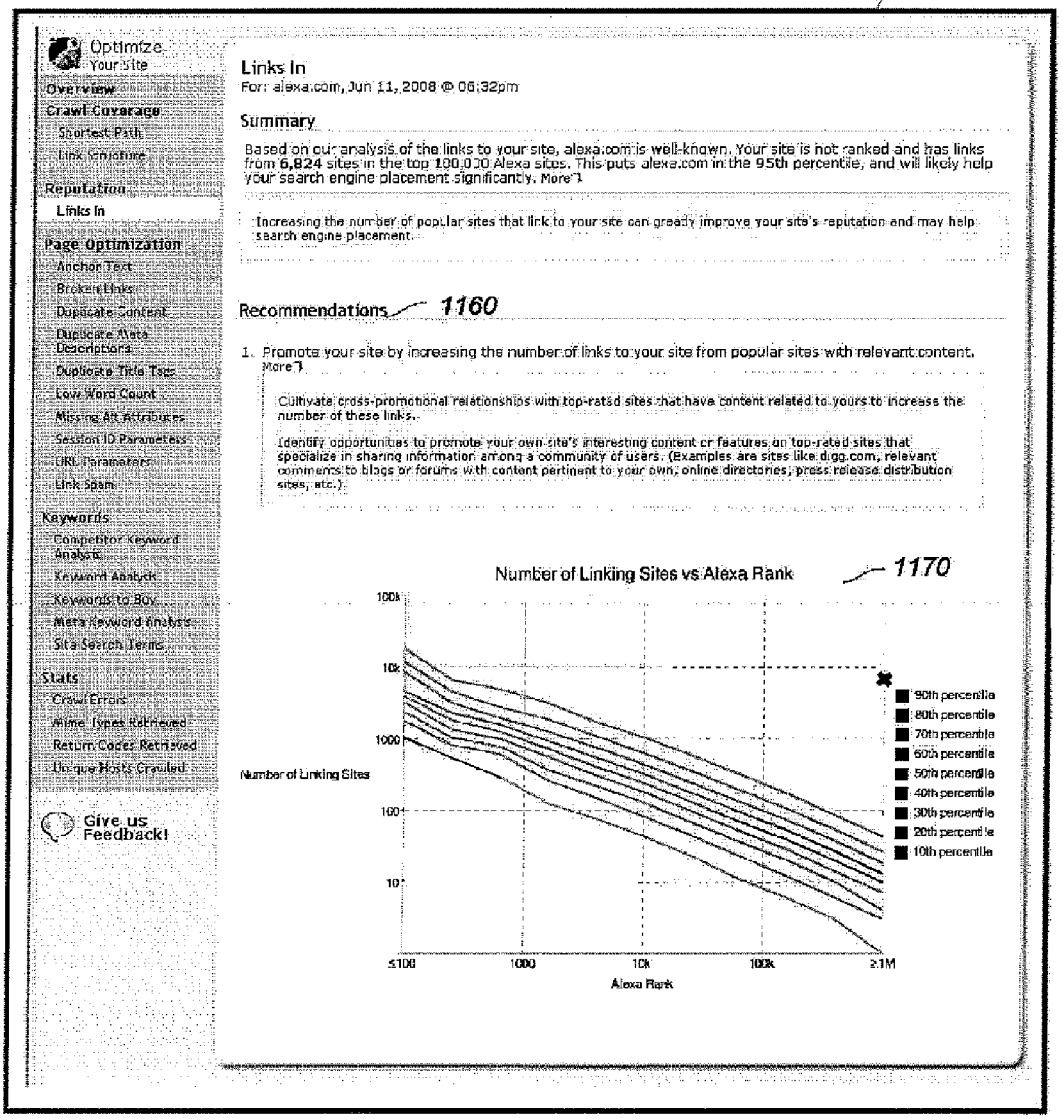

As shown in FIG. 11b, the system may generate and provide information 1150 about the number of referring links in the top 100,000 sites, a rank based on the number of referring links, or a percentile score based on the number of referring links. In other embodiments, the system may consider a different set of referring sites. The system may provide recommendations 1160 to increase the number of referring links along with a graph 1170 depicting the relationship between the number of linking sites, the percentile, and the rank.

Page Optimization

As shown in FIG. 12a, the system may generate and provide information 1200 about the optimization level of a webpage. In the embodiment depicted in FIG. 12a, the system provides an overview of the page optimization metric along with a letter grade or numerical score 1202 for the metric. The illustrated page optimization report also provides one or more recommendations 1204 for improving the grade or score provided. The reputation grade or score may be influenced by one or more of the following sub-metrics: anchor text, broken links, duplicate content, duplicate Meta descriptions, duplicate title tags, low word count, missing alt attributes, session ID parameters, URL parameters, and link spam. This list is not exhaustive, however, and other sub-metrics may be used.

Figure 12B:
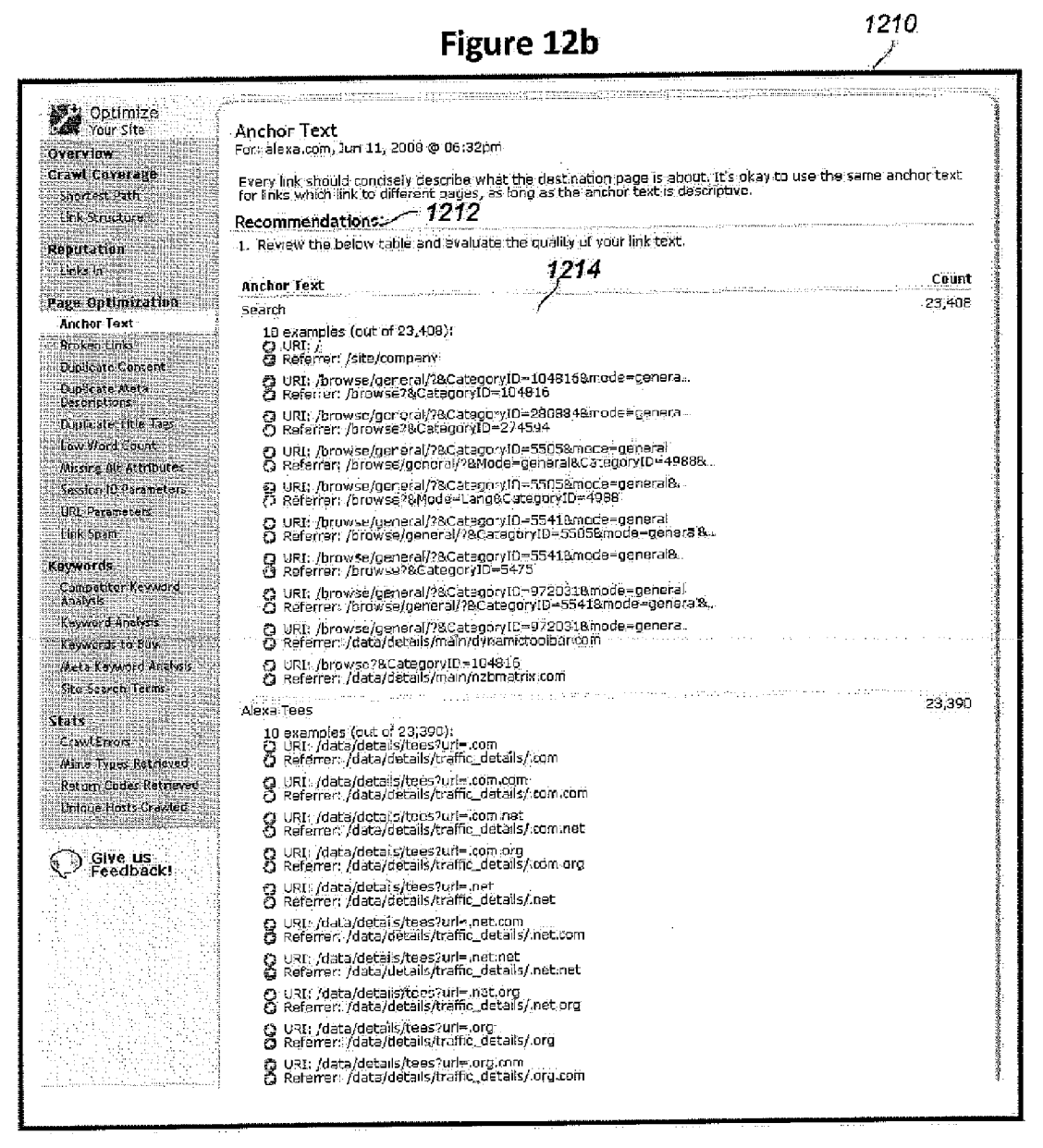

As shown in FIG. 12b, the system may also generate and provide information 1210 about anchor text and recommendations 1212 for improving page optimization by modifying the anchor text. The system may provide a table 1214 showing each anchor text description used along with the number of times it was used and a number of examples of associated target URLs.

Figure 12C:
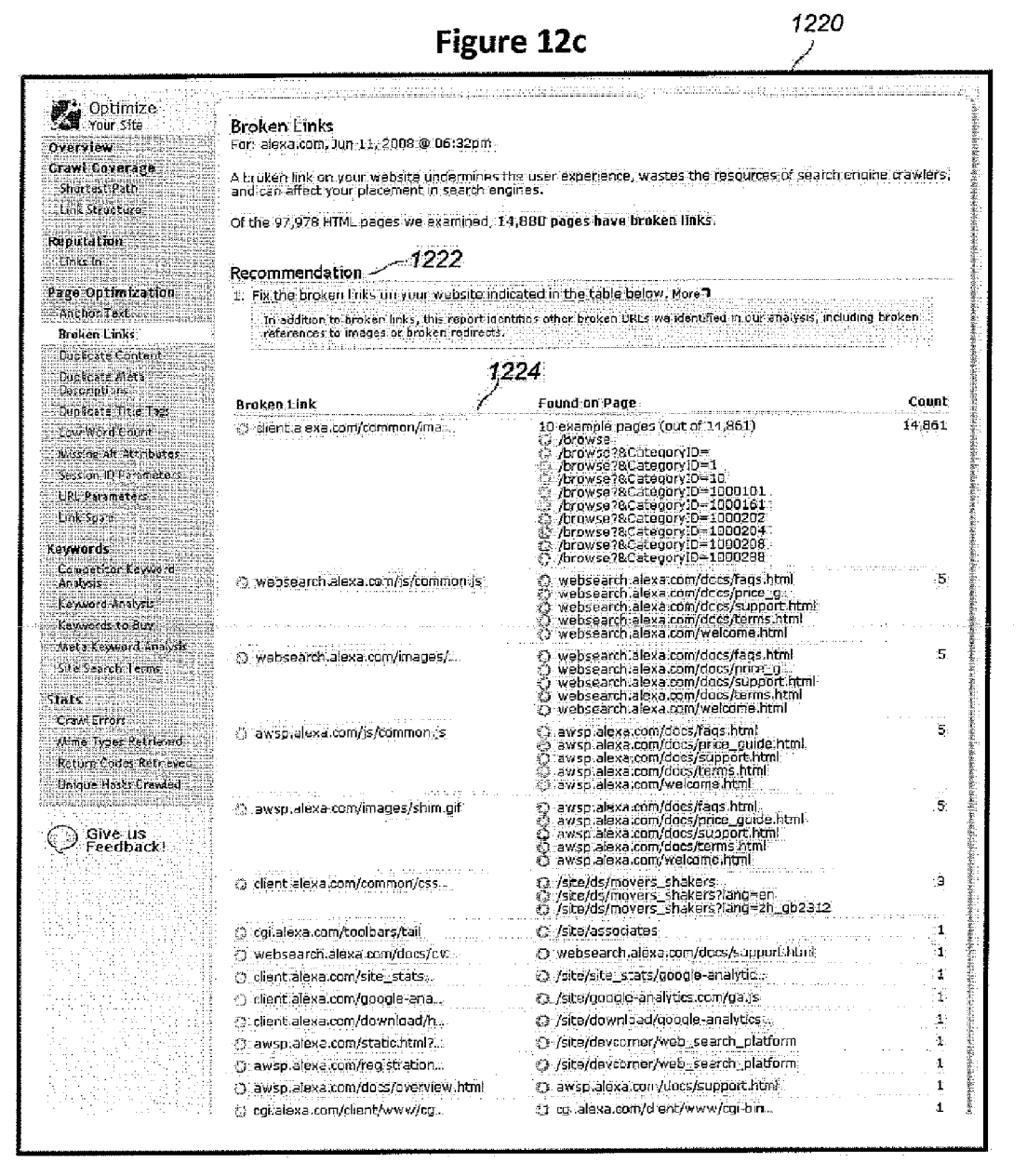

As shown in FIG. 12c, the system may also generate and provide a summary 1220 of links on the site to pages that are broken (e.g. those that do not exist). For example, as depicted in the Broken Links report of FIG. 12c, the system may provide recommendations 1222 to increase page optimization with respect to broken links. The example Broken Links report of FIG. 12c also includes a table 1224 listing target URLs that do not exist along with the number of links that reference each target URL and the pages on which those links can be found.

Figure 12D:
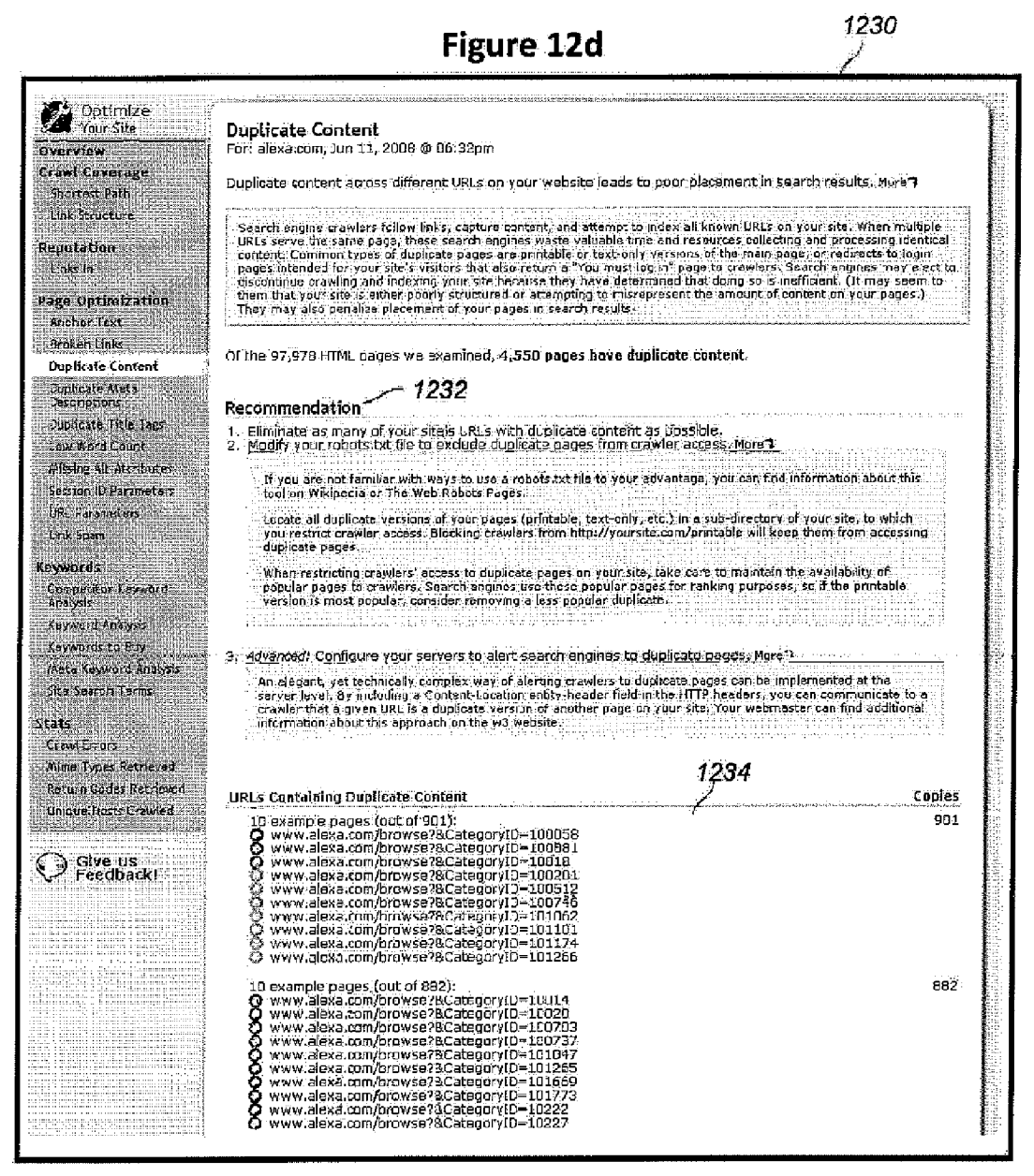

As shown in FIG. 12d, the system may generate and provide a report 1230 about the number of pages that have duplicate content (i.e. the same content on different URLs). For example, as depicted by the example Duplicate Content report of FIG. 12d, the system may provide recommendations 1232 for increasing page optimization with respect to duplicate content, and may provide a table 1234 showing URLs that contain duplicate content along with the number of copies found on the site.

As shown in FIG. 12e, the system may also generate and provide a report 1240 about the number of pages that share meta descriptions with other pages that have different content. For example, as depicted by the example Duplicate Meta Descriptions report of FIG. 12e, the system may provide recommendations 1242 for increasing page optimization with respect to duplicate meta descriptions, and may provide a table 1244 showing URLs that contain duplicate meta descriptions along with the number of copies found on the site.

Figure 12F:
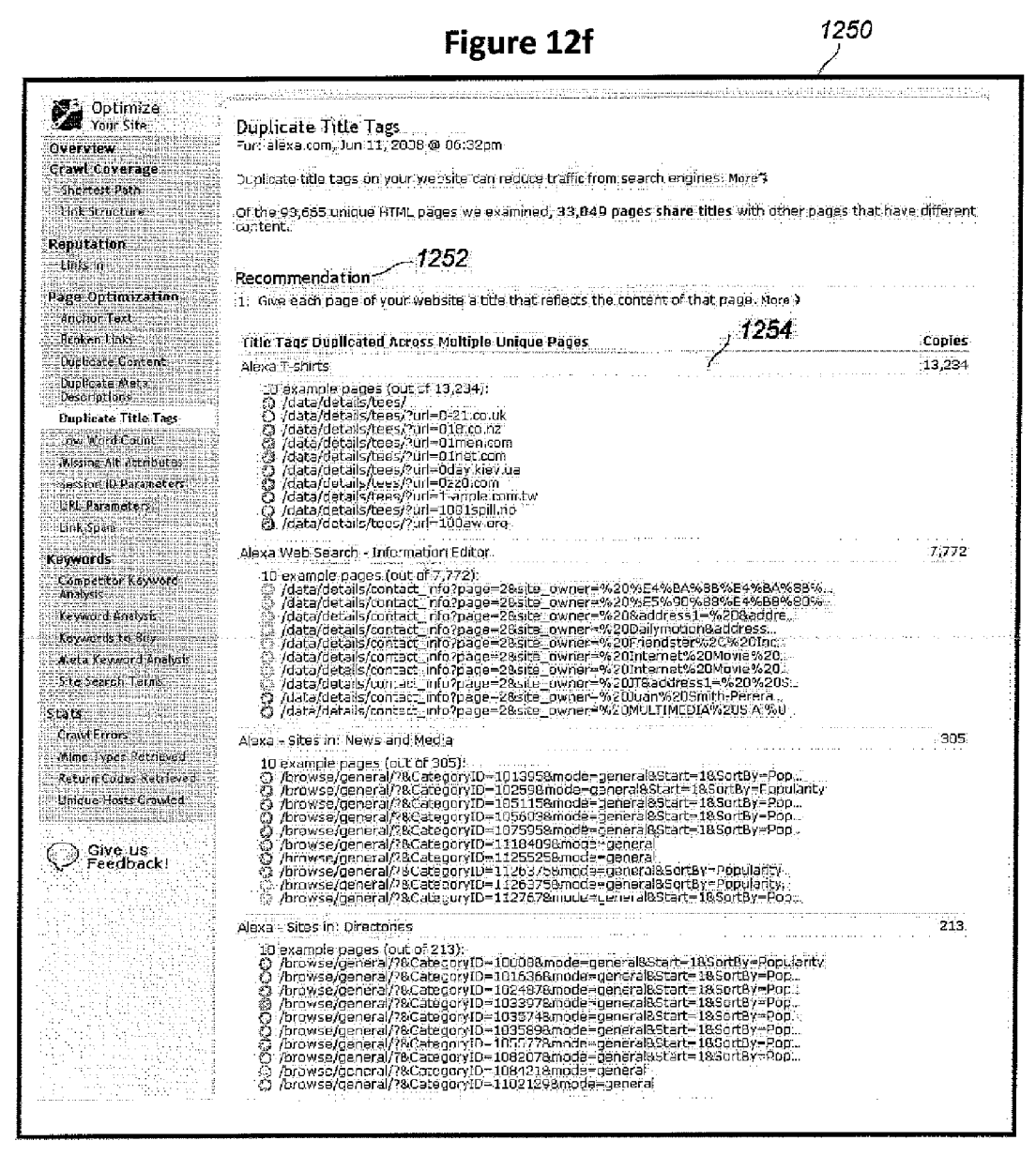

As shown in FIG. 12f, the system may also generate and provide a report 1250 about the number of pages that share titles with other pages that have different content. For example, as depicted by the example Duplicate Title Tags report of FIG. 12e, the system may provide recommendations 1252 for increasing page optimization with respect to duplicate page titles, and may provide a table 1254 showing URLs that contain duplicate page titles along with the number of copies found on the site.

Figure 12G:
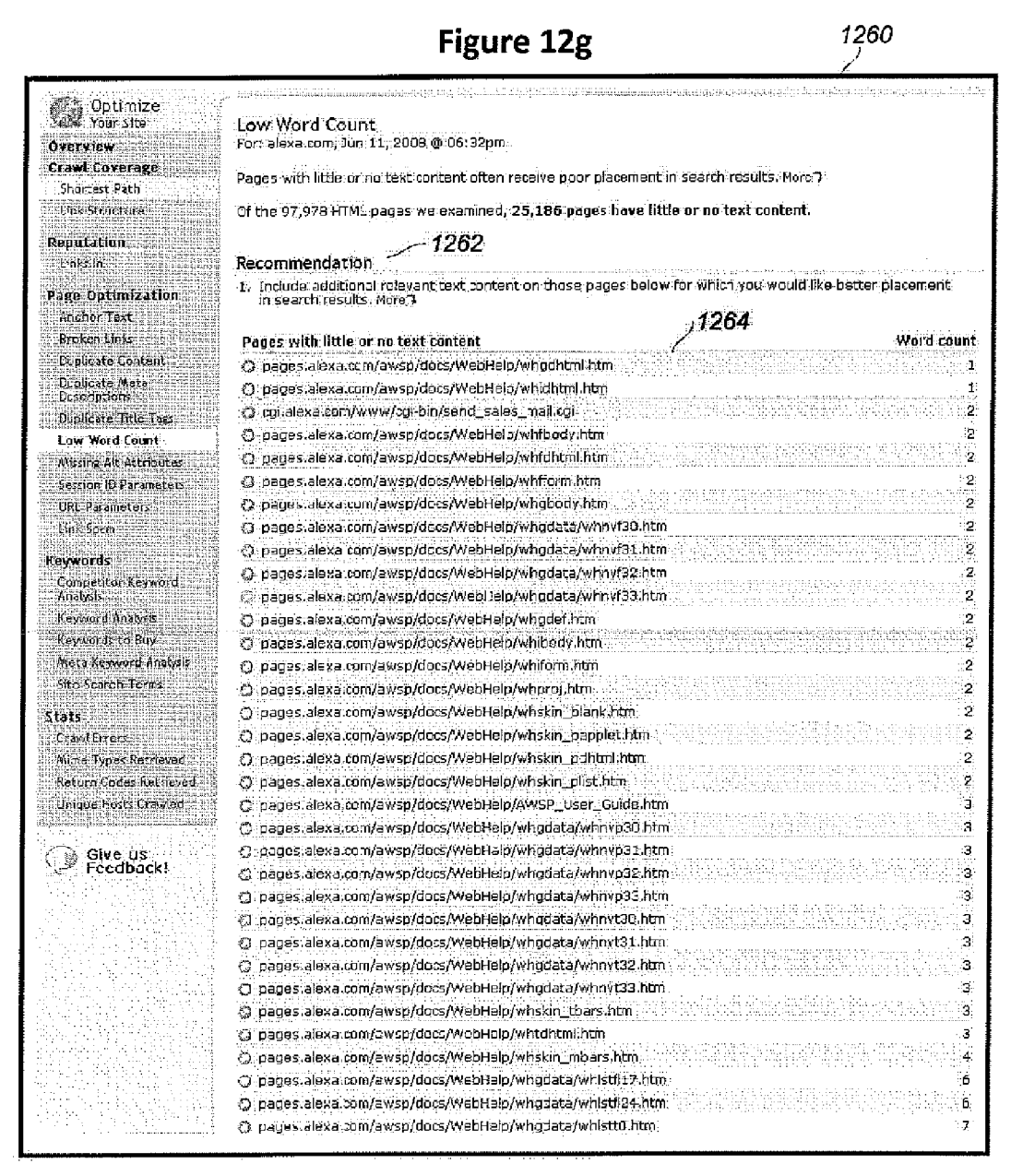

As shown in FIG. 12g, the system may also generate and provide a report 1260 indicating the number of pages that contain little or no text content. For example, as depicted by the Low Word Count report of FIG. 12g, the system may provide recommendations 1262 for increasing page optimization with respect to pages with little or no text content, and may provide a table 1264 showing URLs that contain little or no text content along with the word count of those URLs.

The system may also generate and provide a report (not shown) indicating the number of pages that have images with missing alt attributes. The system may provide recommendations for increasing page optimization with respect to images missing alt attributes. The system may provide a table showing URLs that have images with missing alt attributes along with the number of images on that page and a number of example images on that page that are missing alt attributes. Other missing attributes of other tags may be listed as well.

As shown in FIG. 12h, the system may also generate provide information about the use of session ID parameters on a site. The system may provide recommendations for increasing page optimization with respect to session ID parameters, and may provide a table of session ID parameters found on the site.

Figure 12I:
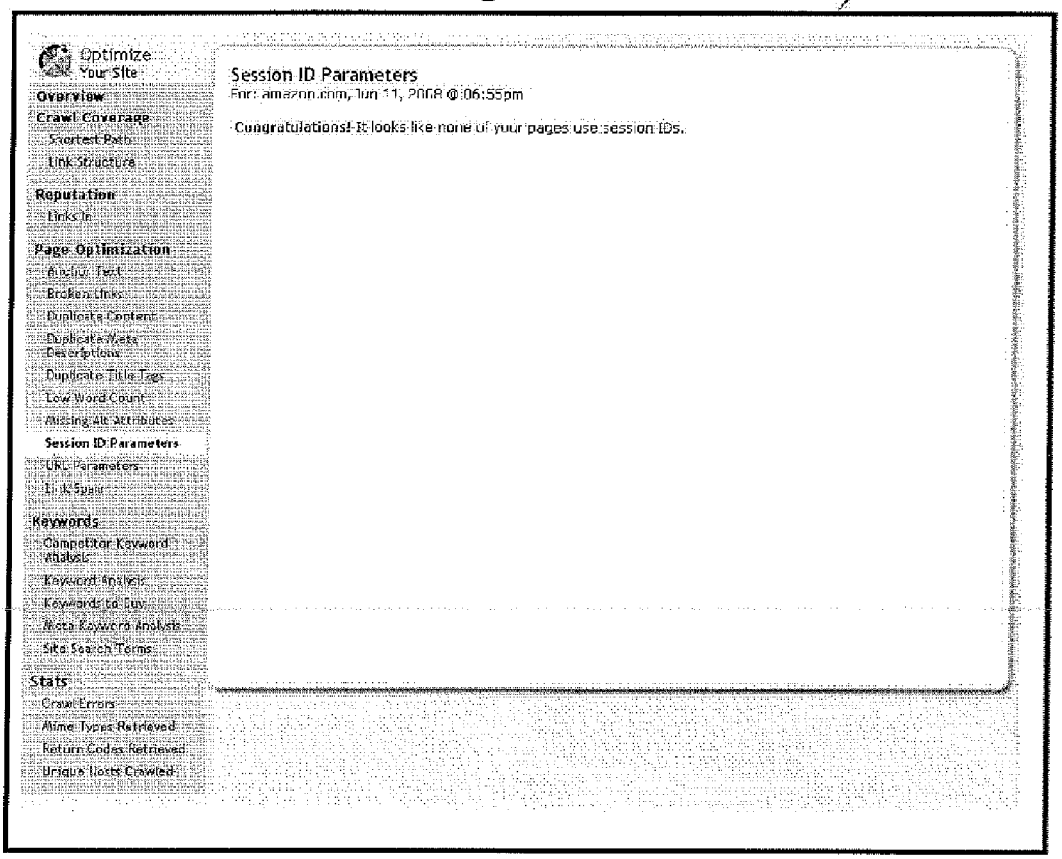

As shown in FIG. 12i, the system may also generate and provide a report 1290 indicating the percentage of URLs which contain one or more URL parameters (such as URLs that contain a question mark). For example, as depicted by the example "URL Parameters" report of FIG. 12i, the system may provide recommendations 1292 for increasing search engine optimization with regard to pages with URL parameters, and may provide information on how to convert parameterized static URLs to dynamic URLs.

Figure 12J:
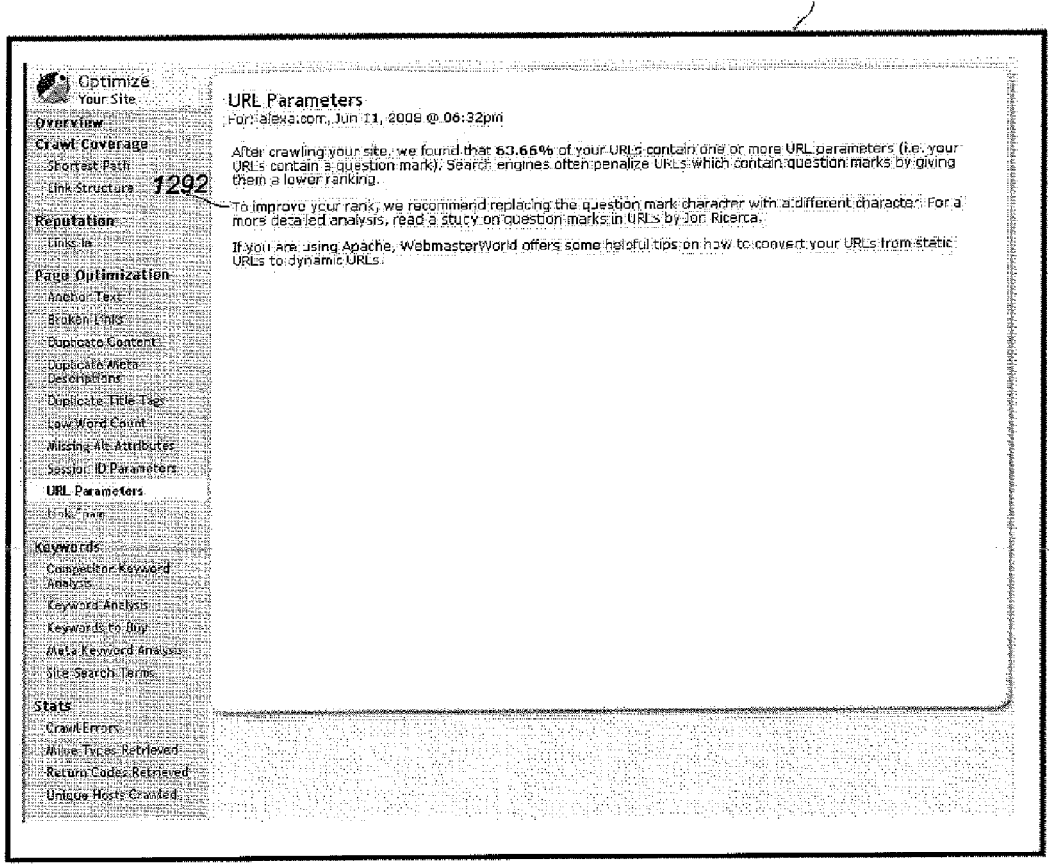
Figure 12K:
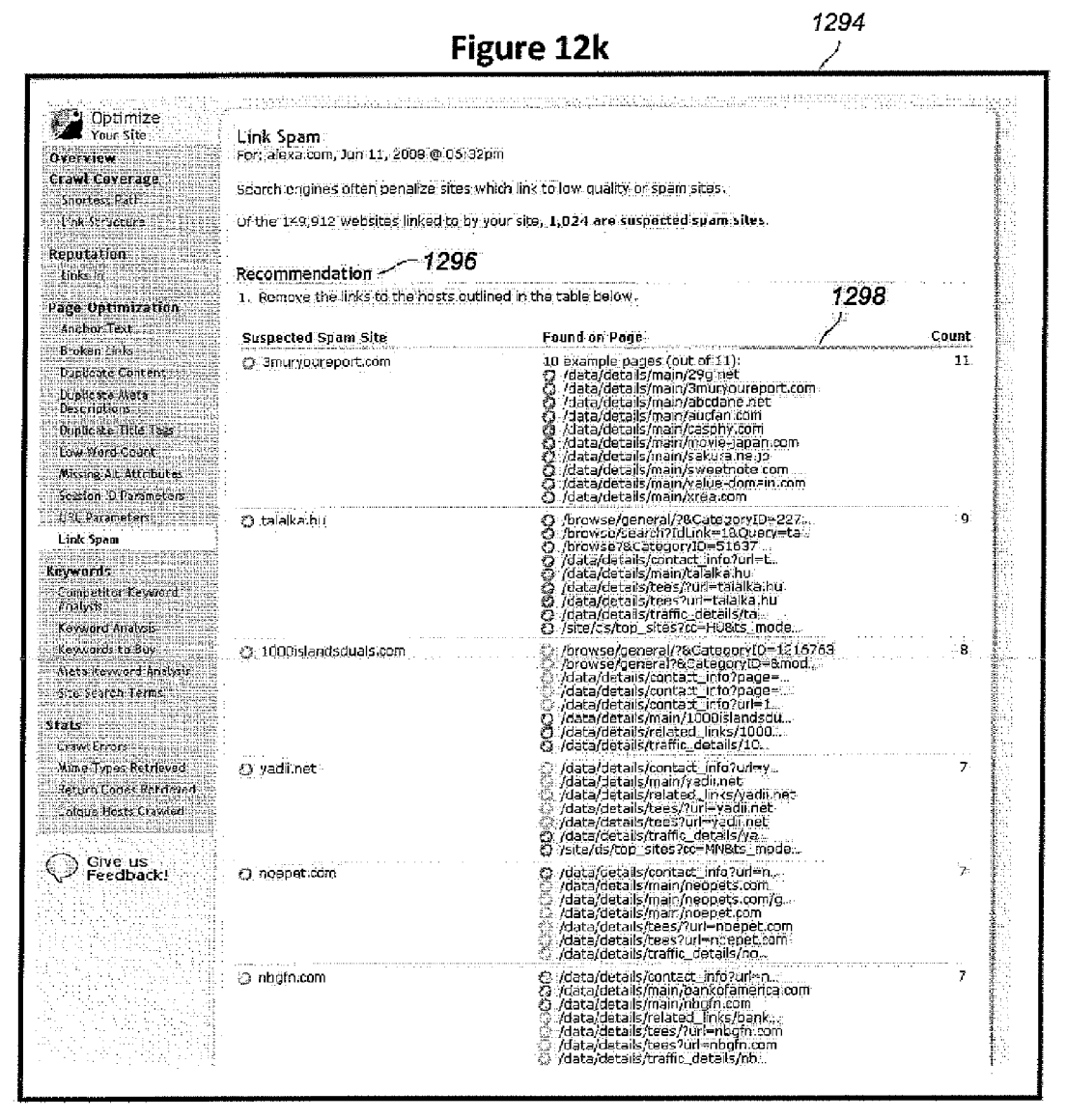

As shown in FIG. 12j, the system may also generate and provide information 1294 about the number of websites linking to the site which are suspected spam sites. For example, as depicted by the example Link Spam report of FIG. 12e, the system may provide recommendations 1296 for improving search engine optimization with respect to link spam, and may provide a table 1298 showing suspected spam sites, pages on those spam sites that link to the site, and the number of pages on spam sites that link to the site.

Keywords

As shown in FIGS. 13a-e, the system may provide information about keywords with respect to search engine optimization. Such information may include, but is not limited to: competitor keyword analysis 1310, keyword analysis 1320, keywords to buy 1330, meta keyword analysis 1340, or site search terms 1350.

In particular, as shown in FIG. 13a, the system may generate and provide information 1310 about the keywords that drive traffic to a given site and/or to competing sites. The system may also provide recommendations 1312 for improving search engine optimization with respect to competitor keywords. For example, as depicted by the Competitor Keyword Analysis report of FIG. 13a, the system may provide a table 1314 showing competing websites, keywords that drive traffic to those competing websites, a rank describing how well the competing site is optimized for that keyword (the lower the better), a rank describing how well the analyzed site is optimized for that keyword (the lower the better), and a search volume bar indicating how many searches are made using that keyword. (As used herein, the term "keyword" is intended to encompass both search terms and search phrases, where a search phrase is an ordered sequence of two or more search terms.) Examples of methods that may be used to generate competitor keyword analysis reports of the type shown in FIG. 13a are shown in FIG. 25, which is described separately below. A user may submit one or more network resources, such as a website, to use as the initial subject site (for which related or competitor sites will be determined).

Figure 13B:
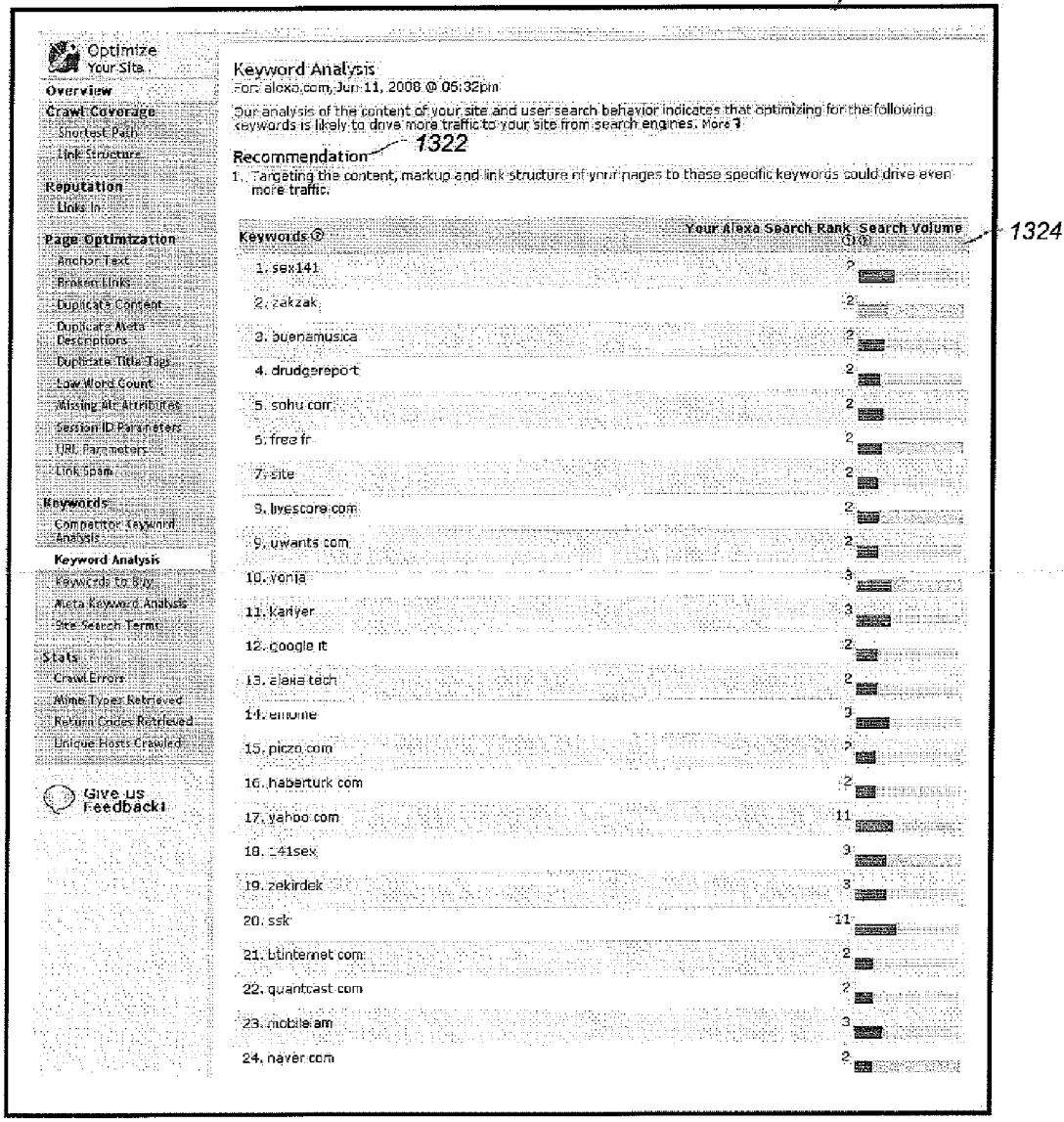

As shown in FIG. 13b, the system may also generate and provide a report 1320 regarding keywords which may drive more traffic to a properly optimized site. For example, as depicted by the example Keyword Analysis report of FIG. 13b, the system may 1322 provide a table 1324 of keywords that appear on the site. In this example, the keywords are ordered based on their predicted ability to drive incremental traffic. A search rank shows how well the site is optimized for a particular keyword (the rank being the position of the first result from the site in a search engine for the specified keyword, lower being better).). A search volume bar indicates how many searches are made for that phrase.

Figure 13C:
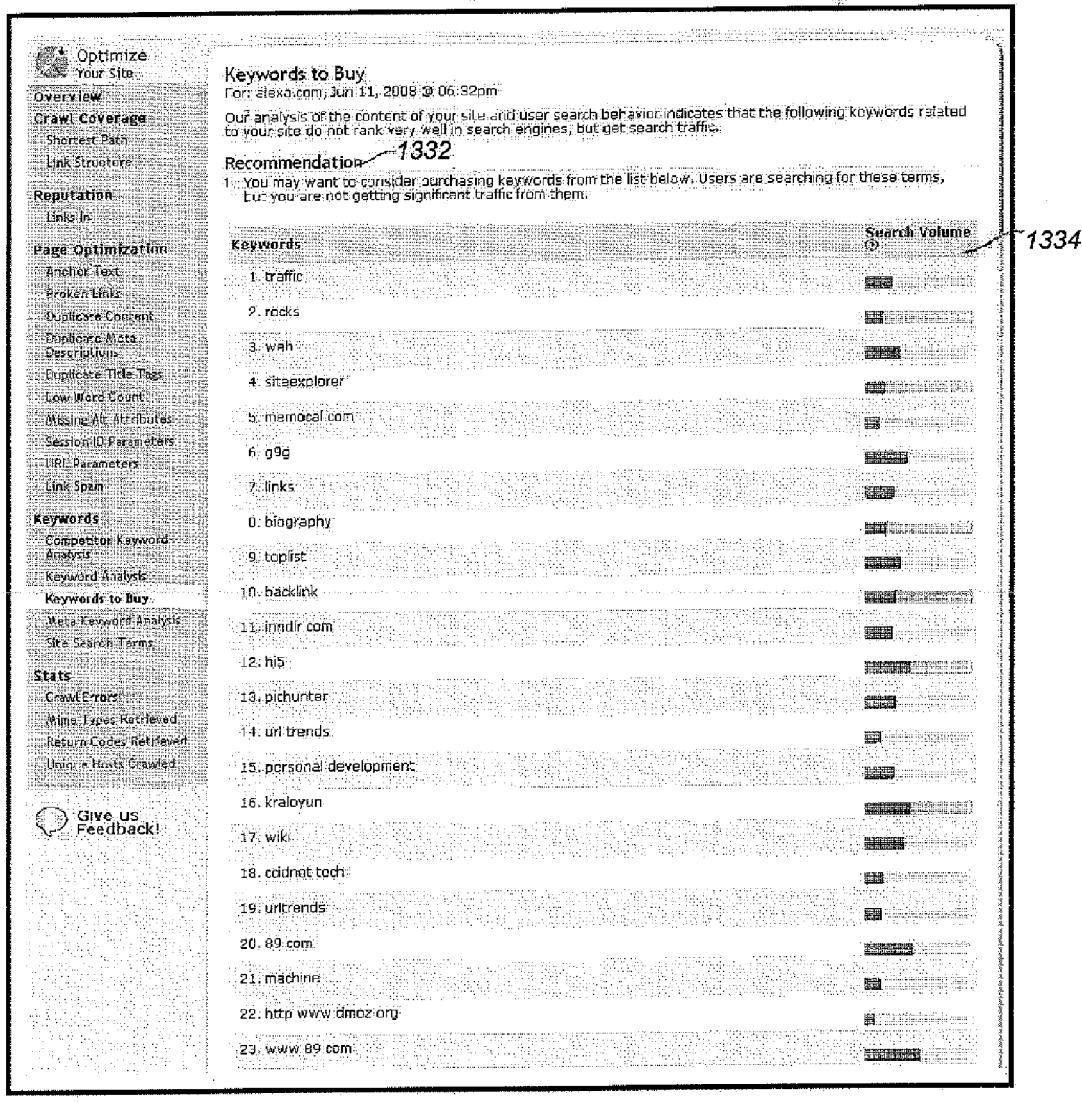

As shown in FIG. 13c, the system may also analyze and provide information 1330 about the content of the site and users' search behaviors to identify keywords that are searched for frequently but for which the specified site ranks poorly in search engines. "Users" in this context may include, for example, users of the site, users of competitor sites, and users of the web generally. The system may provide recommendations 1332 for increasing search engine optimization with respect to such keywords. For example, as depicted by the example Keywords To Buy report of FIG. 13c, the system may provide 1334 recommendations of specific keywords to purchase. In the illustrated example, a search volume bar indicates how many searches are made for each recommended keyword.

Figure 13D:
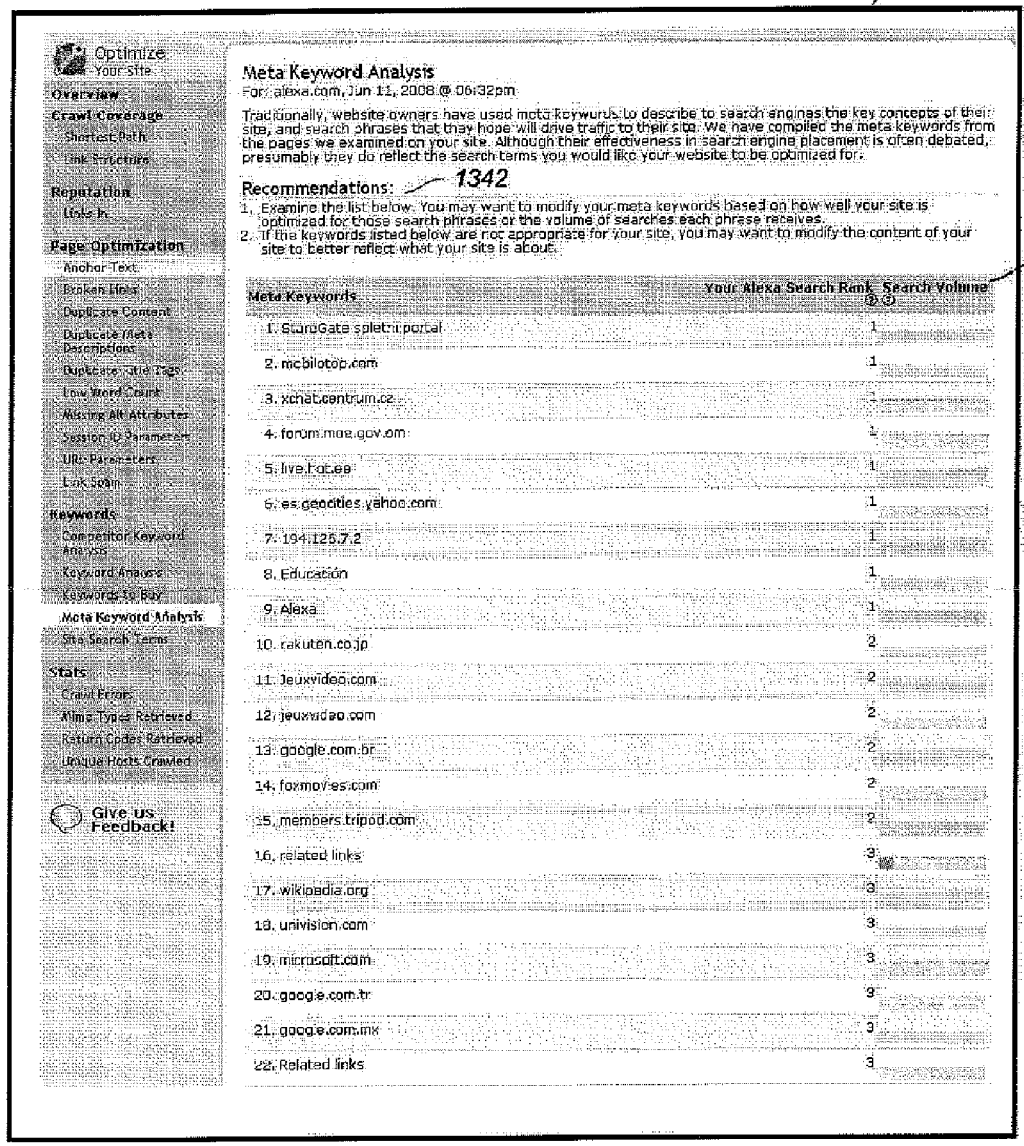

As shown in FIG. 13d, the system may also analyze and provide information 1340 about the content of the site to provide Meta keywords that are found on the site. The system may provide recommendations 1342 for increasing search engine optimization with respect to Meta keywords such as modifying Meta keywords to more accurately reflect the subject of the site. For example, as depicted by FIG. 13d, the system may generate a Meta Keyword Analysis report containing the following: meta keywords found on the site, a search rank representing how well the site is optimized for each such keyword (lower may be better), and a search volume bar indicating how many searches are made for that phrase.

Figure 13E:
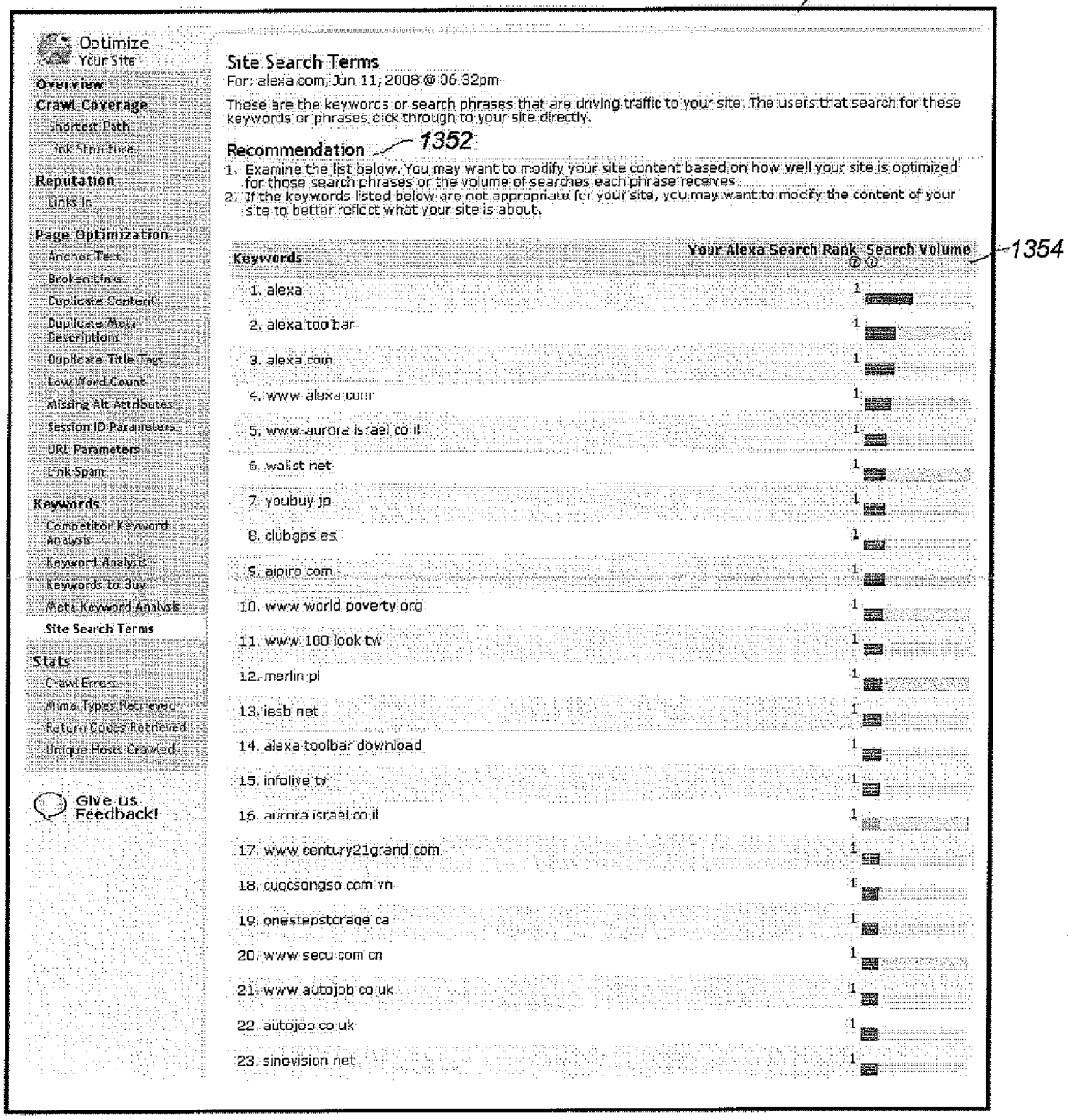

As shown in FIG. 13e, the system may determine and provide information 1350 about which keywords are driving traffic to the site (i.e. users that search for such keywords tend to click through directly to the site) and at what levels. The system may also provide recommendations 1352 for increasing search engine optimization with respect to site search terms, such as recommendations for modifying site content of the site based on how well the site is optimized for a given keyword or the volume of searches performed with that keyword. For example, as depicted by FIG. 13e, the system may generate a Site Search Terms report containing the following: 1354 keywords driving traffic to the site, a search rank representing how well the site is optimized for each such keyword (lower being better), and a search volume bar indicating how many searches are made with that keyword.

Statistics

As shown in FIGS. 14a-d, the system may analyze site content and visitor data to determine general statistics about the site. The statistics provided may include, but are not limited to: crawl errors 1410, mime types retrieved 1420, return codes retrieved 1430, and/or unique hosts crawled 1440.

Figure 14A:
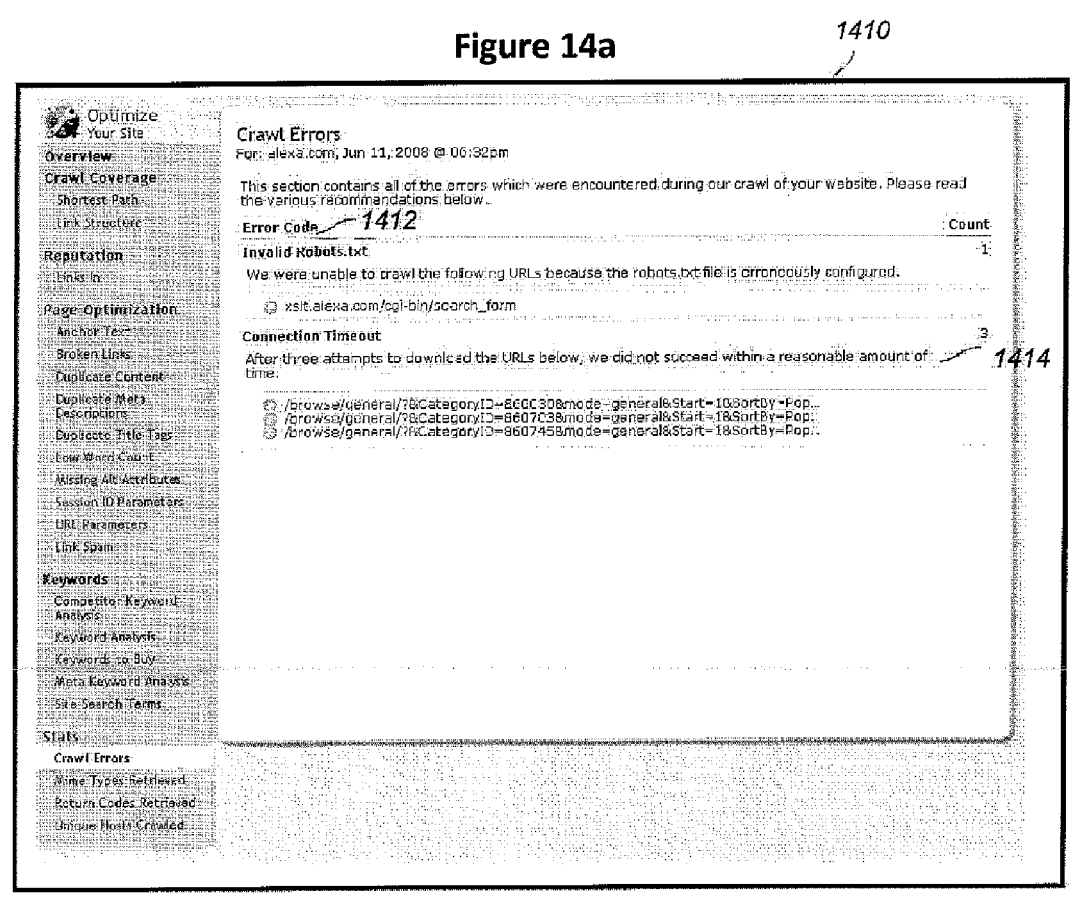

In particular, as shown in FIG. 14a, the system may analyze site and provide information 1410 about errors encountered during a crawl of the site. The system may also provide error codes 1412 and/or recommendations for rectifying each error. For example, as depicted by FIG. 14a, the system may generate a Crawl Error report containing the following information: 1414 each error code encountered, a description of the error code, recommendations for rectifying the error, the URL or URLs generating the error, and the number of URLs generating the error.

Figure 14B:
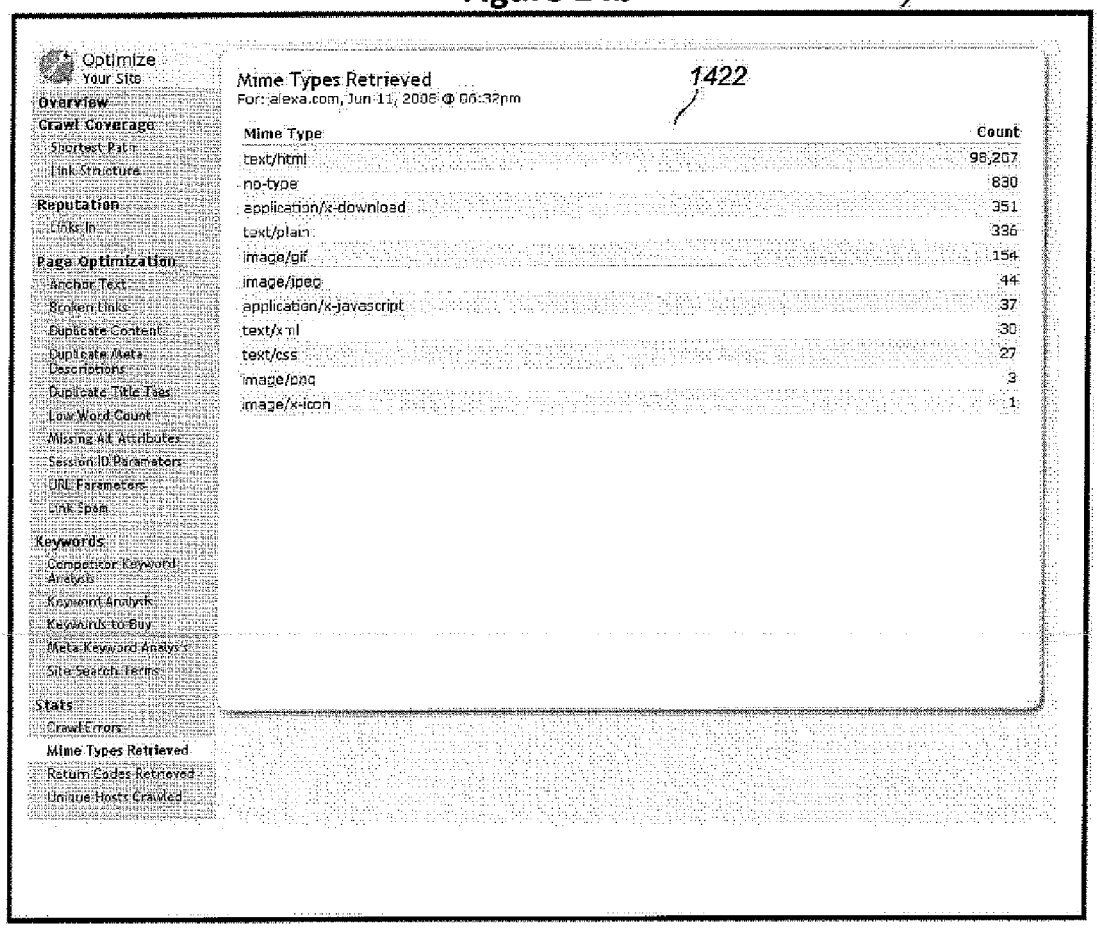

As shown in FIG. 14b, the system may also determine and provide information 1420 about which mime types are being used by the site. The system may provide a table 1422 listing each mime type used by the site and the number of times it is used.

As shown in FIG. 14c, the system may also determine and provide information 1430 about which return codes have been retrieved while accessing the site. For example, as depicted by FIG. 14c, the system may generate a Return Codes Retrieved report containing the following information: 1432 each subdomain of the site, the return codes encountered in that subdomain, a detailed description of each return code, and the number of times that return code was encountered.

Figure 14D:
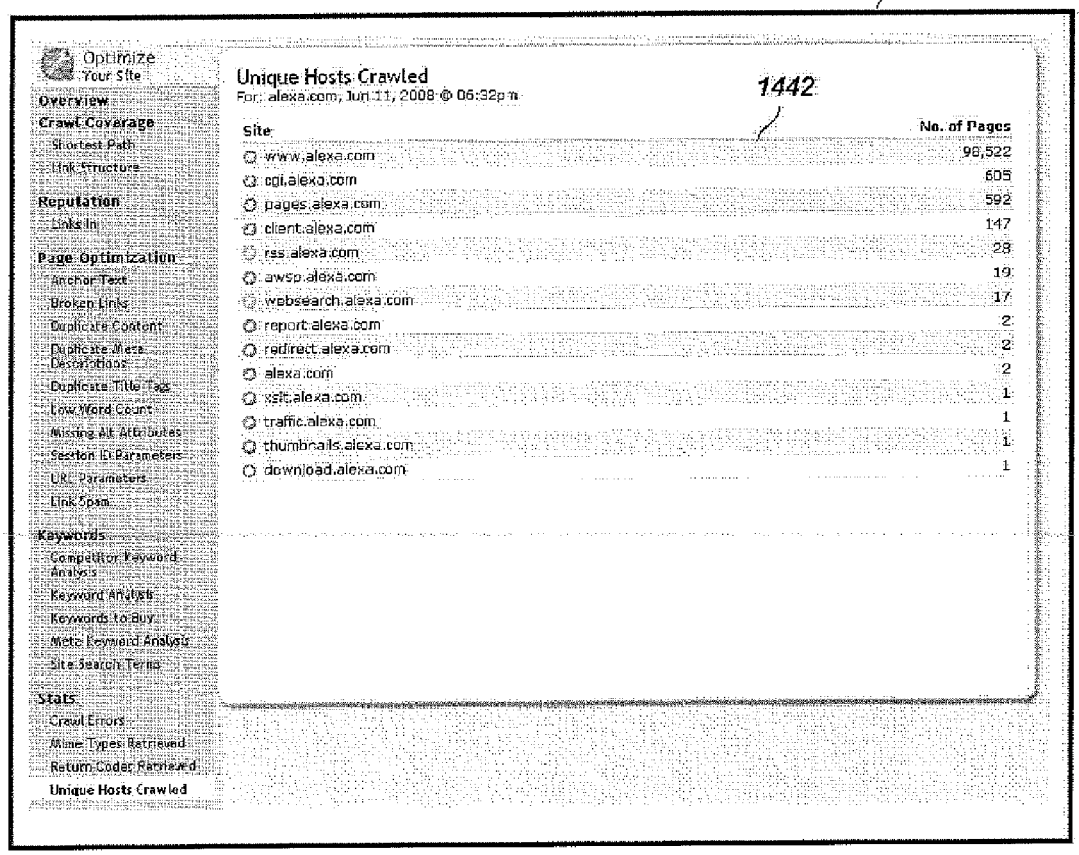

As shown in FIG. 14d, the system may also determine and provide information 1440 about which unique hosts were crawled in a given second-level domain, and may generate a report 1442 showing the subdomains crawled along with the number of pages crawled in that subdomain.

Other Features

Of course, the foregoing describes only some possible features that may be included in the web analytics system. Additional features are possible, and some of the features described herein may be omitted or may be implemented differently than described herein.

System Components and Operation

To implement some or all of the foregoing features, an embodiment of a web analytics system may contain all or some of the functionality illustrated in FIGS. 15a-16b, as well as functionality not shown. The system may be roughly divided into at least three functional areas: data collection, data analysis, and data presentation. Each will be discussed in turn. Additional detail regarding some of these embodiments may be found in commonly owned U.S. Pat. No. 6,691,163, issued Feb. 10, 2004, which is incorporated by reference in its entirety here and at the conclusion of this disclosure.

Data Collection

The web analytics data depicted in the screenshots discussed above, and particularly the information relating to user behaviors, may be generated based on traffic data (also referred to as behavioral data) obtained from one or more types of sources. These behavioral data sources include, but are not limited to the following: (a) client software programs, such as browser toolbars or plug-ins deployed on users' computing systems, that report users' browsing and/or searching activities to a data collection system, (b) Internet Service providers that maintain clickstream data of their subscribers, (c) web access logs of particular web sites, (d) page widgets installed by site operators on particular sites, (e) DNS logs, (f) search logs of search engine providers, (g) cookies, and so forth. The analytics features disclosed herein may be implemented using any one or more of these types of sources, as well as others.

Figure 15A:
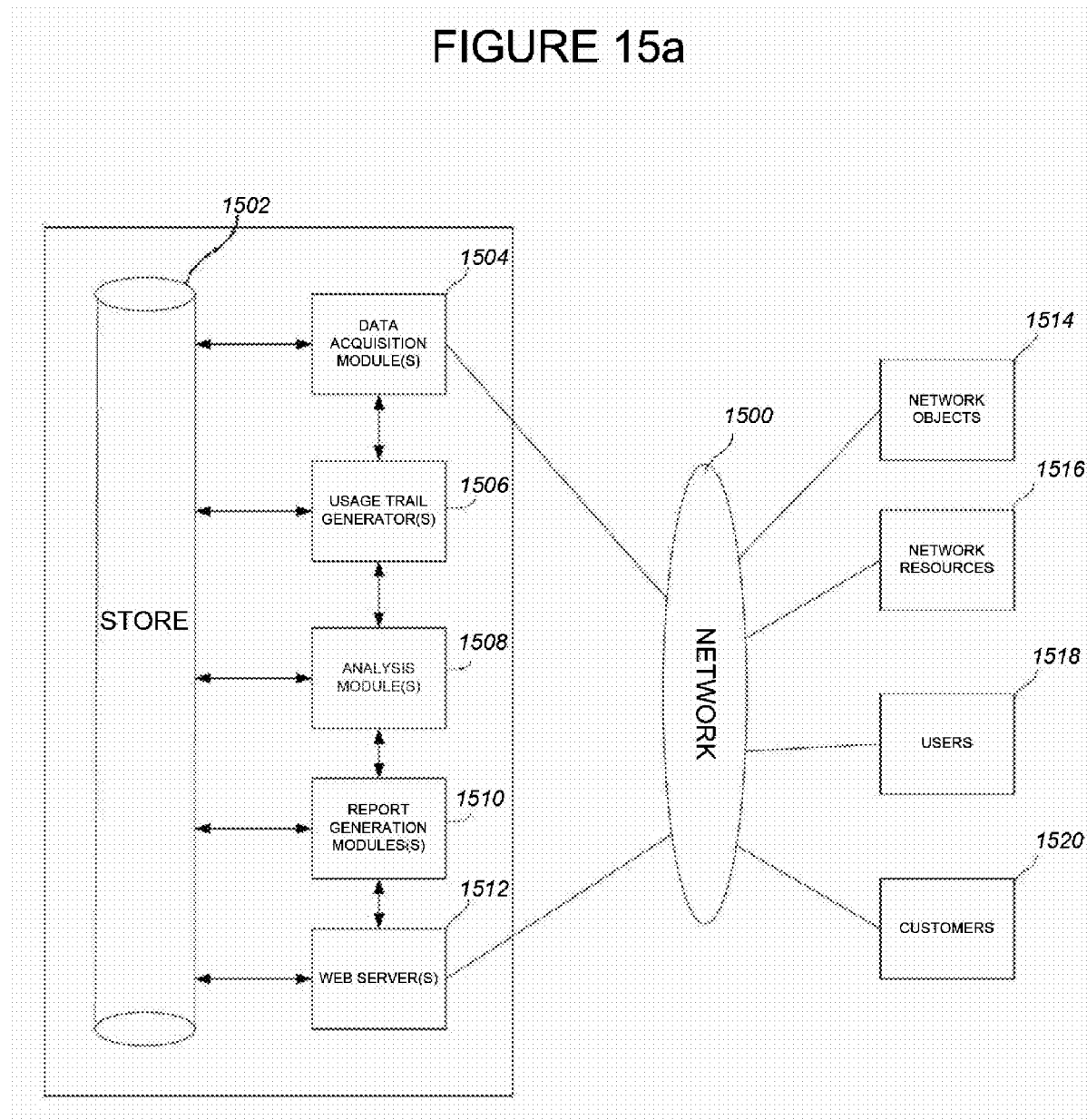
FIG. 15a is a schematic block diagram of a web analytics system according to some embodiments of the present invention.

As shown in FIG. 15a, an embodiment of a web analytics system configured to collect data may include at least one data acquisition module 1504. This module may communicate with network objects 1514 and resources 1516, users 1518, and customers 1520 through a network 1500 or other connection. The network 1500 may be or include the Internet, a LAN, WAN, wireless network, and so forth. The data acquisition module(s) 1504 may communicate with at least one data store 1502, which may include one or more physical storage devices (e.g., disk drives, solid state memory devices, etc.). As shown in FIG. 15b, a data acquisition module 1504 may include a SEO crawler 1558, or crawling or spidering engine, as well as a crawler interface 1560 and submission, verification, and preprocessing modules 1556.

Figure 16A:
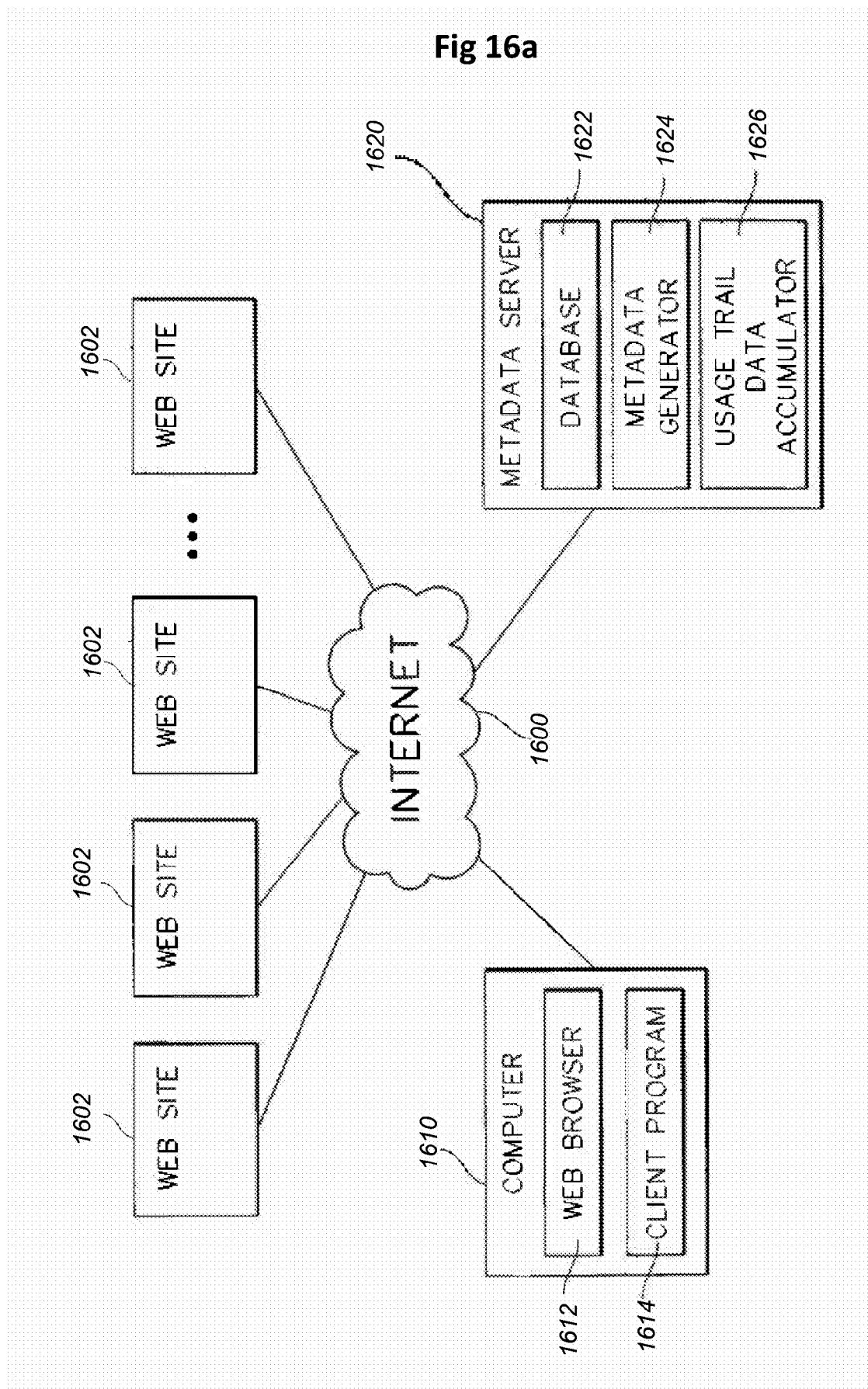
FIG. 16a is a schematic block diagram of a network.

FIG. 16a illustrates one method that may be used to collect data regarding the cross-site browsing behaviors or usage trails of users. With this method, a client program 1614, such as a browser toolbar or plug-in, is installed on the user's computer 1610. As the web browser 1612 running on this computer 1610 accesses various network resources, such as web sites 1602, the client program 1614 reports these accesses to a metadata server 1620 (or another type of data collection system). The metadata server 1620 may record each reported access event in association with the URL visited, the user or user computer that made the visit, attributes of the user, and/or other information. The usage trails of many different users may be monitored and recorded in this manner. Users that install the client program 1614 may, in some embodiments, be given the option, or may be required, to complete an electronic form that requests various types of demographic information (age, income range, gender, nationality, occupation, location, etc.). Demographic data supplied by such users may be collected by the metadata server 1620 or elsewhere, and may be used, e.g., to assess particular sites in terms of the demographic characteristics of their visitors.

In the particular embodiment shown in FIG. 16A, the metadata server 1620 (which may include one or more distinct computers or other machines) runs a metadata generator that uses the collected usage trail data to generate site metadata, such as lists of related sites, traffic rank data, etc. As is known in the art, when a user of the client program 1614 accesses a particular site 1602, the client program may retrieve the site's metadata from the metadata server and present this data to the user.

Figure 16B:
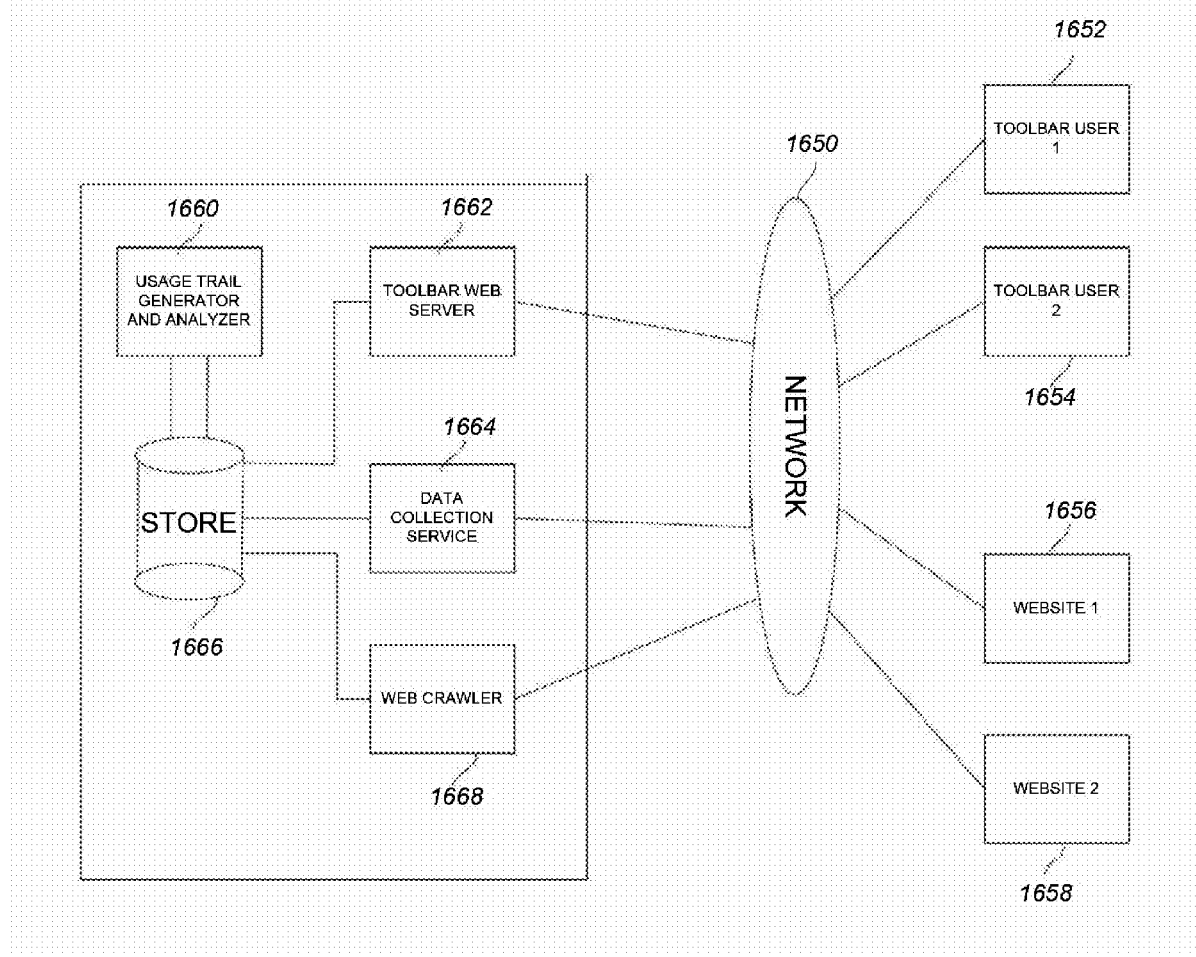
FIG. 16b is a schematic block diagram of a toolbar web server or service.

FIG. 16b illustrates additional and alternative elements of a data collections system, including a toolbar web server or service 1662, which may receive, satisfy, and log toolbar requests from users 1652 and 1654, a data collection service 1664, which may receive data from assorted websites 1656 and 1658, and a web crawler 1668 or crawling service. Each of these elements may communicate with each other, with resources through a network 1650, and with one or many data stores 1666. As shown in FIG. 16a, metadata may also be collected from a metadata server 1620, which may include a metadata generator 1624, a data store 1622, and other modules.

The web analytics system may collect information about Internet traffic by, for example, examining logs of URL accesses reported by users' toolbars. In some embodiments, users may download one or more of many different toolbars, which may be made available on the Internet. As described above with reference to FIG. 16a, some of these toolbars may provide the user with analytics data from the system. For example, if a user is visiting siteA.com, a toolbar may provide a control which, if activated, provides the user with, e.g., the current traffic rank of that website, as determined by the analytics system. In some embodiments, each time a user activates such a control or navigates to a new webpage with their browser, the installed toolbar may make a request to the web analytics system for information about the website and/or webpage. Data about these information requests may be stored by the web analytics system in web server logs and the web analytics system may use these logs to determine Internet trends and to calculate traffic metrics for particular sites. This data may be used to maintain "usage trails" or "clickstreams" of users. In some instances, a usage trail for a given user generated from toolbar data may include information relating to all—or a subset—of the websites visited by the user, irrespective of whether those sites are part of a particular network, such as a referral or affiliate network, or are in communication with the web analytics system. In other cases, usages trails may be limited to some subset of visited sites, such those in a network.

Alternatively or additionally, site owners may configure their sites to detect user actions and/or report usage data to the web analytics system; if the network of sites so-configured is broad enough, the web analytics system may be able to reconstruct or infer a usage trail of a particular user. For example, as is known in the art, site operators may be provided with page widgets (small sequences of JavaScript of other code) that, when loaded by a user's web browser, cause the browser to report the access event to the web analytics system. Traffic data may also be obtained from search providers, Internet Service Providers (ISPs), and other third parties. For example, DNS server logs may be used to infer data about web traffic. For example, the web analytics system may procure data regarding the number of times a particular domain has been "looked up" in the DNS system and may use this information to infer the number of times that domain has been accessed by Internet users. Additionally, websites may provide their raw server logs and/or processed data to the web analytics system.

As mentioned above, when users download and install a toolbar or visit a website or webpage, they may be given the option to provide demographic data, such as by filling out a demographics form which may be subsequently transmitted to the web analytics system. The system may use this self-reported demographic data in combination with recorded usage trails to generate demographic profiles for users, webpages, and/or websites. These profiles may enable the web analytics system to provide its users (customers) with information which allows them to understand what types of users visit each site. The demographic information reported by users (and collected by the system) may include any or all of the following: gender, children in the household, age, income, ethnicity, location (e.g., home, work, or school), country, level of education, and so forth.

Data Analysis

As shown in, e.g., FIG. 15a, the collected traffic data is analyzed by one or more modules. In particular, data may be analyzed by a usage trail generator 1506 so as to generate clickstreams and usage trails. The usage trail component may generate and/or analyze usage trails from the data stored in the repository 1502 or other sources. As described throughout this disclosure, usage trails may be used to infer information about both users and sites, including user characteristics, site characteristics, similar and related users and sites, and so forth. Demographic information may be linked with usage trails to allow even more information about users and sites to be deduced and inferred.

Data may also be analyzed by a number of analysis modules 1508 which implement other functionality of a web analytics system. For example, one or more analysis modules 1508 may create related links data for a given website. Analysis modules 1508 may communicate with other modules and resources, e.g., data acquisition modules 1504.

As shown in FIG. 15b, analysis of data may be performed in a modular processing framework 1564, wherein modules 1565 may work on modular tasks. A chain or assembly line of modules may be created, whereby one module 1565 uses as its input the output of one or more modules. A dashboard component 1572 may monitor module 1565 and system information. Analyzed data may be stored in at least one repository 1570. A data aggregator 1568 may analyze data or module information, and such data may be used for metrics, revenue, accounting, and other purposes.

Data Presentation

As shown in FIG. 15a, a web server 1512, which may include one or more distinct web server machines or computers, may satisfy requests from users 1518 and customers 1520. The web server 1512 may be in communication with a report generation module 1510, which may decouple web requests from data analysis. The web server 1512 and report generator 1510 may access data from the data store 1502, including data generated or obtained by data acquisition modules 1504, usage trail generators 1506, and/or other analysis modules 1508.

Site Screening & Text-Website Association

Most websites contain numerous individually addressable webpages, many of which can be visited by the user. Search engines typically enable users to search for individual webpages based on keyword-based search queries. For example, a search for the keyword 'watches' on google.com may return a listing of the web pages illustrated in Table 1. These results typically feature individual pages on a variety of sites, several of which are not generally about watches. For instance, the links marked with a single apostrophe (*) in the table, e.g., amazon.com, overstock.com, and wikipedia.org, may be characterized (at best) as only marginally about watches. The marginal relation between watches and these sites explains, in part, why the search results may feature pages within the structure of each of these websites (e.g., site1.com/dir1/dir2/page.html) as opposed to the top-level page (e.g., site1.com) of the website.

TABLE 1

Illustrative search results for webpages related to 'watches'.

www.discountwatchstore.com/
www.lookrichforless.com/
www.worldofwatches.com/
www.amazon.com/Watches-Jewelry/b?ie=UTF8&node=3888811 *
www.overstock.com/watches/31/store.html *
en.wikipedia.org/wiki/Digital_watch *
www.citizenwatch.com/
www.spc.noaa.gov/products/watch/ *
jewelry-watches.pricegrabber.com/watches-accessories/c/229/ *
www.fossil.com/

Some embodiments of the present disclosure identify entire websites (rather than mere pages on websites) as being, for example, largely about the topic described by a given search query. As an example, the same search query (namely, for 'watches'), run according to such an embodiment, may produce a set of results such as those illustrated in Table 2.

TABLE 2

Illustrative search results for websites related to 'watches'.

watchesplanet.com
worldofwatches.com
ewatches.com
watches.co.uk
jomashop.com
watchfinder.co.uk
bluedial.com
watchshopuk.com
princetonwatches.com
thewatchery.com New methods of analysis are desirable in order to accurately identify sites which are related to a given search query or topic. The present disclosure includes methods that may be employed to build an application capable of generating results of the type shown above.

In general, the relevance of a website to a given keyword may be determined by examining several information sources, including, for example, usage data received from actual users or constituents of the network. Usage trails may include information such as which keywords led a particular user to a particular page. For example, a user may visit a search engine, search for the keyword 'watches', and then click on a link to one of the search results (e.g., retailer.com/page1.html). As part of the request to retailer.com, a user's browser may transmit a Referer [sic] header, which is a standard (albeit misspelled) HTTP header which may indicate the referring page, i.e., the page containing the link that the user clicked to request the present page. So, in this example, the request to the retailer.com/page1.html may contain a Referer header including a link back to the search results page. If the retailer.com request and the Referer header are transmitted to the web analytics system, either by the user's browser or by the retailer.com server, the web analytics system may infer that the user has transitioned from the search results page for particular keywords (here, "watches") to a particular page (here, "retailer.com/page1.html"). The web analytics system may treat this transition as an indicator that the keyword(s) and the particular page are related or that the keyword drives web traffic to the page.

By comparing the numbers of transitions from the same keyword to other pages (e.g., wristwatches.com), the web analytics system may infer the relative ranks of the pages for that keyword. So, for example, retailer.com/page1.html may be the number one result for searches for "watches", receiving 30% of the transitions from "watches" results pages; watches.com/page17.html, for example, may be the number two result for search for "watches" with 20% of the transitions.

Similarly, the web analytics system may compare the transitions from other keywords (e.g., "shoes") to the same page (viz., retailer.com/page1.html). So, for example, usage trails may reveal that 20% of the search traffic directed to retailer.com/page1.html comes from searches for "watches", while 10% of the search traffic to the same page comes from searches for "shoes."

As such, the web analytics system may have some knowledge about the amount of traffic a given website receives for various search queries performed by users. This knowledge may be used to identify websites that are relevant to particular user search queries.

In some embodiments, the web analytics system may start with a list of websites along with the amount of traffic driven to pages within each site by various keyword searches. For instance, the web analytics system may compute the following list of search keywords that drive traffic to individual pages of the website www.zillow.com:

TABLE 3

Illustration of traffic driven to zillow.com.

| Search Keyword | % of Traffic to Site | # of Times Search Occurred |
| --- | --- | --- |
| zillow | 26.95% | 1000 |
| zillow.com | 25.11% | 932 |
| www.zillow.com | 7.81% | 290 |
| zillow com | 5.15% | 191 |
| home value | 3.04% | 113 |
| home values | 2.95% | 109 |
| zillo | 2.09% | 78 |
| house values | 1.70% | 63 |
| www zillow com | 1.52% | 56 |
| house value | 1.11% | 41 |

For a given keyword listed in column one, column two shows the percentage of search-driven visits to zillow.com that resulted from searches for the given query term or phrase. The third column provides the number of times users performed the query and subsequently visited zillow.com. This information may be used, among other purposes, to provide a rough measure of which websites (as opposed to webpages) are relevant to a given keyword or phrase. Additional data may be used as supplemental measures of website popularity or relation to particular keywords. This data may include, for example, the number of page views over a given time period for each website.

Some embodiments may determine the likelihood that a user will visit a particular website, given a particular search query. See FIG. 17A. This information is useful for multiple purposes, and can be advantageously used to help generate a measure, such as a rank or score, for the strength of the "relatedness" of one or more candidate sites to a keyword/search query. The strength of the relatedness between a website and a keyword can be useful, for example, to determine whether it would be advantageous for a website owner to purchase new or additional keywords and/or whether it would be advantageous for a third party to purchase advertising space on the website for advertisements related to the keyword. To generate this likelihood for one or more sites, the system may perform a process that includes all or some of the following:

- Derive a popularity measure for each of the one or more sites at 1702;
- Measure the ease of content discovery for each website and each keyword at 1704, i.e., the ease with which a visitor to a given site will find information/content related to the search query;
- Apply various normalization and smoothing at 1706 transformations to these measures to account for, e.g., noise in the data;
- Generate and optionally order the results by a measure of relatedness of each website to each keyword as a function of the popularity and the ease-of-content discovery at 1708.

The following describes some implementations of similar algorithms. See FIG. 17B. Table 4 illustrates sample definitions for use in the following equations. Those of skill in the art will recognize that differing definitions, equations, and models may be used.

TABLE 4

Sample definitions for use in the following equations.

| | |
|---|---|
| traffic_count$_j$: | traffic count for site j over a period of time |
| query_count$_j$: | number of visits in the search log for that site j (or the number of times a user clicks on a search result for site j) |
| total_traffic_count: | sum of traffic_count for all sites |
| total_query_count: | sum of query_count for all sites |
| popularity(site): | query_count$_{site}$ |
| prob(query$_i$ | site$_j$): | Fraction of search-driven traffic to site$_j$ that comes from query$_i$ |

For example, the popularity of a site may be estimated using a measure of traffic volume to the site (or individual webpages of the site), such as query_count$_{site}$, i.e., the total number of queries which resulted in a transition to a page of the site. Alternatively, traffic_count$_{site}$, i.e., the total number of visits to the site (or page views of pages in a site) may be used as a measure of popularity. Of course, a combination of these two, or some other measure may be used. Because imperfect or incomplete traffic data may be available to generate these metrics (and the various other traffic-related metrics described herein), the actual data values used to perform the disclosed calculations may, and typically will, be estimates.

The ease of content discovery at 1726 (for a given query on a given site) may be estimated as a function of two components: (1) a likelihood that pages on the site (or, alternatively, traffic to pages on the site) are related to that query 1722 and (2) the difficulty of finding those related pages by navigating from the homepage (or a set of entry points) 1724 of the site.

The likelihood that the pages on a given site are related to a particular query 1722 may be represented as a simple percentage or otherwise normalized representation of pages on the site that are related to the query, according to some measure of relatedness. Relatedness may be determined, for example, textually, as by a lexical comparison of the keyword to a particular page. Alternatively, the likelihood measure 1722 may be inferred by comparing (and possibly normalizing) (1) the amount of traffic driven to the site that is attributable to searches of that and related or similar keywords with (2) the total amount of search-driven traffic to the site. A comparison may be implemented as $$\text{likelihood}(\text{query}_k, \text{site}_j) = \sum_i \text{similarity}(\text{query}_i, \text{query}_k) * \text{prob}(\text{query}_i \mid \text{site}_j)$$

Whether one keyword (term or phrase) is related or similar to another keyword may be modeled by, for example, determining whether one of the keywords is a substring of the other keyword. The similarity measure may be alternatively represented as $$\text{similarity}(\text{query}_i, \text{query}_k) = \begin{cases} 0, \text{ if } substr(\text{query}_i, \text{query}_k) == 0 \\ \text{APHA}^{-(word\_count(\text{query}_i) - word\_count(\text{query}_k))}, \\ \text{otherwise} \end{cases}$$

where ALPHA may be a constant that forms a heuristic base for expressing the difference between two similar queries. For example, ALPHA to a given power may express how different two queries are from each other if they differ from each other by only one word. In some embodiments, ALPHA may be set at roughly 2.

For example, assume a given site had a total of 3 search-driven visits over a given time period from users, where one visit was driven by the keyword "watches", one visit was for "wristwatches", and one was for "puppies." The likelihood that the pages on a given site are related to the query 1722 "watches" may be 2/3, because two of the three search-driven visits came from searches for keywords that are (improper) substrings of the query "watches".

A second component of the ease-of-content-discovery 1726 may be the estimated difficulty (or ease) of finding those related pages on the site 1724. Ease of finding related pages 1724 may be determined by structural analysis of the links between pages in a website, such as analysis of the set of entry pages of a website, and/or website graph depth analysis. Alternatively, ease of finding related pages 1724 for a given query on a given site may be represented as a function of the likelihood measure discussed above for the given query on the given site. Heuristically, the square root of the likelihood measurement for a given query may be used.

For example, ease of content discovery 1726 may be modeled as easy_to_find(query|site)=likelihood(site,query)*sqrt(likelihood(site,query))

Those of skill in the art will recognize that this equation models the measurement of ease of finding related pages on the site as a non-linear function of the likelihood that the site is about the query.

In some embodiments, once the popularity of a site 1702 and the ease of finding content on the site related 1726 to a query have been calculated, a score 1730 may be assigned to the site for that query (keyword). The score 1730 may be modeled as the product of popularity(site) and easy_to_find (query|site). Alternatively, a penalty 1728 may be applied to the score 1730 to account for noise or biases in the underlying data. Such a penalty 1728 may be calculated as follows:

$$\text{penalty}(\text{site}_j) = sqrt\left(\frac{\frac{\text{traffic\_count}_j}{\text{total\_traffic\_count}} + \frac{\text{query\_count}_j}{\text{total\_query\_count}}}{\frac{\text{traffic\_count}_j}{\text{total\_query\_count}}}\right)$$

Thus, the score 1730 to be assigned to a website for a given query could be give by:

score(site$_j$ | query$_k$) = popularity(site$_j$) * easy_to_find(query$_k$ | site$_j$) / penalty(site$_j$)

Of course, other scores may be calculated.

A data store may be populated with associations between search queries/keywords, websites, and scores 1730 as computed above. The system may thereafter present this information in various formats, such as a list of the ten highest-scoring websites for a particular query, the 5 highest-scoring queries for a particular website, and so forth. The scores may be used to model the relevance of a website to particular keywords, and may, for example, be used to implement portions of the site screener service depicted in FIGS. 1a-e.

The processes depicted in FIGS. 17A and 17B may be adapted to rank and/or order sites based on criteria other than relatedness to keywords as described above. The criteria may be applied to the pages of the site in order to draw conclusions about the website as a whole. So, for example, a set of sites may be ordered by a function of each site's (1) popularity as described above; (2) a measure of the difficulty of navigating from a set of entry pages of the website to webpages that satisfy the criteria.

For example, the filtering portions of the Site Screener service (see FIG. 1c) may filter websites based on applying a particular criterion to the pages of the site. Of course, the form of the actual calculation used to apply the criterion in factor (2) above may vary based on the type of criterion being applied. A keyword-based criterion might operate as above, e.g., by measuring relatedness to the keyword. Other types of criteria, such as the existence of advertising content or retail content, membership in a content category, company country, company state, and content language, may be applied to individual pages (or visitors of pages) and the subsequent results can be aggregated. So, for example, a criterion may apply to visitors of a webpage (such as a criterion where visitors must be at least 60% male). In these situations, the process may measure the ease of locating pages in the website that satisfy the "mostly male visitors" criteria.

In all of the above cases, multiple criteria may be combined together using logic connectives, such as Boolean or fuzzy logic, to form a single criterion. Such "subcriteria" can be any of the criteria listed or shown above in connection with the Site Screener. Of course, the foregoing descriptions are applicable to network resources generally.

Demographic Inference of Internet Users & Site Profiling

As discussed previously, users may or may not be required to provide demographic information when they, for example, download a toolbar (if toolbar-based data is used by the system). In addition, third party toolbar providers, if any, that report toolbar-based behavioral data to the web analytics system may or may not provide demographic information on users. As such, there may be many toolbar or service users for which the web analytics system does not currently possess user-supplied demographic information. However, various methods may be used to infer demographic data points about these users. For example, their Internet behavior may be compared with and related to that of users for whom the web analytics system does possess demographic information.

For the sake of discussion, users for whom the web analytics system possesses usage trail data may be divided into at least two types: Type 1 users are those for whom relevant demographic information has been obtained; Type 2 users are those for whom relevant demographic data has not been obtained. Of course, because users may choose to provide some demographic data but not others, a given user may be classified as Type 1 for one category of data and Type 2 for another. So, for example, a user who has revealed his gender but not his age may be classified as Type 1 for the gender category and Type 2 for the age category. Demographic information may be obtained as described above, such as through usage trails, toolbar data, surveys of users who have downloaded toolbars. Other entities may provide demographic data to the web analytics system, such as a website that obtains demographic data from its users.

Some embodiments of the web analytics system may use elements of the following algorithm depicted in FIG. 18A:

1. Train a classification, inference, and/or extrapolation system at 1804 (hereinafter collectively referred to as a 'classifier') based on demographic information and the network usage information, such as usage trails, keywords, search queries, website visits, and webpage visits, of Type 1 users; and 2. Use (apply) the classifier to classify Type 2 users at 1806 or infer or extrapolate data about such users based on their network usage information.

For example, with respect to the category of gender, the classifier may first be trained to associate certain types of or patterns in usage trails as indicative of gender. The classifier may be trained using at least some of the network usage information and demographic information relating to a selected group of some or all Type 1 users. For example, the classifier may be trained using at least some Type 1 users' network usage information as an input training set and demographic information as the output training set. Thus, if the classification system sees that, for example, 95% of the Type 1 usage trails that include heavy usage of Shape Magazine (shape.com) and Self Magazine (self.com) belong to users that report themselves as female, the classifier may associate such women's-fitness-magazine-heavy usage trails with female users at 1808. Such an association may be stored in a database or data store. Similarly, if 92% of Type 1 usage trails that include heavy usage of Men's Fitness Magazine (mensfitness.com) and Muscle and Fitness Magazine (muscleandfitness.com) belong to users that report themselves as male, the classifier may associate such usage trails with males. Of course, if the classification category at issue were "Health and Fitness," both groupings of usage trails may be mapped to concern with fitness.

In some embodiments, the learning method may use naïve Bayes classification. (See, e.g., Rish, Irina. (2001), "An empirical study of the naïve Bayes classifier," IJCAI 2001 Workshop on Empirical Methods in Artificial Intelligence, available at http://www.research.ibm.com/people/r/rish/papers/RC22230.pdf, last accessed Jun. 13, 2008, which is hereby incorporated by reference in its entirety.) Use of a Bayes filter may account for and reduce the effects of bias in usage trail data, such as sites visited by a disproportionate number of members of a demographic category. The learning sets for the Bayes filter may, in some cases, be limited or controlled in order to assure that the filter learns only, or principally, from properly weighted training sets, such as training sets with a properly weighted distribution of users with known (express or implied) demographics. Numerous other classifiers, such as decision trees, artificial neural networks, support vector machines, expert systems, nearest-neighbor classifiers, and other embodiments of machine learning algorithms, can be used in addition or alternatively to a Bayes classifier. Multiple classifiers may be used in a voting mechanism, e.g., wherein multiple "subclassifiers" contribute votes on classifications. For convenience, much of the following discussion uses naïve Bayes classification as an example, however alternative classifiers as discussed above are readily adapted for use herein.

As shown in FIG. 18B, in other embodiments, the classifier may first compute a likelihood score 1822 (not to be confused with the likelihood discussed above) for every website/demographic category combination. The likelihood measure 1822 may model the probability that a Type 1 member of the given category has visited the website in question. So, for example, if there are 1000 user-members in the "male" category, and 300 of them have visited mensfitness.com within the relevant time period, the likelihood(male, mensfitness.com) may be 30%.

Some embodiments may attempt to eliminate bias from the classifier that may result from skews or biases in the underlying distribution of Type 1 users over categories. (For example, users may be systematically likely to under-report their age or weight, or over-report their income, even in anonymous surveys.) To address this issue (and others), some embodiments may calculate likelihoods for only a subset of Type 1 users. One such subset may be users who have been vetted according to some process, such as phone calls.

Moreover, poorly represented categories may impede the classifier from accurately classifying even well-represented categories. To address this issue, as well as others, some embodiments may calculate likelihoods for only a subset of the possible categories. For example, if not enough users (according to some metric) report that they are in the "65 and older" category, this category might not be used as a learning target.

After computing likelihoods for the relevant users, categories, and sites, some embodiments may compute a prior 1824 for every demographic category. The prior 1824 may model the distribution of Type 1 users over the available categories. So, for example, the prior 1824 for a given category may be the fraction of Type 1 users who fall into that category.

In some embodiments, after being trained according to one or more of the methods disclosed above, type 2 users, i.e., those who have not provided demographic data to the web analytics system, may be classified. The classification system may attempt to perform a best-fit analysis of the usage trails of type 2 users. As such, returning to the fitness magazine example from above, if a usage trail of a type 2 user contains heavy usage of mensfitness.com and muscleandfitness.com, but no (or hardly any) usage of shape.com or self.com, the system may infer that the type 2 user is male. If a usage trail contains both typical men's magazines and women's magazines, then the classifier may have to resort to using other empirically-derived rules (such as those that consider accesses to sites of mothers' and fathers' magazines) to assign type 2 users. Alternatively, the classifier may view the gender of a type 2 user as being indeterminate. Confidence values may be used to depict the confidence in a particular classification.

In some embodiments, classification of type 2 users may proceed by assigning a feature vector (i.e., a Type 2 user's usage trail) to a category if the posterior for that feature vector/category combination is greater than for every other feature vector/category combination. At 1826, the posterior 1826 may be calculated from a multi-category discriminant function based on the Bayes theorem and/or may use the assumption that a usage trail can be modeled as a feature vector with binary, conditionally independent features. An example of such an algorithm includes:

For a given Type 2 user's usage trail in all Type 2 users' usage trails:
    For each demographic category in all categories:
        For each website in the usage trail:
            Lookup the computed likelihood score for this category/website combination at 1822;
        Lookup the computed prior for the category at 1824;
        Compute the posterior for this category/usage trail combination at 1826; and
        Assign the usage trail to the category with the greatest posterior at 1828.

For example, assuming a type 2 user has a given feature vector (i.e. usage trail) which includes accesses to sites A, B, and C (perhaps in order). A system may calculate P(male|C|B|A), which is a model of the posterior probability that the user is male given that the user visited websites C, B, and A. The system may also calculate P(female|C|B|A), which is a model of the posterior probability that the user is female given that the user visited websites C, B, and A. The system may then assign the given type 2 user to the male or female category based on whether P(male|C|B|A) or P(female|C|B|A) is greater.

Inferred demographics of users may be useful in their own right. For example, advertisements may be targeted to users visiting various sites and other network resources based on the users' inferred demographics. Additionally, however, inferred demographics may be useful in building demographic profiles of particular sites. For example, by placing sites into industry profile categories, advertisers may be able to use the system to locate all (or numerous) sites within a given category, and, thereby, for example, identify sites that cater to their target market segment.

One method of categorizing sites, such as websites, may be performed as follows: Assume firstly that no Type 1 visitors have visited a new site, siteX.com. Assume further that 100 type 2 visitors have visited siteX. Without inferring demographics, it would be difficult or impossible to assign a demographic profile to siteX, since no Type 1 users have visited siteX. However, if demographic inferences, as discussed above, show that 95% of the 100 Type 2 visitors are likely male (based, for example, on their heavy accesses to mensfitness.com and other sites frequented by males), it may be inferred that the demographic profile of siteX is largely male.

In some embodiments, as depicted in FIG. 29, overall demographic profiles for websites may be constructed 2908 according to an algorithm similar to the following:
    Create demographic profiles for websites based on the known demographics from Type 1 users at 2902.

Create demographic profiles for websites based on the inferred demographics from Type 2 users at 2904. As discussed above, demographics may be inferred by applying a classifier to network usage information of the Type 2 users, wherein the classifier is trained in part using network usage information and demographic information of Type 1 users who have explicitly supplied demographic information.

Combine the two website demographic profile sets, while accounting for any differences in categories available to Type 1 and Type 2 users at 2906, to assign demographic profile information to the network resource.

Those of skill in the art will note that differences in categories represented in the Type 1 and Type 2 profiles may arise, for example, if a category was eliminated from the learning or training mechanism due to, e.g., low sample size or improper skew, as described above. Additionally, steps in the process may use all or only a subset of the information, e.g., websites, in a usage trail in order to perform classifications. Whether the entire usage trail is utilized may depend on whether the user is Type 1 or Type 2 for a given category or on other factors.

The demographic information from both Type 1 users and Type 2 users may be used in combination with their usage trail data to generate demographic profiles for particular sites. For example, a demographic profile for a website may indicate that the website is very popular among users in the category "male" and unpopular among users in the category "female." See FIG. 4. Demographic profiles for a site may be generated by comparing and combining the demographic profiles of a certain set of users of the site, such as monthly visitors, as weighted by a factor, such as total visits, total time spent at the site, unique page visits, etc., or no factor at all. For example, a higher relative number of monthly visits from unique users with a particular demographic profile, whether implicit or explicit, as revealed by analysis of usages trails, may be used to provide a higher likelihood of one or more particular demographic profiles for a particular website. The weighting factor may thus adjust the strength of the usage trail or profile information from any one user attributable to the site.

Network usage information may include a number of types of information or events related to networks, such as site access events and codes, search query submissions/keywords, length of time spent on particular pages/sites, and transition frequency. This information may be used alternatively or additionally to site or page identifiers, such as URLs, to infer and extrapolate demographic data, and, in some cases, the classifier will be trained to account for the information available to it. So, for example, a classifier may use this additional information to perform increasingly precise distinctions, such as distinguishing between two users, the first of whom is a person who visits site Y and spends an average of several seconds looking at each page, and the second of whom is a person who visits the same site Y, visits the exact same pages of Y, but spends 15 minutes on each page. The analytics system may also use the above methods to classify particular units of network data, such as keywords, search terms, IP addresses, etc. For example, rather than identify visitors to the network resource, the system may identify users (or holders, readers, creators, etc.) of particular network data. These users may be divided into Type 1 and Type 2 users, and the inference systems discussed above may be used to infer demographic information of a user by applying a classifier to network usage information of the first visitor.

The classifier can be trained in part using network usage information and demographic information of users who have explicitly supplied network usage information other than, or in addition to, usage trail data. The inferred demographic data may be used, alone or in combination with known demographic data, to assign demographic data to the network data. Additionally, the system may infer data other than demographics, both to network resources and network data, using the methods described above.

So, for example, with respect to FIG. 29, a demographic profile of a particular keyword may be generated using the algorithms discussed above. So, for example, the system may determine that a certain keyword is, e.g., twice as likely to be used, e.g., entering as search query, by females rather than males. Such information may be useful, inter alia, for site owners wishing to purchase keywords from search engines. The system can perform this operation as discussed above (replacing sites with keywords) and as summarized briefly below:

(1) create a set of demographic profiles for the keyword(s) based on the known demographics from Type 1 users of the keywords at 2902;

(2) create a set of demographic profiles for the keyword(s) based on inferred demographics from Type 2 users of the site at 2904, such as by applying a classifier to network usage information of the Type 2 users, wherein the classifier is trained in part using network usage information and demographic information of Type 1 users who have explicitly supplied demographic information; and (3) combining the two demographic profile sets, while accounting for any differences in categories available to Type 1 and Type 2 users at 2906, to assign demographic profile information to the keyword.

Website Categorization Using Click-Stream Data

Some embodiments of the web analytics system may categorize a given website into one or more available categories in part by identifying the websites related to the given website, and by examining the categories to which these related websites belong. For example, if a certain threshold number of websites related to the given website belong to a given category, the probability that the given website also belongs to that category may be high.

To categorize a target website, some embodiments may obtain a set of previously categorized websites. Each of these websites may have been categorized using the same methodology as to be applied to the target website; alternatively, some or all of the websites may have been categorized through other means, such as manual categorization, lexical analysis, semantic analysis, recommendation systems, analysis of other categorization authorities, outright purchase of data, and/or as well as other means not listed.

Some embodiments may also access information regarding the relatedness of websites, as discussed in the present disclosure. Relatedness may be calculated in many ways, including lexical analysis, semantic analysis, analysis of sage trails, and so forth.

As illustrated in FIG. 19, to classify an uncategorized website w, some embodiments may generate a set G of websites related to w at 1902. A threshold value θ for relatedness may be used, such that the set G of related links contains only links to websites whose similarity to w exceeds θ according to some measure. Various measures are appropriate, including a measure of similarity distance $d(w1, w2)$, which may be calculated via link analysis, lexical or semantic analysis, and so forth.

At 1904, some embodiments may calculate a set $G_c$, where $G_c$ contains only the websites in G that have been categorized as belonging to category c. So, for example, if G={shape.com, self.com, rolex.com}, then $G_{fitness\_magazines}$ may be {shape.com, self.com}.

Some embodiments may assign a likelihood that website w belongs to category c at 1906. The likelihood function $P_c(w)$ may designed such that w is more likely to belong to c if, for example, the average similarity between w and the set of sites which are both related to w and contained in c, is greater than a threshold $\phi$. P may also take account of the similarity between w and the websites g in $G_c$, such that $P_c$ may be relatively high if w and some (or all) $g \in G_c$ are relatively similar.

In some embodiments, a website w may be associated with multiple categories c. For example, w may be associated with all c where $P_c(w)$ is above a threshold $\phi$.

A set $G^1$ may be obtained, where G' is the set of all websites related to G (=$G^0$). Similarly, a set $G^2$ may be obtained as the set of all websites related to $G^1$. This process may be continued to an arbitrary depth d+1. The foregoing process may thereafter be carried out on $G^d$ (rather than merely G).

Some embodiments may filter out less likely or common categories c. For instance, in some embodiments, only the categories with the highest "importance" may be candidates for associations with uncategorized websites w. The list of important categories may be chosen by multiple means at 1904, including manual selection and analysis of user trails. For instance the set of important categories may be defined to include only those categories c that have been associated with "important" websites, where the importance of websites may be modeled by, for example, total traffic over a given period of time.

In some embodiments, the categories may be in a hierarchical relationship (such as hierarchical relationship between sample category california-based, illinois-based, and united-states-based). In these cases, a subcategory (such as california-based) may be included as a possible target category for association with websites if its parent category (united-states-based) is "important" (as defined above), even if the subcategory is not itself "important" as defined above. In other words, importance may be inherited. In some embodiments, importance may be inherited from any ancestor or ancestors within a certain distance.

Website categorization data may be presented to a user and/or stored persistently. The system may provide, for a given website w, all of the categories c to which w belongs. The system may also provide, for a given category, all the websites which belong to the category, or all the websites that meet certain other criteria. See FIG. 1a. A more rigorous description of a categorization algorithm is provided in Appendix A.

Shortest Path Analysis for Website Optimization

As discussed above, search engines crawl websites and index pages of those sites. The process of indexing typically includes retrieving a given page, analyzing it, such as by keyword or popularity analysis, and making it available as a possible result in a search results page. Search engine optimization (SEO) refers to the goal of increasing the percentage of pages of a website which are indexed and improving the ranking of those indexed pages in searches results. A search engine may consider a number of factors when deciding whether or not to index a page and what ranking to assign to it. These factors include:

1. The number of high quality links-in from external websites to a given page (higher is better);
2. Whether the website topology (link structure) is well-designed; and
3. The amount (and perhaps quality) of web traffic to a given page.

In particular, the search engine crawlers (robots) that download pages across the Internet for indexing search engines may make decisions about which webpages to download and/or index. These decisions may be made, at least in part, by determining the likely importance of the page. This importance measure may be determined by using graph algorithms like Google's PageRank, user traffic information, the topology of the Internet and the individual website, and various other measures. In some cases, the greater the distance a given webpage is from an important page (perhaps measured in links), the less likely the robot is to download that page. For this reason, in general, webmasters looking to optimize their site's coverage in search engines should strive to minimize the distance from popular pages to the rest of the pages on their website.

With reference to FIG. 20, some embodiments of the system identify inefficiencies in the topology of a website. One method of doing so is to craft a measure of the minimum distance between website entry points (i.e., the set of first pages that users typically see when they ingress to a website, such as a homepage or a page that already ranks highly as a search result) and all other pages on the site. This measure is useful in its own right and may be presented to website administrators. Additionally, the set of entry points may be used to calculate an indicator of changes that may be made to the link structure of the website to improve its overall search performance.

The set of entry points of a website may be obtained at 2002 by multiple measures, including (1) purchase of data from external search engines, (2) real or simulated running of an internal search engine to determine high-ranking pages, (3) analysis of usage trails, and/or (4) performing a broad web crawl to identify external links to pages in the website. Alternatively or additionally, the set of entry points may be modeled or approximated by another measure, such as the most frequently visited pages on the website.

In some embodiments, the system may obtain detailed topological information for a website by performing a deep crawl of the website at 2004. Using this information and the set of entry points, the length of the shortest path between the set of entry points and each page on the site may be determined at 2006. A model, such as fan-out, may be used to determine whether the website topology, as characterized by the set of shortest paths, is suitably efficient to promote page downloads by search engine robots.

Some embodiments implement a similar algorithm, as described below. In such embodiments, a given link on a particular source webpage of the site may be considered to be a unique link if the link does not exist on other pages of the website at the current source page's depth or lower. The depth of a page, as used above, may include a measure of the length of the shortest path between this page and the nearest entry point. Put alternatively, the depth is the minimum distance from the current page and a page in the set of entry points. Value L may be a representation of the minimum number of unique links that a page should have in order to sufficiently promote page downloads by search engine robots. Typical values for L may range between 2 and 50, depending on several factors.

A measure of the efficiency of the link topology of the site may then be calculated as follows: Let E be the set of entry points to the website; N be the number of pages retrieved from the website; and C be an empty set. Using a shortest-path algorithm such as Dijkstra's algorithm, compute the length of the shortest path between the set of entry points E and each page on the site. Then, for $M=2\to\infty$, perform the following loop:

Let A be the set of pages whose shortest path length from the set of entry points is less than or equal to M. If |A|=0, break out of the loop.

Let B be the set of pages whose shortest path length from the set of entry points is strictly less than M.

Let N=max(1, ⌈ log L(|A−E|)−log L(|E|)⌉). This models the allowable distance for pages in (A−B) under a fan-out model where each page has at least L unique links.

If M>N, then let C=C∪(A−B) and repeat the loop with M incremented.

Those of skill in the art will recognize that this algorithm produces a set C which contains all pages in the website whose shortest path to an entry point is longer than the heuristic allowable distance 2008. Additional information regarding Dijkstra's algorithm may be found in Thomas H. Cormen, Charles E. Leiserson, Ronald L. Rivest, and Clifford Stein, Introduction to Algorithms, Second Edition. MIT Press and McGraw-Hill, 2001. ISBN 0-262-03293-7. Section 24.3: Dijkstra's algorithm, pp. 595-601, which is hereby incorporated by reference in its entirety.

The cardinality of the set C, or the percentage of pages of the website in C, which may be represented as |C|/|N|, may be used as a measure of the inefficiency of the link structure of a website. Alternatively or additional, the set C itself, or a subset thereof, may be used to determine which pages of the website should have their minimum distance from an entry point decreased in order to facilitate search engine placement. See FIG. 10*b*.

Links-in: Representing the Relationship Between Website Citations and Traffic Rank The system may provide some or all of the following features: (1) an ability to benchmark a website against other websites with similar amounts of Internet traffic; (2) an ability to identify the incremental number of external links-in a website may need to gather to generate incremental Internet traffic; and (3) an ability to represent this information in an intuitive manner.

Websites with large numbers of high-quality external links-in typically receive more Internet user traffic than websites with fewer high-quality external links-in. If a direct relationship exists between the number of high-quality external links and the level of user traffic, this relationship may be used to identify the likely number of additional high-quality external links-in necessary to sustain a given increase in Internet user traffic. By representing this relationship graphically, a large amount of information may be communicated quickly and intuitively.

In some embodiments, the system may generate a measure of the quality of incoming links to a particular website to be analyzed. The measure may include a count of the number of high-quality websites that link in to the website, where "high-quality websites" may be modeled as websites with a total traffic rank of between, for example, 1 and 100,000. Alternative measures or models may be used, such as manual selection, rank between 1 and 1000, rank greater than that of the website being measures, and so forth. Traffic rank may be modeled on data from the web analytics system, data purchased from other providers, and so forth.

The system may compute a high-quality external links-in rank-order as a function of a measure such as traffic rank as follows, as shown in FIG. 21:

Bin websites by traffic rank at 2102;
For each such bin, lookup the number of high-quality external links-in to each site in the bin at 2104; and
Order the sites in the bin by high-quality links-in counts at 2106.

For example, websites may be binned together based on the $\log_{10}$ of their rank, e.g., all sites with rank between 1 and 100 are binned together, sites with rank between 100 and 1000 are together, etc. This produces bins of roughly comparable websites. For each such bin, each website in the bin may be analyzed to determine the number of the high-quality external links-in at 2104. An algorithm similar to that described above may be used. Subsequently, the sites in the bin may be ordered by the number of high-quality links in at 2106. For example, in the bin of sites ranked 100-1000, site number 117 (by traffic rank) may have the highest number of high-quality links in (e.g., 2000 links in) while site number 920 (again, by traffic rank) may have the lowest number of high-quality links-in (e.g., 100 links in). This data is useful in its own right. For example, it may be used to generate percentiles of links-in for comparable sites at 2106. This data could be presented to a user in the form of "Of websites with traffic ranks between 1,000 and 1,500, 10% have at least 100 high-quality links in, while 50% have at least 20 high-quality links in."

Additionally, however, the data may be used to determine, for a given website, both its proper bin and its percentile rank within the bin. Some embodiments may use an algorithm similar to the following, as shown in FIG. 21:

For the website in question, lookup both the number of high-quality external links-in and the traffic rank of the website at 2108.
Compute the high-quality links-in percentile for the website in the appropriate rank bin. An interpolation method, such as linear interpolation, may be used to compute the actual percentile for the website.
Represent the location of the website within the rank-links space at 2110. The representation may have one axis, perhaps the horizontal, representing traffic rank buckets, and the vertical axis may represent links-in. The percentiles, perhaps represented as percentile-decades, may be connected across buckets, e.g., a line is drawn to connect the 10th percentile website of each of the buckets.

Figure 22:
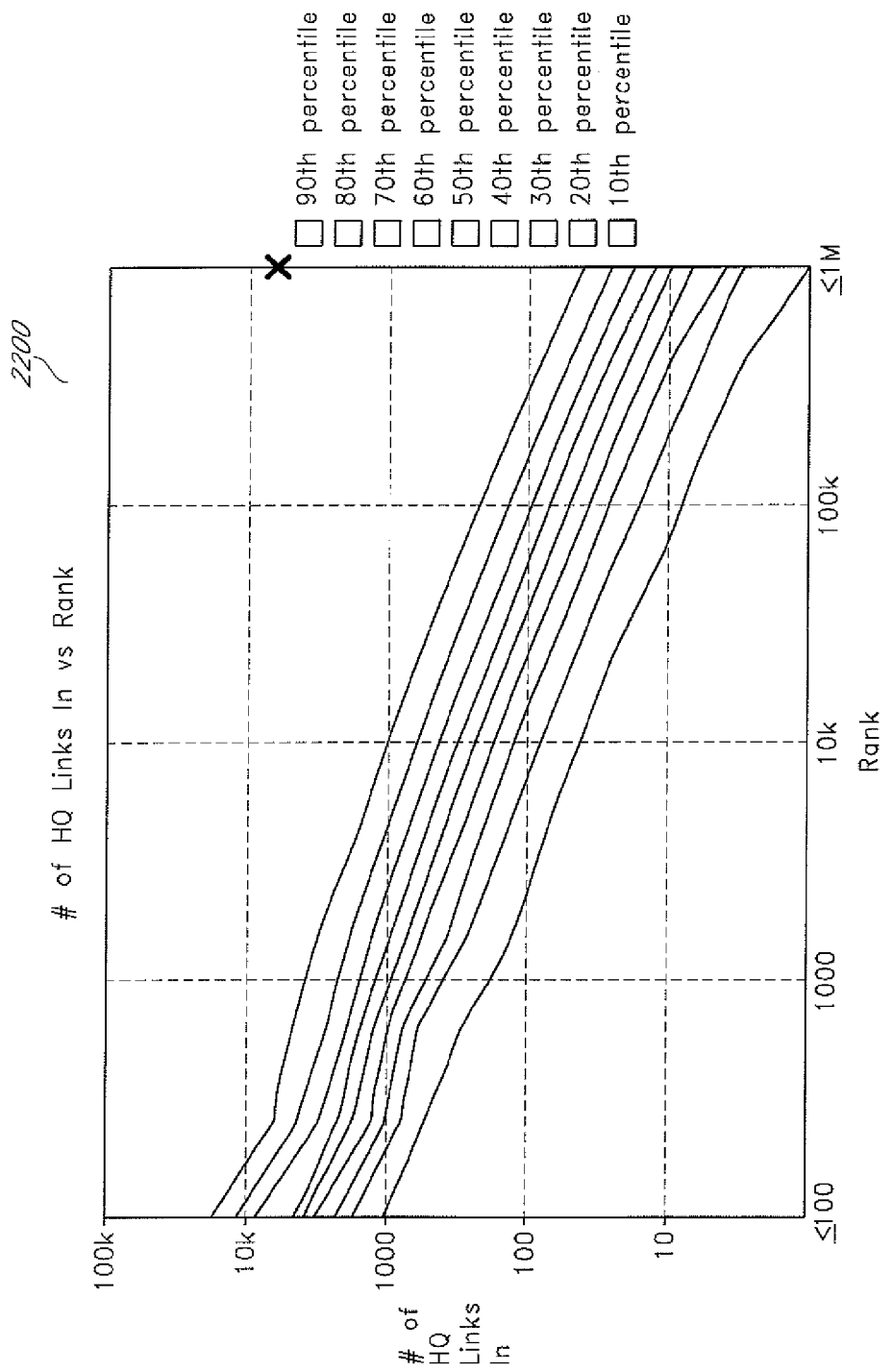
FIG. 22 is a screenshot illustrating a graph that depicts the relationships between website citations and traffic ranks according to the method of FIG. 21.

An example illustrating sample results of a similar algorithm is shown in FIG. 22.

This information may be presented to a user of a web interface of the web analytics system, in a graph format 2200 as shown, and/or in a textual format.

Keyword Recommendation System Using Noun Phrase Parsing

With respect to FIG. 23, the system may identify keywords and/or search query terms which may be effective traffic generators for a given website. These embodiments may allow advertisers to purchase SEM keywords (as discussed above) more effectively.

In order to suggest keywords for a given website, some embodiments may retrieve all or part of the content of the website in question. This may be done by performing a crawl of the website, possibly in real-time, to gather the webpages. Gathered webpages may be parsed to separate the content on each page. The parsed content may be analyzed for statistically significant keywords, including both key terms phrases, that users likely use in searching for the content.

The system may also retrieve information about search query volume. For example, information about the various search queries users make, and the number of times each query is made, may be obtained from toolbar-reported activity data, as discussed above, or by other means, such as purchase from data providers.

Some embodiments may endeavor to provide a list of keywords that are significantly important to the site (according to some measure). To generate a list of important single-word keywords, a statistical significance test, such as Pearson's Chi-square test or a T-test, may be used at 2304 after generating an initial keyword candidate list (as by lexical analysis or dictionary search). Generally, Pearson's Chi-square test may be used to examine the likelihood that the frequency distribution of certain events observed in a particular sample is consistent with a particular theoretical distribution. In embodiments implementing Pearson's Chi-square, the sample may include all (or some) of the text extracted from pages in the given website. The observed events may include the word frequencies in the sample. The theoretical distribution of those events may be the expected word frequency based on the global word frequency on the Internet. In other words, according to these embodiments, Pearson's Chi-square test may help examine how likely the frequency with which a word appears on a website is consistent with the word's general frequency distribution over the whole web. Those words with an observed frequency higher than expected by the global distribution may be marked as potential or recommended keywords.

With further reference to FIG. 23, the above algorithm may also be applied (with little or no modification) to multiple-word keywords (i.e., phrases) at 2306. Alternatively, however, some embodiments may employ a technique similar to shallow parsing to select particular phrases over other candidates. Shallow parsing, also called chunking or chunk parsing, may involve lexical analysis or parsing of a sequence of tokens (such as words in a keyword phrase) to identify sub-groupings such as noun and verb groups. (See, e.g., "Partial Parsing and Interpretation," available at http://nitk.org/doc/en/chunk.html, which is hereby incorporated by reference in its entirety.) So, for example, embodiments which take advantage of mechanisms similar to shallow parsing may be designed to give preference to selections of human-understandable keyword phrases such as "New York City" instead of similar key-phrases such as "York City". As the frequencies of "New York City" and "York City" may be very similar in both the observed sample set (e.g., all the pages from one site) and the theoretical population (e.g., all the pages from all websites), it is possible that both phrases may have similar chi-square scores for a given website. In order to select "New York City" instead of "York City" as a candidate for key-phrase analysis, the lexical analyzer may be designed to select entire noun phrases (rather than subsets of noun phrases) as key-phrase candidates for chi-square testing. As such, in some embodiments, only these entire noun phrases are analyzed, thus potentially reducing the computational costs of the statistical testing, as many fewer multi-word candidates may be tested. Of course, other parsing and lexical analysis tools and methods may be used, such as deep parsing, tree parsing, natural language parsing, and so forth.

Another practical difficulty for key-phrase analysis is that the computational complexity of the algorithm used to obtain the global frequency for all the candidate phrases grows exponentially with the number of words in the phrase. Moreover, this computational complexity grows linearly with the size of the sample. As such, in practice, it may be computationally expensive to compute global frequency over the web for all phrases. Some embodiments may directly apply a statistical test, such as Pearson's Chi-square, to multi-word candidates, thus incurring the computational costs. On the other hand, some embodiments may apply simplifying assumptions. For example, some embodiments may approximate the statistical test scores for multi-word phrases by computing the average of the test scores for each (or a subset) of the constituent words in the phrase. Other similar simplifying algorithms may be used.

Other embodiments may perform an algorithm that includes some or all of the following elements:
- Strip tags from webpages for the given website to build the text sample for the site 2302.
- Apply parsing, part-of-speech tagging, and/or token analysis to identify nouns as single-word candidates for the keyword analysis 2304.
- Apply a chi-square test to assign scores to all single-word candidates 2304.
- Apply a form of parsing such as shallow-parsing to identify multi-word candidates for keyword analysis 2306.
- Compute the average chi-square scores for all single words in multi-word candidate, and assign it as the chi-square score for the candidate 2306.
- Sort all the single-word and multiple-word candidates by their chi-square score 2308. Higher scores may indicate higher likelihood that the word/phrase is important for the site and thus may be a good candidate for SEM keyword purchase.
- Present the candidates, or the N highest ranking candidates, to a user 2310.

The scores and rankings may be used or presented in combination with other results. For example, the rankings may be modified as a function of the cost (real or estimated) of obtaining or purchasing a particular keyword. Alternatively, a webmaster of a particular site may be able to submit a set of potential candidate keywords for scoring and analysis according to the above methods.

Keyword Optimization Recommendation System Using Search Frequency and Rank

Many webmasters may not know which search keywords they should optimize their sites for because the webmaster does not have sufficient knowledge of Internet user behavioral interaction with search engines. The system may address this issue by identifying the keywords on a website that provide potential for generating incremental traffic to the website based upon known user search behavior. Some embodiments identify the value (in terms of likely increase in traffic) of a marginal increase in search results rank for a given keyword (search query). Similarly, some embodiments may identify a set of keywords which, given a marginal improvement of rank for the website in the organic search results for a keyword in the set, represent an opportunity for incremental traffic increases to the website.

With reference to FIG. 24, some embodiments may compute or obtain the set (or a subset) of search queries for which the website to be analyzed appears in the search results. Possible subsets include the set of results for which the website ranks well or ranks poorly. Alternatively, the subset may be a comprehensive list of queries. Several techniques may be used to identify the candidate set of queries, including lexical analysis of the website, and so forth.

Some embodiments may also compute or obtain data regarding search query volume. In particular, a web analytics system, utilizing data collected from toolbars or participating sites, may have access to information about the various search queries users make and the number of times each query is made.

For each query/keyword, some embodiments may compute the rank of the website in question for various search engines. This data may be obtained by actually executing the search on a given search engine. Alternatively, the search engine results may be modeled or simulated. Multiple search engines may be consulted for each query. The highest rank of the website for each identified search query may be stored in a data repository.

Some embodiments may calculate a marginal potential for a given keyword/website combination. The marginal potential may be modeled as a function (such as product) of (1) the incremental increase in likelihood that a user will click on the link to the website if the website's search result rank improves by one spot and (2) the number of users who search for the given query in some time interval. The marginal potential for various candidate keywords may be calculated, ranked, and presented to the user.

Some elements from following algorithm may be used in a system:
- Identify the candidate search keywords 2402 using one or more of several methods, including:
  - The <meta> keywords on the site, or other tagged values, including submissions by webmasters.
  - Statistically significant words and word phrase analysis.
  - A method using noun phrase parsing described above.
  - Accessing information regarding the search queries that drive users to the website from search engines.
- For each candidate search query, identify the rank of the website in a search engine (or multiple search engines) for that query 2404.
- Model the likelihood of user click-throughs as a function of search result rank by using empirical data that tracks user click-throughs on search result pages 2406.
- Compute the potential incremental traffic increase by multiplying the likelihood of traffic improvement for the search query with the query volume 2408.
- Sort candidate search queries by score 2410.
- Store or present results, e.g., a sorted list of highest scoring keywords, to a user 2410.

Statistically significant words and word phrase analysis includes using algorithms similar to the term frequency-inverse document frequency (TF/IDF) approach, whereby the significance of a term for a website or webpage is modeled by a function of the frequency of occurrence of that term in the website or page compared to the frequency of occurrence of that term in a broader corpus. (See Ramos, John, "Using TF-IDF to Determine Word Relevance in Document Queries," Department of Computer Science, Rutgers University, available at
http://www.cs.rutgers.edu/~mlittman/courses/ml03/iCML03/papers/ramos.pdf.).

Modeling of the likelihood of user click-throughs may be accomplished by simulating search engine click-throughs or heuristically. For example, heuristics may show that 20% of users click on the first search result, while only 1% click on the eleventh result. A set of heuristics may be applied broadly (applying the same heuristics to all search terms) or may be applied more narrowly, such as categories of search terms (e.g., single word terms, household terms, proper names, etc.) or search terms themselves. For example, heuristics may reveal that roughly 30% of users click on the first search result link for the term 'mesothelioma,' an average of 24% of users click on the first search result link for search terms related to pharmaceuticals, and an average of 20% of users click on the first search result link for the terms generally.

Results may be stored to a data store for further processing. Results may also be presented to a user, e.g., a webmaster. See, e.g., FIGS. 13b and e.

Keyword Recommendation System Using Related Site Analysis

Some embodiments of the web analytics system may identify the related sites, such as competitors, of a given website who are receiving a significant amount of traffic from search engines. These embodiments may also identify the search queries (keywords) that are driving this traffic. By identifying the search queries that drive large amounts of traffic to related sites, such systems may pinpoint the source of the related sites' success. This information may be used to inform webmasters of SEO and SEM-related opportunities to attract new visitors. While the following will be described with reference to related sites that are competitors of a given site, the disclosure is applicable to other types of related sites, such a co-cited sites, cooperative sites, industry sites, and so forth.

With reference to FIG. 25, an algorithm similar to or including some or all of the following may be used:
- For a given indicated subject website w, generate a set of the top N competitor websites at 2502;
- For each competitor website, identify the search queries that are attributable to significant amounts of user traffic to the website at 2504; and
- Store or present competitor/search query information at 2510.

Of course, additional elements to the algorithm may be present, including combining the competitor/search query information with other information, including, for example, current or historical search query term auction prices.

In some embodiments, information about related links (as described above), e.g., through usage trail data reflective of site accesses by users, may be used to identify competitor websites at 2502. Alternatively or additionally, competitor websites may be obtained directly from a webmaster, an online directory, search engine data, usage trails, a user, and/or other source of information. Co-citation information, e.g., mutual links from 3rd other sites, may also be used.

Search queries that drive user traffic to competitor websites at 2504 may be identified in various ways, including using toolbar-reported or site-reported usage trails as described above. Additionally or alternatively, such information may be purchased from search engine providers or other data sources.

The resulting information may be presented singly or in combination. Illustrative examples have been provided as shown in FIGS. 13a and 26. For example, a matrix or table 1304 may be generated, wherein some or all of the following are provided:
- The list of competitors
- For each competitor, the list of search queries that drive the most search traffic to that competitor
- For each of these search queries, the current search rank of the competitor for the query, the current search rank for the customer's website, and/or the search volume for the query.

Figure 27:
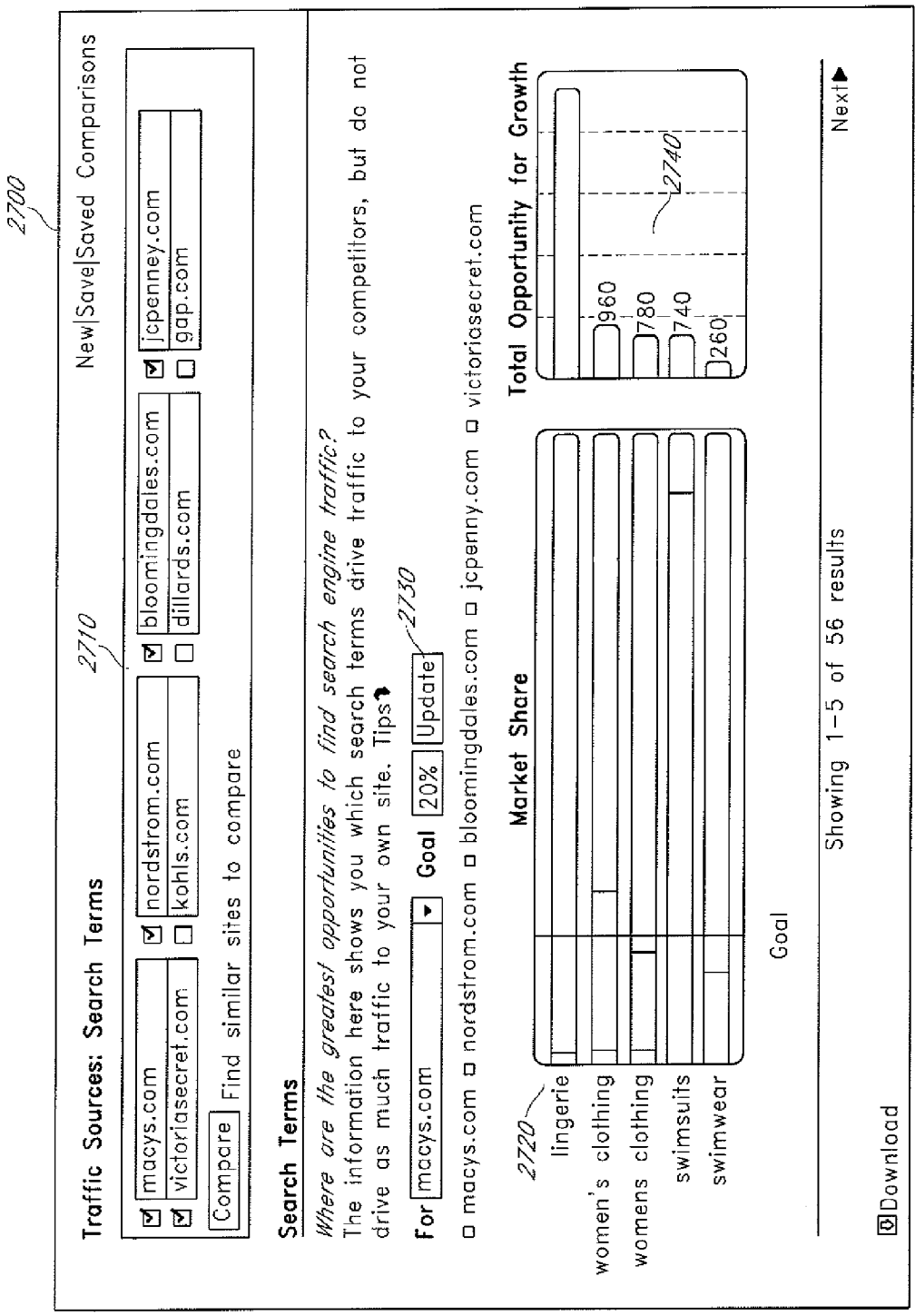
FIG. 27 is a screenshot illustrating a display of market information and growth opportunities in various keywords for a given website and competitors of that website.
Figure 28:
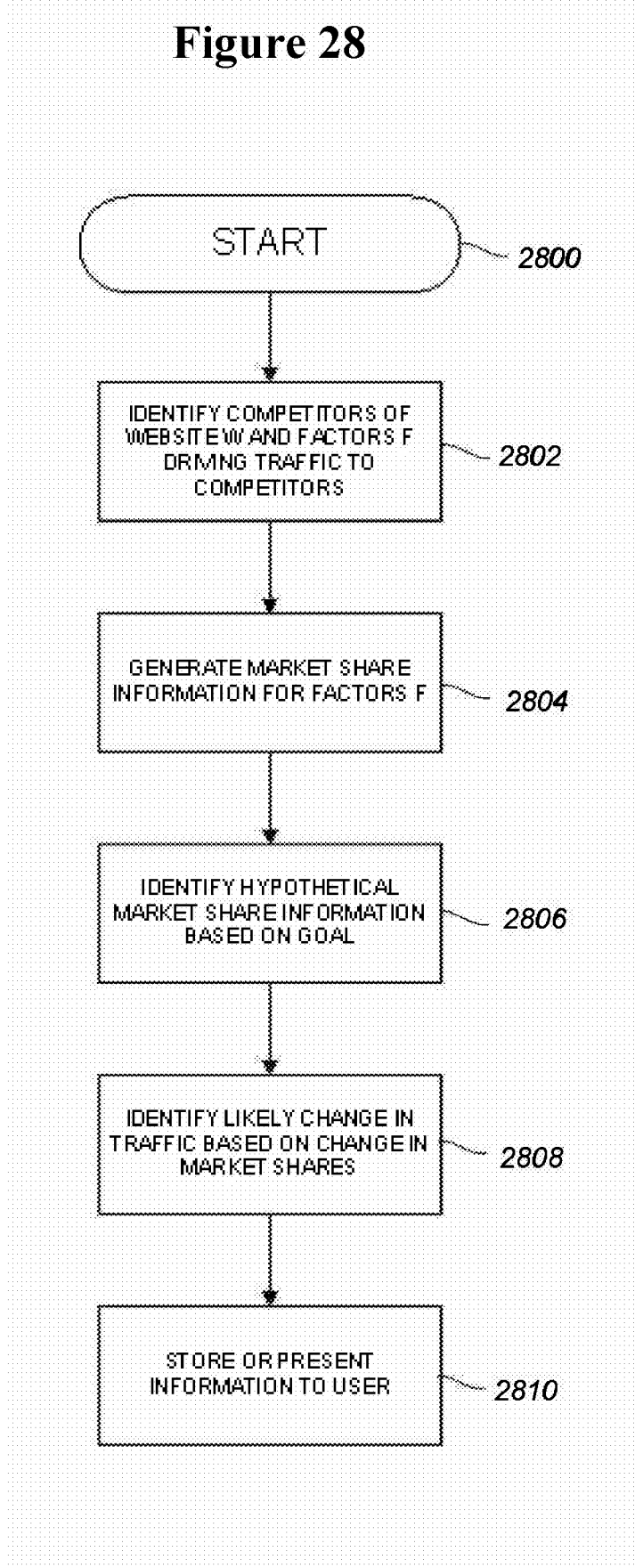
FIG. 28 is a flowchart illustrating a method for generating information about market share and growth opportunities in various keywords for a given website and competitors of that website.

The resulting information may also be used to determine and present information such as likely opportunities for traffic growth and "market share" data. Market share data may be in the form of traffic values. Traffic values may be computed as simple ratios, e.g. the ratio of search query traffic to a particular site over total search query traffic, or, alternatively, more complicated calculations based on alternative measure of traffic, such as those discussed above. (For simplicity, the remainder of this discussion shall use simple ratios.) Keywords and/or competitor sites may be ordered or ranked based on calculations made herein, such as traffic values and/or likely opportunities for growth. The ordering may be used to display the keywords or competitor sites. As shown in FIG. 27, this information 2700 may be presented in the form of numeric data or comparative graphs. For example, as shown in FIG. 27, for each keyword, search query traffic to the various websites for one or more keywords 2710 may be illustrated as a percent bar graph 2720. This percentage may represent a ratio representative of search engine traffic to each of the related websites attributable to the keyword relative to total search engine traffic to the subject site and related sites attributable to the keyword.

In particular, for each of the search queries that generate the most traffic for the website and competitors of the website, the percentage of the total search traffic for those queries driven to each website (both the subject website and its competitors) may be presented as a percentage of a bar graph. Thus, if fourteen percent of the search traffic for the keyword "swimwear" is going to jcpenny.com, then a section of the bar chart corresponding to jcpenny.com may be fourteen percent of the total length of the bar chart 2720. Graphs for multiple keywords may be displayed.

The system may also provide a measure of the likely opportunity for traffic growth based upon a change in "market share" for a given keyword. As shown in FIG. 27, a goal 2730 (target) market share for the subject website may be determined, e.g., by entry by a user. The system may then compute, for each keyword, the total increase in traffic to the subject website that is likely to occur if the subject website increases its market share of traffic based on that keyword to the specified goal. The total increase may be presented graphically 2740, and may be presented as a comparison among the various keywords. In this way, a user may determine which keywords offer valuable opportunities for growth.

An algorithm similar to or including some or all of the following may be used:

For a given website w, generate a set of the top N competitor websites and the top K search queries that drive significant amounts of user traffic to the websites at 2802;

Generate "market share" information based on the website, its N competitors, and the K search queries at 2804;

Compute hypothetical market share information based on a goal for market share for the website at 2806;

Compute the likely change in traffic volume to the website based on the change in market share at 2808;

Store or present the information to the user at 2810.

In particular, at 2802, for a given subject website, the top N competitor websites and top K search queries (keywords), where N and K may vary from 1 to any number, may be determined using the methods described above. A user may identify at least one of the competitor websites or keywords. A set of related sites that are related to the subject site and a set of one or more keywords attributable to search engine traffic to at least one of the related sites may be computed.

At 2802, market share information may be generated by computing, for each keyword, the fraction of search traffic for that keyword that goes to each of the N+1 websites. A market share "tail," consisting of the fraction of traffic that goes to websites other than the N+1 websites, may also be computed. As discussed above, this fraction may be generated as a function of (and from analysis of) collected network usage data, such as toolbar and/or site usage trails. The market share information may consist of, for the subject website and/or each competitor, a present ratio of search engine traffic to the website attributable to the keyword relative to total search engine traffic to the subject site and competitors attributable to the keyword.

A goal, e.g., a target ratio for market share of the subject website, relative to the keywords may be computed automatically at 2806. For example, a pro rata goal, e.g., a goal equal to 1/(N+1) of the market, could be determined. Alternatively, a goal of a certain increase in market share over the current market share, may be determined. For example, the goal may be set at 1.5 times the current market share, and may be set with a maximum value. A diminishing or increasing returns function may also be employed, in which the goal is set according to a certain amount of "effort" expended on a diminishing or increasing returns curve. Alternatively or additionally, a user may enter or adjust a market share goal. The goal may be less than the current market share for the website.

An incremental search engine traffic opportunity, such as the likely change in traffic to the website based on the change in market share (from actual to goal), may be computed by comparing the likely change in market share to the total traffic volume for that keyword at 2808. This information may be a function based in part upon the present ratio, the target ratio, and the total search engine traffic attributable to the keyword. For example, the total opportunity for growth may be represented as the product of the total search volume for that keyword times the change of market share. A report including graphical and numerical indicators of all or some of the above information may be generated. The report may contain analogous information for competitor websites, such as market share data. In this way, the method may illuminate which search terms drive proportionately more traffic to competitors of a website than to the website itself. Again, to reiterate, the foregoing data is not limited merely to competitor websites.

Hardware

All of the methods described herein may be performed and fully automated by a computer system that comprises one or more computers or machines. The computer system may, in some cases, be composed by multiple distinct computers or computing devices (e.g., physical servers, workstations, general purpose computers, storage arrays, etc,) that communicate and interoperate over a network to perform the described functions. Each such computing device typically includes a processor (or multiple processors) that executes program instructions stored in a memory.

More specifically, the disclosed methods and features may be embodied in executable code modules (software programs) executed by a computer system. The code modules may be stored on magnetic drives, on solid state memory devices, and/or on any other type of computer-readable medium. Different code modes may be executed by different computers or computing devices of the computer system. The code modules may be written in an appropriate programming language or languages, and may run on any appropriate computer platform(s).

The computer system may persistently store the results of the disclosed methods by transforming physical storage devices, such as solid state memory chips and/or magnetic disks, into a different state. The various reports depicted in the drawings may, for example, be in the form of dynamically generated web pages or other documents served by a web server, and may be displayed on computing devices of the end users (e.g., site owners or webmasters thereof) of the web analytics system. Typically, such reports are generated in response to page requests from corresponding end users, and are generated using pre-calculated data values derived from the collected usage trail data and/or other type of data.

Conditional Language

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

CONCLUSION

The specific embodiments described above are presented by way of example only, and not limitation. Numerous specific details have been set forth in order to provide a thorough understanding of specific embodiments of the present inventions. However, it will be understood by those skilled in the art that the present inventions may be practiced without these specific details. Those skilled in the art will readily appreciate that various modifications can be made. The scope of protection for the disclosed subject matter is defined only by the claims.

APPENDIX A

Example Website Categorization Process

For classification of an uncategorized website, the system may use a similarity distance between the uncategorized website and its related websites, if any related site data exists for the website in a related links database. Let $w_1$ and $w_2$ represent two websites, then let $d(w_1, w_2)$ be a distance measure between these two websites given by mapping g, g: W→R which may be provided by related links data, where set W includes all websites and set R is a list of related links. Furthermore, let f: W→C be a mapping that maps a website w∈W into a set of categories $\{c_i, c_i \in C\}$.

To classify a given uncategorized website w, first we find a set of all related links g(w), for which their similarity is greater than a threshold value of θ, 0<θ≦1 as follows:

$$g(w)=\{(r_i,d_i)|r \in R, d_i \geq \theta, i=1,\ldots,n\}$$

$$\pi c(g(w))=\{r|f(r)=c \forall r \in g(w), c \in C\}$$

where the set $\pi_c(g(w))$ contains only those related websites out of set g(w) which belong to category c. To assign a likelihood that website w belongs to category c, we define the likelihood function P: W→C as follows:

$$Pc(w \in C|\pi c(g(w)))=\Sigma \forall r \in \pi c(g(w))d(w,r)/|\pi c(g(w))|$$

where $|\pi_c(g(w))|$ is the cardinal number of set $\pi_c(g(w))$. Each website can belong to multiple categories by a set of likelihood PS(w) as follows:

$$PS(w)=\{Pc|\forall c \in C, Pc(w \in C|\pi c(g(w)))\}$$

Since each related links set g(w) has its own related links, the algorithm recursively can be expanded to a desirable level of depth. Therefore, a general form of likelihood is given by:

$$Pc(w \in C|\pi c(g(g(\ldots g(w))))) = \Sigma \forall r \in \pi c(w))d(w,r)/|\pi c(g(g(\ldots g(w))))|$$

In order to filter out less likely categories, we choose only categories with the highest importance. That means the list of important categories is chosen by analyzing user trails and identifying all websites which are most visited by toolbar users. Let tr(w) represent the traffic of website w for a given period of time and a set V, V ⊂ W, containing websites whose traffic is greater than a threshold value δ:

$$v(z)=\{z|tr(z) \geq \delta, z \in W\}$$

Now we define a set M, M ⊂ C, which represents the most important sub-categories of set C by finding all categories which websites v(z) belong to, i.e.:

$$M=\{ci|f(v(z)=ci, ci \in W\}$$

If we only calculate the likelihood for categories belonging to the set of the most important categories M, we may improve the performance of classification by reducing possible artifacts in our dataset. Furthermore, to get wider coverage, if any category is not in set M (however its higher level category belongs to M), then we may calculate the higher level category likelihood.

What is claimed is:

1. A method of generating demographic profiles of network-accessible sites, the method comprising:
   obtaining demographic information relating to each network user of a first set of network users, said demographic data supplied by the respective users;
   obtaining network usage information relating to each of the network users of the first set of network users;
   training a computer-implemented classifier using the demographic information and the network usage information relating to each of the network users of the first set; obtaining network usage information for a second set of users for whom demographic information is unknown or incomplete;
   applying the computer-implemented classifier to the network usage information of said second set of users to generate predictive demographic information for the users in the second set; and
   generating, by a computer system that comprises one or more computing devices, a demographic profile of a network-accessible site based on a combination of (1) the demographic information supplied by users who have accessed the site, and (2) the predictive demographic information of users who have accessed the site, wherein generating the demographic profile of the site comprises giving an amount of weight to a user's supplied or predictive demographic information that is proportional to a measure of the user's quantity of usage of the site.

2. The method of claim 1, wherein training the classifier comprises using at least some of the network usage information relating to each of the network users of the first set as an input training set, and using at least some of the demographic information relating to each of the network users of the first set as an output training set.

3. The method of claim 1, wherein the network usage information relating to each of the network users of the first set comprises search query submissions of users.

4. The method of claim 1, wherein generating the demographic profile of the site comprises:
   generating a first demographic profile of the site based on the supplied demographic information of users who have accessed the site;
   generating a second demographic profile of the site based on the predictive demographic information of users who have accessed the site; and
   combining the first and second demographic profiles.

5. The method of claim 4, wherein combining the first and second demographic profiles comprises accounting for differences between (1) categories used to classify users who have supplied demographic information, and (2) categories used to classify users who have not supplied demographic information.

6. The method of claim 1, wherein obtaining the network usage information comprises obtaining usage trail information from a client software program executed by computing devices of the first set of network users.

7. The method of claim 6, wherein the client software program is a browser plugin.

8. The method of claim 1, wherein obtaining the network usage information comprises obtaining network usage information using cookies stored on computing devices of users.

9. The method of claim 1, wherein the classifier is a voting classifier comprising at least two sub-classifiers, wherein each sub-classifier is selected from the group consisting of a naïve Bayes classifier, a decision tree, an artificial neural network, a support vector machine, an expert system, and a nearest neighbor classifier.

10. A method of generating demographic profiles of network-accessible sites, the method comprising:
   obtaining demographic information relating to each network user of a first set of network users, said demographic data supplied by the respective users;
   obtaining network usage information relating to each of the network users of the first set of network users;
   training a computer-implemented classifier using the demographic information and the network usage information relating to each of the network users of the first set;
   obtaining network usage information for a second set of users for whom demographic information is unknown or incomplete;
   applying the computer-implemented classifier to the network usage information of said second set of users to generate predictive demographic information for the users in the second set;
   generating, by a computer system that comprises one or more computing devices, a demographic profile of a network-accessible site based on a combination of (1) the demographic information supplied by users who have accessed the site, and (2) the predictive demographic information of users who have accessed the site;
   using the demographic profile of the site, in combination with demographic profiles generated for other sites, to provide an interactive site screener that enables an operator, via a demographic filter user interface, to specify multiple demographic characteristics and to obtain a corresponding listing of sites;
   receiving, from a user of the interactive site screener, a demographic filter specified via the demographic filter user interface, said demographic filter specifying a plurality of demographic characteristics selected from a plurality of predefined demographic categories of the interactive site screener; and
   generating a listing of sites for presentation to the user of the interactive site screener based on the received demographic filter and the demographic profiles of the sites.

11. The method of claim 10, wherein the interactive site screener is configured to identify sites for which more than a threshold percentage of visitors satisfy operator-specified demographic criteria.

12. Non-transitory computer storage that stores executable program code that directs a computing system comprising one or more computers to generate demographic profiles of network-accessible sites by a process that comprises:
   obtaining demographic information of a first set of users, said demographic information supplied by respective users;
   obtaining network usage information reflective of network access behaviors of the first set of users;
   training a classifier using the demographic information and the network usage information associated with the first set of users;
   obtaining network usage information for a second set of users for whom demographic information is unknown or incomplete;
   applying the classifier to the network usage information of the second set of users to generate inferred demographic information for the users in the second set; and
   generating a demographic profile of a network-accessible site using both (1) the demographic information supplied by users who have accessed the site, and (2) the inferred demographic information of users who have accessed the site, wherein generating the demographic profile of the site comprises giving an amount of weight to a user's supplied or inferred demographic information that is proportional to a measure of the user's quantity of usage of the site.

13. The non-transitory computer storage of claim 12, wherein training the classifier comprises using at least some of the network usage information of users of the first set as an input training set, and using at least some of the demographic information of users of the first set as an output training set.

14. The non-transitory computer storage of claim 12, wherein generating the demographic profile of the site comprises:
   generating a first demographic profile of the site based on the supplied demographic information of users who have accessed the site;
   generating a second demographic profile of the site based on the inferred demographic information of users who have accessed the site; and
   combining the first and second demographic profiles.

15. The non-transitory computer storage of claim 14, wherein combining the first and second profiles comprises accounting for differences between (1) categories used to classify users who have supplied demographic information and (2) categories used to classify users who have not supplied demographic information.

16. The non-transitory computer storage of claim 12, wherein the classifier is a voting classifier comprising at least two sub-classifiers.

17. The non-transitory computer storage of claim 12, wherein the classifier generates likelihood information representing a likelihood that a target user has a particular demographic characteristic given the existence of a particular network usage characteristic of the target user.

18. The non-transitory computer storage of claim 12, wherein the first set of users comprises toolbar users who have explicitly supplied their demographic information, and the second set of users includes toolbar users who have not supplied their demographic information.

19. The non-transitory computer storage of claim 12, in combination with the computing system, wherein the computing system is programmed with the executable program code to implement the process.

20. Non-transitory computer storage that stores executable program code that directs a computing system comprising one or more computers to generate demographic profiles of network-accessible sites by a process that comprises:
   obtaining demographic information of a first set of users, said demographic information supplied by respective users;
   obtaining network usage information reflective of network access behaviors of the first set of users;
   training a classifier using the demographic information and the network usage information associated with the first set of users;
   obtaining network usage information for a second set of users for whom demographic information is unknown or incomplete;

applying the classifier to the network usage information of the second set of users to generate inferred demographic information for the users in the second set; and generating a demographic profile of a network-accessible site using both (1) the demographic information supplied by users who have accessed the site, and (2) the inferred demographic information of users who have accessed the site;

wherein the executable program code further directs the computing system to use the demographic profile of the site, in combination with demographic profiles generated for other sites, to provide an interactive site screener that enables an operator, via a demographic filter user interface, to specify multiple demographic characteristics and to obtain a corresponding listing of sites;

wherein the executable program code is responsive to a submission by a site screener user of a demographic filter by directing the computing system to generate, based on the demographic profiles of the sites, a listing of sites corresponding to the demographic filter, said demographic filter comprising a plurality of demographic characteristics selected from a plurality of predefined demographic categories of the interactive site screener.

21. The non-transitory computer storage of claim 20, wherein the interactive site screener is configured to identify sites for which more than a selected percentage of visitors satisfy operator-specified demographic criteria.

22. A system, comprising:
a computer data repository that stores network usage data of a first set of users who have supplied demographic information and for a second set of users who have not supplied demographic information, the network usage data reflecting network usage behaviors, including site visits, of particular users;
a computer system comprising one or more computers, said computer system programmed via executable instructions to at least:
generate inferred demographic information for users in the second set based on the network usage data of the users in the first and second sets and the demographic information supplied by users in the first set; and
generate a demographic profile of a network-accessible site based on a combination of (1) the supplied demographic information of users in the first set who have accessed the site, and (2) the inferred demographic information of users in the second set who have accessed the site;
wherein the computer system is programmed to generate the demographic profile of the site by a process that comprises giving an amount of weight to a user's supplied or inferred demographic information that is proportional to a measure of the user's quantity of usage of the site.

23. The system of claim 22, wherein the computer system is programmed to generate the demographic profile of the site by a process that comprises:

generating a first demographic profile of the site based on the supplied demographic information of users in the first set who have accessed the site;
generating a second demographic profile of the site based on the inferred demographic information of users in the second set who have accessed the site; and
combining the first and second demographic profiles.

24. A system, comprising:
a computer data repository that stores network usage data of a first set of users who have supplied demographic information and for a second set of users who have not supplied demographic information, the network usage data reflecting network usage behaviors, including site visits, of particular users;
a computer system comprising one or more computers, said computer system programmed via executable instructions to at least:
generate inferred demographic information for users in the second set based on the network usage data of the users in the first and second sets and the demographic information supplied by users in the first set;
generate a demographic profile of a network-accessible site based on a combination of (1) the supplied demographic information of users in the first set who have accessed the site, and (2) the inferred demographic information of users in the second set who have accessed the site;
use the demographic profile of the site, in combination with demographic profiles generated for other sites, to provide an interactive site screener that enables an operator, via a demographic filter user interface, to specify multiple demographic characteristics and to obtain a corresponding listing of sites;
receive, from a user of the interactive site screener, a demographic filter that includes a plurality of demographic criteria selected from a plurality of demographic categories presented on the demographic filter user interface; and
generate, based on the demographic filter and demographic profiles of sites, a listing of sites to present to the user.

25. The system of claim 24, wherein the interactive site screener is configured to identify sites for which more than a selected percentage of visitors satisfy operator-specified demographic criteria.

26. The system of claim 24, wherein the demographic filter user interface includes user functionality for selecting demographic criteria from at least two of the following demographic categories: country, ethnicity, education level, income level.

27. The system of claim 24, wherein the computer system is additionally programmed to generate, for a particular site, a graphical indication of how a demographic profile of the particular site differs from an average demographic profile taken over multiple sites.

* * * * *